US012510537B2

(12) United States Patent
Babic et al.

(10) Patent No.: US 12,510,537 B2
(45) Date of Patent: Dec. 30, 2025

(54) HIGH THROUGHPUT DRUG SCREENING METHODS

(71) Applicant: NERD BIO LLC, San Diego, CA (US)

(72) Inventors: Ivan Babic, San Diego, CA (US); Elmar Nurmammadov, San Diego, CA (US)

(73) Assignee: NERD BIO LLC, San Diego, CA (US)

( * ) Notice: Subject to any disclaimer, the term of this patent is extended or adjusted under 35 U.S.C. 154(b) by 1079 days.

(21) Appl. No.: 17/529,157

(22) Filed: Nov. 17, 2021

(65) Prior Publication Data

US 2022/0155286 A1 May 19, 2022

Related U.S. Application Data

(60) Provisional application No. 63/114,927, filed on Nov. 17, 2020.

(51) Int. Cl.
*G01N 33/542* (2006.01)
*B01L 3/00* (2006.01)
*G01N 21/64* (2006.01)

(52) U.S. Cl.
CPC .......... *G01N 33/542* (2013.01); *B01L 3/5085* (2013.01); *G01N 21/6428* (2013.01); *B01L 2300/0829* (2013.01); *G01N 2021/6439* (2013.01); *G01N 2500/02* (2013.01)

(58) Field of Classification Search
CPC ........... G01N 21/6428; G01N 2500/02; G01N 2333/922
See application file for complete search history.

(56) References Cited

U.S. PATENT DOCUMENTS

| 2003/0059814 A1 | 3/2003 | Whitehorn et al. |
| 2005/0214839 A1* | 9/2005 | Raines ..................... C12N 9/99 435/6.12 |
| 2007/0270486 A1 | 11/2007 | Kopito et al. |

FOREIGN PATENT DOCUMENTS

JP          4262778 B2      5/2009

OTHER PUBLICATIONS

Pellestor European J. Human Genetics 2004 12:694-700 (Year: 2004).*
Patent Cooperation Treaty, International Search Report issued in PCT/US2021/059743, Mar. 14, 2022, pp. 1-5.
Yu et al., "Engineering a far-red light-activated split-Cas9 system for remote-controlled genome editing of internal organs and tumors", Science Advances, Jul. 10, 2020, vol. 6, eabb1777, pp. 1-13.
Henderson et al., "High-throughput cellular thermal shift assays in research and drug discovery", SLAS Discovery, Sep. 30, 2019 (Epub), vol. 25(2), pp. 137-147.
European Patent Office, Extended European Search Report issued in European Patent Application No. 21895519.3, Oct. 21, 2024, pp. 1-13.

(Continued)

*Primary Examiner* — Changhwa J Cheu
(74) *Attorney, Agent, or Firm* — Pillsbury Winthrop Shaw Pittman LLP

(57) ABSTRACT

Provided herein are methods amenable to high-throughput multiplexing, in part, using a modified enzyme complementation assay, that can be used to screen a library of test compounds and to identify compounds that inhibit denaturation of a target polypeptide of interest.

69 Claims, 34 Drawing Sheets
Specification includes a Sequence Listing.

(56) References Cited

OTHER PUBLICATIONS

Braud et al., "Dual Expression System Suitable for High-Throughput Fluorescence-Based Screening and Production of Soluble Proteins", Journal of Proteome Research, Nov. 3, 2005, pp. 2137-2147, vol. 4(6).
Fang et al., "Engineering soluble tobacco etch virus protease accompanies the loss of stability", Protein Expression and Purification, Sep. 4, 2013, pp. 29-35, vol. 92(1).
Fang et al., "Synonymous Rare Arginine Codons and tRNA Abundance Affect Protein Production and Quality of TEV Protease Variant", PLoS One, Nov. 26, 2014, pp. 1-13, e112254.
Savitski et al., "Tracking cancer drugs in living cells by thermal profiling of the proteome", Science, Oct. 2, 2014, pp. 1255784-1255784, vol. 346(6205).

\* cited by examiner

SARS-CoV2 Coronavirus

Plasmid library encoding all individual virus proteins

**Virus target engagement rowed array:

SEQUENCE LISTING

<160> NUMBER OF SEQ ID NOS: 34

<210> SEQ ID NO 1
<211> LENGTH: 20
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 1

Lys Glu Thr Ala Ala Ala Lys Phe Glu Arg Gln His Met Asp Ser Ser
1               5                   10                  15

Thr Ser Ala Ala
            20

<210> SEQ ID NO 2
<211> LENGTH: 19
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 2

Lys Glu Thr Asn Trp Ala Trp Phe Trp Asp Gln His Met Asp Ser Ser
1               5                   10                  15

Thr Ser Ala

<210> SEQ ID NO 3
<211> LENGTH: 19
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 3

Lys Glu Thr Gly Trp Ala Leu Phe Val Gln Gln His Met Asp Ser Ser
1               5                   10                  15

Thr Ser Ala

<210> SEQ ID NO 4
<211> LENGTH: 19
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 4

Lys Glu Thr Val Met Ala Asn Phe Gln Met Gln His Met Asp Ser Ser
1               5                   10                  15

Thr Ser Ala

<210> SEQ ID NO 5
<211> LENGTH: 19
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 5

Lys Glu Thr Gly Asp Ala Val Phe Ala Arg Gln His Met Asp Ser Ser

-continued

```
1               5                   10                  15

Thr Ser Ala

<210> SEQ ID NO 6
<211> LENGTH: 19
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 6

Lys Glu Thr Gly Trp Ala Ala Phe Val Lys Gln His Met Asp Ser Ser
1               5                   10                  15

Thr Ser Ala

<210> SEQ ID NO 7
<211> LENGTH: 19
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 7

Lys Glu Thr Gly Trp Ala Thr Phe Val Glu Gln His Met Asp Ser Ser
1               5                   10                  15

Thr Ser Ala

<210> SEQ ID NO 8
<211> LENGTH: 19
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 8

Lys Glu Thr Lys Leu Ala Phe Phe Leu Lys Gln His Met Asp Ser Ser
1               5                   10                  15

Thr Ser Ala

<210> SEQ ID NO 9
<211> LENGTH: 19
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 9

Lys Glu Thr Trp Trp Ala Trp Phe Phe Gly Gln His Met Asp Ser Ser
1               5                   10                  15

Thr Ser Ala

<210> SEQ ID NO 10
<211> LENGTH: 19
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 10
```

```
Lys Glu Thr Thr Trp Ala Glu Phe Thr Trp Gln His Met Asp Ser Ser
1               5                   10                  15

Thr Ser Ala

<210> SEQ ID NO 11
<211> LENGTH: 19
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 11

Lys Glu Thr Pro Trp Ala Ser Phe Asn Lys Gln His Met Asp Ser Ser
1               5                   10                  15

Thr Ser Ala

<210> SEQ ID NO 12
<211> LENGTH: 19
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 12

Lys Glu Thr Ala Met Ala Met Phe Val Thr Gln His Met Asp Ser Ser
1               5                   10                  15

Thr Ser Ala

<210> SEQ ID NO 13
<211> LENGTH: 19
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 13

Lys Glu Thr Leu Trp Ala Trp Phe Met Trp Gln His Met Asp Ser Ser
1               5                   10                  15

Thr Ser Ala

<210> SEQ ID NO 14
<211> LENGTH: 15
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 14

Lys Glu Thr Ala Ala Ala Lys Phe Glu Arg Gln His Met Asp Ser
1               5                   10                  15

<210> SEQ ID NO 15
<211> LENGTH: 15
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 15

Lys Glu Thr Ala Ala Ala Lys Phe Glu Arg Gln His Met Asn Ser
```

<210> SEQ ID NO 16
<211> LENGTH: 15
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 16

Asn Arg Ala Trp Ser Glu Phe Leu Trp Gln His Leu Ala Pro Val
1               5                   10                  15

<210> SEQ ID NO 17
<211> LENGTH: 15
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 17

Asn Arg Gly Trp Ser Glu Phe Leu Trp Gln His His Ala Pro Val
1               5                   10                  15

<210> SEQ ID NO 18
<211> LENGTH: 15
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 18

Asn Arg Ala Trp Ser Val Phe Gln Trp Gln His Ile Ala Pro Ala
1               5                   10                  15

<210> SEQ ID NO 19
<211> LENGTH: 105
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 19

Met Ser Ser Ser Asn Tyr Cys Asn Gln Met Met Lys Ser Arg Asn Leu
1               5                   10                  15

Thr Lys Asp Arg Cys Lys Pro Val Asn Thr Phe Val His Glu Ser Leu
            20                  25                  30

Ala Asp Val Gln Ala Val Cys Ser Gln Lys Asn Val Ala Cys Lys Asn
        35                  40                  45

Gly Gln Thr Asn Cys Tyr Gln Ser Tyr Ser Thr Met Ser Ile Thr Asp
    50                  55                  60

Cys Arg Glu Thr Gly Ser Ser Lys Tyr Pro Asn Cys Ala Tyr Lys Thr
65                  70                  75                  80

Thr Gln Ala Asn Lys His Ile Ile Val Ala Cys Glu Gly Asn Pro Tyr
                85                  90                  95

Val Pro Val His Phe Asp Ala Ser Val
            100                 105

<210> SEQ ID NO 20
<211> LENGTH: 102

```
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 20

Met Ser Ser Ser Asn Tyr Cys Asn Gln Met Met Lys Ser Arg Asn Leu
1               5                   10                  15

Thr Lys Asp Arg Cys Lys Pro Val Asn Thr Phe Val His Glu Ser Leu
            20                  25                  30

Ala Asp Val Gln Ala Val Cys Ser Gln Lys Asn Val Ala Cys Lys Asn
        35                  40                  45

Gly Gln Thr Asn Cys Tyr Gln Ser Tyr Ser Thr Met Ser Ile Thr Asp
    50                  55                  60

Cys Arg Glu Thr Gly Ser Ser Lys Tyr Pro Asn Cys Ala Tyr Lys Thr
65                  70                  75                  80

Thr Gln Ala Asn Lys His Ile Ile Val Ala Cys Glu Gly Asn Pro Tyr
                85                  90                  95

Val Pro Val His Phe Asp
            100

<210> SEQ ID NO 21
<211> LENGTH: 124
<212> TYPE: PRT
<213> ORGANISM: Bos taurus

<400> SEQUENCE: 21

Lys Glu Thr Ala Ala Ala Lys Phe Glu Arg Gln His Met Asp Ser Ser
1               5                   10                  15

Thr Ser Ala Ala Ser Ser Ser Asn Tyr Cys Asn Gln Met Met Lys Ser
            20                  25                  30

Arg Asn Leu Thr Lys Asp Arg Cys Lys Pro Val Asn Thr Phe Val His
        35                  40                  45

Glu Ser Leu Ala Asp Val Gln Ala Val Cys Ser Gln Lys Asn Val Ala
    50                  55                  60

Cys Lys Asn Gly Gln Thr Asn Cys Tyr Gln Ser Tyr Ser Thr Met Ser
65                  70                  75                  80

Ile Thr Asp Cys Arg Glu Thr Gly Ser Ser Lys Tyr Pro Asn Cys Ala
                85                  90                  95

Tyr Lys Thr Thr Gln Ala Asn Lys His Ile Ile Val Ala Cys Glu Gly
            100                 105                 110

Asn Pro Tyr Val Pro Val His Phe Asp Ala Ser Val
        115                 120

<210> SEQ ID NO 22
<211> LENGTH: 348
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 22
ggtaccatga gcagctccaa ctactgtaac cagatgatga gagccggaa cctgaccaaa      60 gatcgatgca agccagtgaa cacctttgtg cacgagtccc tggctgatgt ccaggccgtg    120
tgctcccaga aaaatgttgc ctgcaagaat gggcagacca attgctacca gagctactcc    180
accatgagca tcaccgactg ccgtgagacc ggcagctcca agtaccccaa ctgtgcctac    240
```

```
aagaccaccc aggcgaataa acacatcatt gtggcttgtg agggaaaccc gtacgtgcca    300
gtccactttg atgcttcagt gcatcaccat caccatcact agggatcc                348
```

<210> SEQ ID NO 23
<211> LENGTH: 111
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 23

```
Met Ser Ser Ser Asn Tyr Cys Asn Gln Met Met Lys Ser Arg Asn Leu
1               5                  10                  15

Thr Lys Asp Arg Cys Lys Pro Val Asn Thr Phe Val His Glu Ser Leu
            20                  25                  30

Ala Asp Val Gln Ala Val Cys Ser Gln Lys Asn Val Ala Cys Lys Asn
        35                  40                  45

Gly Gln Thr Asn Cys Tyr Gln Ser Tyr Ser Thr Met Ser Ile Thr Asp
    50                  55                  60

Cys Arg Glu Thr Gly Ser Ser Lys Tyr Pro Asn Cys Ala Tyr Lys Thr
65                  70                  75                  80

Thr Gln Ala Asn Lys His Ile Ile Val Ala Cys Glu Gly Asn Pro Tyr
                85                  90                  95

Val Pro Val His Phe Asp Ala Ser Val His His His His His His
            100                 105                 110
```

<210> SEQ ID NO 24
<211> LENGTH: 552
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 24

```
ggtaccatgg cgcctccag gctctatacc ctggtgctgg tcctgcagcc tcagcgagtt    60
ctcctgggca tgaaaaagcg aggcttcggg gccggccggt ggaatggctt tgggggcaaa   120
gtgcaagaag agagaccat cgaggatggg gctaggaggg agctgcagga ggagagcggt    180
ctgacagtgg acgccctgca aaggtgggc cagatcgtgt ttgagttcgt gggcgagcct    240
gagctcatgg acgtgcatgt cttctgcaca gacagcatcc aggggacccc cgtggagagc    300
gacgaaatgc gcccatgctg gttccagctg gatcagatcc ccttcaagga catgtggccc    360
gacgacagct actggtttcc actcctgctt cagaagaaga aattccacgg gtacttcaag    420
ttccagggtc aggacaccat cctggactac acactccgcg aggtggacac ggtcaaggaa    480
actgcagcag ccaagtttga gcggcagcac atggactcca gcacttccgc tgcctaggct    540
gcctagggat cc                                                       552
```

<210> SEQ ID NO 25
<211> LENGTH: 176
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 25

```
Met Gly Ala Ser Arg Leu Tyr Thr Leu Val Leu Val Leu Gln Pro Gln
1               5                   10                  15

Arg Val Leu Leu Gly Met Lys Lys Arg Gly Phe Gly Ala Gly Arg Trp
            20                  25                  30

Asn Gly Phe Gly Gly Lys Val Gln Glu Gly Glu Thr Ile Glu Asp Gly
                35                  40                  45

Ala Arg Arg Glu Leu Gln Glu Glu Ser Gly Leu Thr Val Asp Ala Leu
        50                  55                  60

His Lys Val Gly Gln Ile Val Phe Glu Phe Val Gly Glu Pro Glu Leu
65                  70                  75                  80

Met Asp Val His Val Phe Cys Thr Asp Ser Ile Gln Gly Thr Pro Val
                85                  90                  95

Glu Ser Asp Glu Met Arg Pro Cys Trp Phe Gln Leu Asp Gln Ile Pro
                100                 105                 110

Phe Lys Asp Met Trp Pro Asp Ser Tyr Trp Phe Pro Leu Leu Leu
            115                 120                 125

Gln Lys Lys Lys Phe His Gly Tyr Phe Lys Phe Gln Gly Gln Asp Thr
        130                 135                 140

Ile Leu Asp Tyr Thr Leu Arg Glu Val Asp Thr Val Lys Glu Thr Ala
145                 150                 155                 160

Ala Ala Lys Phe Glu Arg Gln His Met Asp Ser Ser Thr Ser Ala Ala
                165                 170                 175

<210> SEQ ID NO 26
<211> LENGTH: 561
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 26
ggtaccatgg cgcctccag gctctatacc ctggtgctgg tcctgcagcc tcagcgagtt      60
ctcctgggca tgaaaaagcg aggcttcggg gccggccggt ggaatggctt tgggggcaaa    120
gtgcaagaag agagaccat cgaggatggg gctaggaggg agctgcagga ggagagcggt    180
ctgacagtgg acgccctgca caaggtgggc cagatcgtgt ttgagttcgt gggcgagcct    240
gagctcatgg acgtgcatgt cttctgcaca gacagcatcc aggggacccc cgtggagagc    300
gacgaaatgc gcccatgctg gttccagctg atcagatcc ccttcaagga catgtggccc    360
gacgacagct actggtttcc actcctgctt cagaagaaga aattccacgg gtacttcaag    420
ttccagggtc aggacaccat cctggactac acactccgcg aggtggacac ggtcgccgcc    480
gccaaggaaa ctgcagcagc caagtttgag cggcagcaca tggactccag cacttccgct    540
gcctaggctg cctagggatc c                                              561

<210> SEQ ID NO 27
<211> LENGTH: 179
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 27

Met Gly Ala Ser Arg Leu Tyr Thr Leu Val Leu Val Leu Gln Pro Gln
1               5                   10                  15

Arg Val Leu Leu Gly Met Lys Lys Arg Gly Phe Gly Ala Gly Arg Trp
            20                  25                  30
```

```
                    20                  25                  30
Asn Gly Phe Gly Gly Lys Val Gln Glu Gly Glu Thr Ile Glu Asp Gly
                35                  40                  45

Ala Arg Arg Glu Leu Gln Glu Ser Gly Leu Thr Val Asp Ala Leu
    50                  55                  60

His Lys Val Gly Gln Ile Val Phe Glu Phe Val Gly Glu Pro Glu Leu
65                  70                  75                  80

Met Asp Val His Val Phe Cys Thr Asp Ser Ile Gln Gly Thr Pro Val
                85                  90                  95

Glu Ser Asp Glu Met Arg Pro Cys Trp Phe Gln Leu Asp Gln Ile Pro
            100                 105                 110

Phe Lys Asp Met Trp Pro Asp Ser Tyr Trp Phe Pro Leu Leu Leu
        115                 120                 125

Gln Lys Lys Lys Phe His Gly Tyr Phe Lys Phe Gln Gly Gln Asp Thr
    130                 135                 140

Ile Leu Asp Tyr Thr Leu Arg Glu Val Asp Thr Val Ala Ala Ala Lys
145                 150                 155                 160

Glu Thr Ala Ala Ala Lys Phe Glu Arg Gln His Met Asp Ser Ser Thr
                165                 170                 175

Ser Ala Ala

<210> SEQ ID NO 28
<211> LENGTH: 582
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 28
ggtaccatgg gcgcctccag gctctatacc ctggtgctgg tcctgcagcc tcagcgagtt      60
ctcctgggca tgaaaaagcg aggcttcggg gccggccggt ggaatggctt tgggggcaaa     120
gtgcaagaag gagagaccat cgaggatggg gctaggaggg agctgcagga ggagagcggt     180
ctgacagtgg acgccctgca caaggtgggc cagatcgtgt ttgagttcgt gggcgagcct     240
gagctcatgg acgtgcatgt cttctgcaca gacagcatcc aggggacccc cgtggagagc     300
gacgaaatgc gcccatgctg gttccagctg atcagatccc cttcaagga catgtggccc      360 gacgacagct actggtttcc actcctgctt cagaagaaga aattccacgg gtacttcaag     420
ttccagggtc aggacaccat cctggactac acactccgcg aggtggacac ggtcgccgcc     480
gccgccgccg ccgccgccgc cgccaaggaa actgcagcag ccaagtttga gcggcagcac     540
atggactcca gcacttccgc tgcctaggct gcctagggat cc                        582

<210> SEQ ID NO 29
<211> LENGTH: 186
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 29

Met Gly Ala Ser Arg Leu Tyr Thr Leu Val Leu Val Leu Gln Pro Gln
1               5                  10                  15

Arg Val Leu Leu Gly Met Lys Lys Arg Gly Phe Gly Ala Gly Arg Trp
                20                  25                  30
```

Asn Gly Phe Gly Gly Lys Val Gln Glu Gly Glu Thr Ile Glu Asp Gly
             35                  40                  45

Ala Arg Arg Glu Leu Gln Glu Glu Ser Gly Leu Thr Val Asp Ala Leu
 50                  55                  60

His Lys Val Gly Gln Ile Val Phe Glu Phe Val Gly Glu Pro Glu Leu
 65                  70                  75                  80

Met Asp Val His Val Phe Cys Thr Asp Ser Ile Gln Gly Thr Pro Val
                 85                  90                  95

Glu Ser Asp Glu Met Arg Pro Cys Trp Phe Gln Leu Asp Gln Ile Pro
                100                 105                 110

Phe Lys Asp Met Trp Pro Asp Asp Ser Tyr Trp Phe Pro Leu Leu Leu
                115                 120                 125

Gln Lys Lys Lys Phe His Gly Tyr Phe Lys Phe Gln Gly Gln Asp Thr
            130                 135                 140

Ile Leu Asp Tyr Thr Leu Arg Glu Val Asp Thr Val Ala Ala Ala Ala
145                 150                 155                 160

Ala Ala Ala Ala Ala Ala Lys Glu Thr Ala Ala Lys Phe Glu Arg
                    165                 170                 175

Gln His Met Asp Ser Ser Thr Ser Ala Ala
                180                 185

<210> SEQ ID NO 30
<211> LENGTH: 2181
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 30

```
atggcctcgc cggctgacag ctgtatccag ttcacccgcc atgccagtga tgttcttctc      60
aaccttaatc gtctccggag tcgagacatc ttgactgatg ttgtcattgt tgtgagccgt     120
gagcagttta gagcccataa acggtcctca tggcctgcag gtggcctgtt ctatagcatc     180
tttacagacc agttgaaatg caaccttagt gtgatcaatc tagatcctga gatcaaccct     240
gagggattct gcatcctcct ggacttcatg tacacatctc ggctcaattt gcgggagggc     300
aacatcatgg ctgtgatggc cacggctatg tacctgcaga tggagcatgt tgtggacact     360
tgccggaagt ttattaaggc cagtgaagca gagatggttt ctgccatcaa gcctcctcgt     420
gaagagttcc tcaacagccg gatgctgatg ccccaagaca tcatggccta tcgggggtcgt     480 gaggtggtgg agaacaacct gccactgagg agcgcccctg ggtgtgagag cagagccttt     540 gccccccagcc tgtacagtgg cctgtccaca ccgccagcct cttattccat gtacagccac     600
ctccctgtca gcagcctcct cttctccgat gaggagtttc gggatgtccg gatgcctgtg     660
gccaacccct tccccaagga gcgggcactc ccatgtgata gtgccaggcc agtccctggt     720
gagtacagcc ggccgacttt ggaggtgtcc cccaatgtgt gccacagcaa tatctattca     780
cccaaggaaa caatcccaga agaggcacga agtgatatgc actacagtgt ggctgagggc     840
ctcaaacctg ctgcccccctc agcccgaaat gccccctact cccttgtgca aaggccagc     900 aaagaagaag agagaccctc ctcggaagat gagattgccc tgcatttcga gcccccccaat     960 gcacccctga accggaaggg tctggttagt ccacagagcc ccagaaaatc tgactgccag    1020
cccaactcgc ccacagagtc ctgcagcagt aagaatgcct gcatcctcca ggcttctggc    1080
tcccctccag ccaagagccc cactgacccc aaagcctgca actggaagaa atacaagttc    1140
```

```
atcgtgctca acagcctcaa ccagaatgcc aaaccagagg ggcctgagca ggctgagctg   1200
ggccgccttt ccccacgagc ctacacggcc ccacctgcct gccagccacc catggagcct   1260
gagaaccttg acctccagtc cccaaccaag ctgagtgcca gcggggagga ctccaccatc   1320
ccacaagcca gccggctcaa taacatcgtt aacaggtcca tgacgggctc tccccgcagc   1380
agcagcgaga gccactcacc actctacatg cacccccga  agtgcacgtc ctgcggctct   1440
cagtccccac agcatgcaga gatgtgcctc cacaccgctg gccccacgtt ccctgaggag   1500
atgggagaga cccagtctga gtactcagat tctagctgtg agaacggggc cttcttctgc   1560
aatgagtgtg actgccgctt ctctgaggag gcctcactca agaggcacac gctgcagacc   1620
cacagtgaca aaccctacaa gtgtgaccgc tgccaggcct ccttccgcta aagggcaac    1680 ctcgccagcc acaagaccgt ccataccggt gagaaaccct atcgttgcaa catctgtggg   1740
gcccagttca accggccagc caacctgaaa acccacactc gaattcactc tggagagaag   1800
ccctacaaat gcgaaacctg cggagccaga tttgtacagg tggcccacct ccgtgcccat   1860
gtgcttatcc acactggtga agcccctat  ccctgtgaaa tctgtggcac ccgtttccgg   1920
caccttcaga ctctgaagag ccacctgcga atccacacag gagagaaacc ttaccattgt   1980
gagaagtgta acctgcattt ccgtcacaaa gccagctgc  gacttcactt cgccagaag    2040 catggcgcca tcaccaacac caaggtgcaa taccgcgtgt cagccactga cctgcctccg   2100
gagctcccca agcctgcaa  ggaaactgca gcagccaagt tgagcggca gcacatggac    2160 tccagcactt ccgctgcctg a                                             2181
```

<210> SEQ ID NO 31
<211> LENGTH: 726
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 31

```
Met Ala Ser Pro Ala Asp Ser Cys Ile Gln Phe Thr Arg His Ala Ser
1               5                   10                  15

Asp Val Leu Leu Asn Leu Asn Arg Leu Arg Ser Arg Asp Ile Leu Thr
            20                  25                  30

Asp Val Val Ile Val Val Ser Arg Glu Gln Phe Arg Ala His Lys Thr
        35                  40                  45

Val Leu Met Ala Cys Ser Gly Leu Phe Tyr Ser Ile Phe Thr Asp Gln
    50                  55                  60

Leu Lys Cys Asn Leu Ser Val Ile Asn Leu Asp Pro Glu Ile Asn Pro
65                  70                  75                  80

Glu Gly Phe Cys Ile Leu Leu Asp Phe Met Tyr Thr Ser Arg Leu Asn
                85                  90                  95

Leu Arg Glu Gly Asn Ile Met Ala Val Met Ala Thr Ala Met Tyr Leu
            100                 105                 110

Gln Met Glu His Val Val Asp Thr Cys Arg Lys Phe Ile Lys Ala Ser
        115                 120                 125

Glu Ala Glu Met Val Ser Ala Ile Lys Pro Pro Arg Glu Glu Phe Leu
    130                 135                 140

Asn Ser Arg Met Leu Met Pro Gln Asp Ile Met Ala Tyr Arg Gly Arg
145                 150                 155                 160

Glu Val Val Glu Asn Asn Leu Pro Leu Arg Ser Ala Pro Gly Cys Glu
                165                 170                 175
```

```
Ser Arg Ala Phe Ala Pro Ser Leu Tyr Ser Gly Leu Ser Thr Pro Pro
            180                 185                 190

Ala Ser Tyr Ser Met Tyr Ser His Leu Pro Val Ser Ser Leu Leu Phe
        195                 200                 205

Ser Asp Glu Glu Phe Arg Asp Val Arg Met Pro Val Ala Asn Pro Phe
210                 215                 220

Pro Lys Glu Arg Ala Leu Pro Cys Asp Ser Ala Arg Pro Val Pro Gly
225                 230                 235                 240

Glu Tyr Ser Arg Pro Thr Leu Glu Val Ser Pro Asn Val Cys His Ser
                245                 250                 255

Asn Ile Tyr Ser Pro Lys Glu Thr Ile Pro Glu Glu Ala Arg Ser Asp
            260                 265                 270

Met His Tyr Ser Val Ala Glu Gly Leu Lys Pro Ala Ala Pro Ser Ala
        275                 280                 285

Arg Asn Ala Pro Tyr Phe Pro Cys Asp Lys Ala Ser Lys Glu Glu Glu
        290                 295                 300

Arg Pro Ser Ser Glu Asp Glu Ile Ala Leu His Phe Glu Pro Pro Asn
305                 310                 315                 320

Ala Pro Leu Asn Arg Lys Gly Leu Val Ser Pro Gln Ser Pro Gln Lys
                325                 330                 335

Ser Asp Cys Gln Pro Asn Ser Pro Thr Glu Ser Cys Ser Ser Lys Asn
            340                 345                 350

Ala Cys Ile Leu Gln Ala Ser Gly Ser Pro Pro Ala Lys Ser Pro Thr
        355                 360                 365

Asp Pro Lys Ala Cys Asn Trp Lys Lys Tyr Lys Phe Ile Val Leu Asn
        370                 375                 380

Ser Leu Asn Gln Asn Ala Lys Pro Glu Gly Pro Glu Gln Ala Glu Leu
385                 390                 395                 400

Gly Arg Leu Ser Pro Arg Ala Tyr Thr Ala Pro Pro Ala Cys Gln Pro
                405                 410                 415

Pro Met Glu Pro Glu Asn Leu Asp Leu Gln Ser Pro Thr Lys Leu Ser
            420                 425                 430

Ala Ser Gly Glu Asp Ser Thr Ile Pro Gln Ala Ser Arg Leu Asn Asn
        435                 440                 445

Ile Val Asn Arg Ser Met Thr Gly Ser Pro Arg Ser Ser Ser Glu Ser
        450                 455                 460

His Ser Pro Leu Tyr Met His Pro Pro Lys Cys Thr Ser Cys Gly Ser
465                 470                 475                 480

Gln Ser Pro Gln His Ala Glu Met Cys Leu His Thr Ala Gly Pro Thr
                485                 490                 495

Phe Pro Glu Glu Met Gly Glu Thr Gln Ser Glu Tyr Ser Asp Ser Ser
            500                 505                 510

Cys Glu Asn Gly Ala Phe Phe Cys Asn Glu Cys Asp Cys Arg Phe Ser
        515                 520                 525

Glu Glu Ala Ser Leu Lys Arg His Thr Leu Gln Thr His Ser Asp Lys
        530                 535                 540

Pro Tyr Lys Cys Asp Arg Cys Gln Ala Ser Phe Arg Tyr Lys Gly Asn
545                 550                 555                 560

Leu Ala Ser His Lys Thr Val His Thr Gly Glu Lys Pro Tyr Arg Cys
                565                 570                 575

Asn Ile Cys Gly Ala Gln Phe Asn Arg Pro Ala Asn Leu Lys Thr His
            580                 585                 590
```

```
Thr Arg Ile His Ser Gly Glu Lys Pro Tyr Lys Cys Glu Thr Cys Gly
            595                 600                 605

Ala Arg Phe Val Gln Val Ala His Leu Arg Ala His Val Leu Ile His
        610                 615                 620

Thr Gly Glu Lys Pro Tyr Pro Cys Glu Ile Cys Gly Thr Arg Phe Arg
625                 630                 635                 640

His Leu Gln Thr Leu Lys Ser His Leu Arg Ile His Thr Gly Glu Lys
                645                 650                 655

Pro Tyr His Cys Glu Lys Cys Asn Leu His Phe Arg His Lys Ser Gln
            660                 665                 670

Leu Arg Leu His Leu Arg Gln Lys His Gly Ala Ile Thr Asn Thr Lys
        675                 680                 685

Val Gln Tyr Arg Val Ser Ala Thr Asp Leu Pro Pro Glu Leu Pro Lys
    690                 695                 700

Ala Cys Lys Glu Thr Ala Ala Lys Phe Glu Arg Gln His Met Asp
705                 710                 715                 720

Ser Ser Thr Ser Ala Ala
                725

<210> SEQ ID NO 32
<211> LENGTH: 3693
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 32
atgcgaccct ccgggacggc cggggcagcg ctcctggcgc tgctggctgc gctctgcccg      60
gcgagtcggg ctctggagga aagaaagtt tgccaaggca cgagtaacaa gctcacgcag     120
ttgggcactt ttgaagatca tttttctcagc ctccagagga tgttcaataa ctgtgaggtg    180
gtccttggga atttgaaat tacctatgtg cagaggaatt atgatctttc cttcttaaag     240
accatccagg aggtggctgg ttatgtcctc attgccctca acacagtgga gcgaattcct     300
ttggaaaacc tgcagatcat cagaggaaat atgtactacg aaaattccta tgccttagca     360
gtcttatcta actatgatgc aaataaaacc ggactgaagg agctgcccat gagaaattta     420
caggaaatcc tgcatggcgc cgtgcggttc agcaacaacc ctgccctgtg caacgtggag     480
agcatccagt ggcgggacat agtcagcagt gactttctca gcaacatgtc gatggacttc     540
cagaaccacc tgggcagctg ccaaaagtgt gatccaagct gtcccaatgg agctgctgg     600 ggtgcaggag aggagaactg ccagaaactg accaaaatca tctgtgccca gcagtgctcc     660
gggcgctgcc gtggcaagtc ccccagtgac tgctgccaca accagtgtgc tgcaggctgc     720
acaggccccc gggagagcga ctgcctggtc tgccgcaaat tccgagacga agccacgtgc     780
aaggacacct gcccccact catgctctac aaccccacca gtaccagat ggatgtgaac     840 cccgagggca atacagcttt ggtgccacc tgcgtgaaga gtgtccccg taattatgtg     900 gtgacagatc acggctcgtg cgtccgagcc tgtggggccg acagctatga gatggagaa     960 gacggcgtcc gcaagtgtaa gaagtgcgaa gggccttgcc gcaaagtgtg taacggaata    1020
ggtattggtg aatttaaaga ctcactctcc ataaatgcta cgaatattaa acacttcaaa    1080
aactgcacct ccatcagtgg cgatctccac atcctgccgg tggcatttag gggtgactcc    1140
ttcacacata ctcctcctct ggatccacag gaactggata ttctgaaaac cgtaaaggaa    1200
atcacagggt ttttgctgat tcaggcttgg cctgaaaaca ggacggacct ccatgccttt    1260
```

```
gagaacctag aaatcatacg cggcaggacc aagcaacatg gtcagttttc tcttgcagtc   1320
gtcagcctga acataacatc cttgggatta cgctccctca aggagataag tgatggagat   1380
gtgataattt caggaaacaa aaatttgtgc tatgcaaata caataaactg gaaaaaactg   1440
tttgggacct ccggtcagaa aaccaaaatt ataagcaaca gaggtgaaaa cagctgcaag   1500
gccacaggcc aggtctgcca tgccttgtgc tcccccgagg gctgctgggg cccggagccc   1560
agggactgcg tctcttgccg gaatgtcagc cgaggcaggg aatgcgtgga caagtgcaac   1620
cttctggagg gtgagccaag ggagtttgtg gagaactctg agtgcataca gtgccaccca   1680
gagtgcctgc tcaggccat gaacatcacc tgcacaggac ggggaccaga caactgtatc   1740
cagtgtgccc actacattga cggcccccac tgcgtcaaga cctgcccggc aggagtcatg   1800
ggagaaaaca cacccctggt ctggaagtac gcagacgccg ccatgtgtg ccacctgtgc   1860 catccaaact gcacctacgg atgcactggg ccaggtcttg aaggctgtcc aacgaatggg   1920
cctaagatcc cgtccatcgc cactgggatg gtggggggccc tcctcttgct gctggtggtg   1980
gccctgggga tcggcctctt catgcgaagg cgccacatcg ttcggaagcg cacgctgcgg   2040
aggctgctgc aggagaggga gcttgtggag cctcttacac ccagtggaga agctcccaac   2100
caagctctct tgaggatctt gaaggaaact gaattcaaaa agatcaaagt gctgggctcc   2160
ggtgcgttcg gcacggtgta taagggactc tggatcccag aaggtgagaa agttaaaatt   2220
cccgtcgcta tcaaggaatt aagagaagca acatctccga aagccaacaa ggaaatcctc   2280
gatgaagcct acgtgatggc cagcgtggac aaccccacg tgtgccgcct gctgggcatc   2340
tgcctcacct ccaccgtgca gctcatcatg cagctcatgc ccttcggctg cctcctggac   2400
tatgtccggg aacacaaaga caatattggc tcccagtacc tgctcaactg gtgtgtgcag   2460
atcgcaaagg gcatgaacta cttggaggac cgtcgcttgg tgcaccgcga cctggcagcc   2520
aggaacgtac tggtgaaaac accgcagcat gtcaagatca cagattttgg gcgggccaaa   2580
ctgctgggtg cggaagagaa agaataccat gcagaaggag gcaaagtgcc tatcaagtgg   2640
atggcattgg aatcaatttt acacagaatc tatacccacc agagtgatgt ctggagctac   2700
ggggtgactg tttgggagtt gatgaccttt ggatccaagc catatgacgg aatccctgcc   2760
agcgagatct cctccatcct ggagaaagga gaacgcctcc ctcagccacc catatgtacc   2820
atcgatgtct acatgatcat ggtcaagtgc tggatgatag acgcagatag tcgcccaaag   2880
ttccgtgagt tgatcatcga attctccaaa atggcccgag accccagcg ctaccttgtc   2940 attcagggga tgaaagaat gcatttgcca agtcctacag actccaactt ctaccgtgcc   3000
ctgatggatg aagaagacat ggacgacgtg gtggatgccg acgagtacct catcccacag   3060
cagggcttct tcagcagccc ctccacgtca cggactcccc tcctgagctc tctgagtgca   3120
accagcaaca attccaccgt ggcttgcatt gatagaaatg ggctgcaaag ctgtcccatc   3180
aaggaagaca gcttcttgca gcgatacagc tcagacccca caggcgcctt gactgaggac   3240
agcatagacg acaccttcct cccagtgcct gaatacataa accagtccgt tcccaaaagg   3300
cccgctggct ctgtgcagaa tcctgtctat cacaatcagc ctctgaaccc cgcgcccagc   3360
agagacccac actaccagga ccccacagc actgcagtgg caaccccga gtatctcaac   3420 actgtccagc ccacctgtgt caacagcaca ttcgacagcc ctgcccactg ggcccagaaa   3480
ggcagccacc aaattagcct ggacaaccct gactaccagc aggacttctt tcccaaggaa   3540
gccaagccaa atggcatctt taagggctcc acagctgaaa atgcagaata cctaagggtc   3600
```

```
gcgccacaaa gcagtgaatt tattggagca aaggaaactg cagcagccaa gtttgagcgg      3660
cagcacatgg actccagcac ttccgctgcc tga                                   3693
```

<210> SEQ ID NO 33
<211> LENGTH: 1230
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 33

```
Met Arg Pro Ser Gly Thr Ala Gly Ala Ala Leu Leu Ala Leu Leu Ala
1               5                   10                  15

Ala Leu Cys Pro Ala Ser Arg Ala Leu Glu Glu Lys Lys Val Cys Gln
                20                  25                  30

Gly Thr Ser Asn Lys Leu Thr Gln Leu Gly Thr Phe Glu Asp His Phe
            35                  40                  45

Leu Ser Leu Gln Arg Met Phe Asn Asn Cys Glu Val Val Leu Gly Asn
        50                  55                  60

Leu Glu Ile Thr Tyr Val Gln Arg Asn Tyr Asp Leu Ser Phe Leu Lys
65                  70                  75                  80

Thr Ile Gln Glu Val Ala Gly Tyr Val Leu Ile Ala Leu Asn Thr Val
                85                  90                  95

Glu Arg Ile Pro Leu Glu Asn Leu Gln Ile Ile Arg Gly Asn Met Tyr
                100                 105                 110

Tyr Glu Asn Ser Tyr Ala Leu Ala Val Leu Ser Asn Tyr Asp Ala Asn
            115                 120                 125

Lys Thr Gly Leu Lys Glu Leu Pro Met Arg Asn Leu Gln Glu Ile Leu
130                 135                 140

His Gly Ala Val Arg Phe Ser Asn Asn Pro Ala Leu Cys Asn Val Glu
145                 150                 155                 160

Ser Ile Gln Trp Arg Asp Ile Val Ser Ser Asp Phe Leu Ser Asn Met
                165                 170                 175

Ser Met Asp Phe Gln Asn His Leu Gly Ser Cys Gln Lys Cys Asp Pro
                180                 185                 190

Ser Cys Pro Asn Gly Ser Cys Trp Gly Ala Gly Glu Glu Asn Cys Gln
            195                 200                 205

Lys Leu Thr Lys Ile Ile Cys Ala Gln Gln Cys Ser Gly Arg Cys Arg
        210                 215                 220

Gly Lys Ser Pro Ser Asp Cys Cys His Asn Gln Cys Ala Ala Gly Cys
225                 230                 235                 240

Thr Gly Pro Arg Glu Ser Asp Cys Leu Val Cys Arg Lys Phe Arg Asp
                245                 250                 255

Glu Ala Thr Cys Lys Asp Thr Cys Pro Pro Leu Met Leu Tyr Asn Pro
                260                 265                 270

Thr Thr Tyr Gln Met Asp Val Asn Pro Glu Gly Lys Tyr Ser Phe Gly
            275                 280                 285

Ala Thr Cys Val Lys Lys Cys Pro Arg Asn Tyr Val Val Thr Asp His
        290                 295                 300

Gly Ser Cys Val Arg Ala Cys Gly Ala Asp Ser Tyr Glu Met Glu Glu
305                 310                 315                 320

Asp Gly Val Arg Lys Cys Lys Lys Cys Glu Gly Pro Cys Arg Lys Val
                325                 330                 335

Cys Asn Gly Ile Gly Ile Gly Glu Phe Lys Asp Ser Leu Ser Ile Asn
```

```
                   340              345              350
Ala Thr Asn Ile Lys His Phe Lys Asn Cys Thr Ser Ile Ser Gly Asp
                355              360              365
Leu His Ile Leu Pro Val Ala Phe Arg Gly Asp Ser Phe Thr His Thr
    370              375              380
Pro Pro Leu Asp Pro Gln Glu Leu Asp Ile Leu Lys Thr Val Lys Glu
385              390              395              400
Ile Thr Gly Phe Leu Leu Ile Gln Ala Trp Pro Glu Asn Arg Thr Asp
                405              410              415
Leu His Ala Phe Glu Asn Leu Glu Ile Ile Arg Gly Arg Thr Lys Gln
                420              425              430
His Gly Gln Phe Ser Leu Ala Val Val Ser Leu Asn Ile Thr Ser Leu
                435              440              445
Gly Leu Arg Ser Leu Lys Glu Ile Ser Asp Gly Asp Val Ile Ile Ser
            450              455              460
Gly Asn Lys Asn Leu Cys Tyr Ala Asn Thr Ile Asn Trp Lys Lys Leu
465              470              475              480
Phe Gly Thr Ser Gly Gln Lys Thr Lys Ile Ile Ser Asn Arg Gly Glu
                485              490              495
Asn Ser Cys Lys Ala Thr Gly Gln Val Cys His Ala Leu Cys Ser Pro
                500              505              510
Glu Gly Cys Trp Gly Pro Glu Pro Arg Asp Cys Val Ser Cys Arg Asn
                515              520              525
Val Ser Arg Gly Arg Glu Cys Val Asp Lys Cys Asn Leu Leu Glu Gly
            530              535              540
Glu Pro Arg Glu Phe Val Glu Asn Ser Glu Cys Ile Gln Cys His Pro
545              550              555              560
Glu Cys Leu Pro Gln Ala Met Asn Ile Thr Cys Thr Gly Arg Gly Pro
                565              570              575
Asp Asn Cys Ile Gln Cys Ala His Tyr Ile Asp Gly Pro His Cys Val
            580              585              590
Lys Thr Cys Pro Ala Gly Val Met Gly Glu Asn Asn Thr Leu Val Trp
        595              600              605
Lys Tyr Ala Asp Ala Gly His Val Cys His Leu Cys His Pro Asn Cys
    610              615              620
Thr Tyr Gly Cys Thr Gly Pro Gly Leu Glu Gly Cys Pro Thr Asn Gly
625              630              635              640
Pro Lys Ile Pro Ser Ile Ala Thr Gly Met Val Gly Ala Leu Leu Leu
                645              650              655
Leu Leu Val Val Ala Leu Gly Ile Gly Leu Phe Met Arg Arg Arg His
            660              665              670
Ile Val Arg Lys Arg Thr Leu Arg Arg Leu Leu Gln Glu Arg Glu Leu
            675              680              685
Val Glu Pro Leu Thr Pro Ser Gly Glu Ala Pro Asn Gln Ala Leu Leu
        690              695              700
Arg Ile Leu Lys Glu Thr Glu Phe Lys Lys Ile Lys Val Leu Gly Ser
705              710              715              720
Gly Ala Phe Gly Thr Val Tyr Lys Gly Leu Trp Ile Pro Glu Gly Glu
                725              730              735
Lys Val Lys Ile Pro Val Ala Ile Lys Glu Leu Arg Glu Ala Thr Ser
                740              745              750
Pro Lys Ala Asn Lys Glu Ile Leu Asp Glu Ala Tyr Val Met Ala Ser
            755              760              765
```

-continued

Val Asp Asn Pro His Val Cys Arg Leu Leu Gly Ile Cys Leu Thr Ser
        770             775                 780

Thr Val Gln Leu Ile Met Gln Leu Met Pro Phe Gly Cys Leu Leu Asp
785             790                 795                 800

Tyr Val Arg Glu His Lys Asp Asn Ile Gly Ser Gln Tyr Leu Leu Asn
                805                 810                 815

Trp Cys Val Gln Ile Ala Lys Gly Met Asn Tyr Leu Glu Asp Arg Arg
                820                 825                 830

Leu Val His Arg Asp Leu Ala Ala Arg Asn Val Leu Val Lys Thr Pro
            835                 840                 845

Gln His Val Lys Ile Thr Asp Phe Gly Arg Ala Lys Leu Leu Gly Ala
            850                 855                 860

Glu Glu Lys Glu Tyr His Ala Glu Gly Gly Lys Val Pro Ile Lys Trp
865                 870                 875                 880

Met Ala Leu Glu Ser Ile Leu His Arg Ile Tyr Thr His Gln Ser Asp
                885                 890                 895

Val Trp Ser Tyr Gly Val Thr Val Trp Glu Leu Met Thr Phe Gly Ser
                900                 905                 910

Lys Pro Tyr Asp Gly Ile Pro Ala Ser Glu Ile Ser Ser Ile Leu Glu
                915                 920                 925

Lys Gly Glu Arg Leu Pro Gln Pro Pro Ile Cys Thr Ile Asp Val Tyr
            930                 935                 940

Met Ile Met Val Lys Cys Trp Met Ile Asp Ala Asp Ser Arg Pro Lys
945                 950                 955                 960

Phe Arg Glu Leu Ile Ile Glu Phe Ser Lys Met Ala Arg Asp Pro Gln
                965                 970                 975

Arg Tyr Leu Val Ile Gln Gly Asp Glu Arg Met His Leu Pro Ser Pro
            980                 985                 990

Thr Asp Ser Asn Phe Tyr Arg Ala Leu Met Asp Glu Glu Asp Met Asp
            995                 1000                1005

Asp Val Val Asp Ala Asp Glu Tyr Leu Ile Pro Gln Gln Gly Phe
    1010                1015                1020

Phe Ser Ser Pro Ser Thr Ser Arg Thr Pro Leu Leu Ser Ser Leu
    1025                1030                1035

Ser Ala Thr Ser Asn Asn Ser Thr Val Ala Cys Ile Asp Arg Asn
    1040                1045                1050

Gly Leu Gln Ser Cys Pro Ile Lys Glu Asp Ser Phe Leu Gln Arg
    1055                1060                1065

Tyr Ser Ser Asp Pro Thr Gly Ala Leu Thr Glu Asp Ser Ile Asp
    1070                1075                1080

Asp Thr Phe Leu Pro Val Pro Glu Tyr Ile Asn Gln Ser Val Pro
    1085                1090                1095

Lys Arg Pro Ala Gly Ser Val Gln Asn Pro Val Tyr His Asn Gln
    1100                1105                1110

Pro Leu Asn Pro Ala Pro Ser Arg Asp Pro His Tyr Gln Asp Pro
    1115                1120                1125

His Ser Thr Ala Val Gly Asn Pro Glu Tyr Leu Asn Thr Val Gln
    1130                1135                1140

Pro Thr Cys Val Asn Ser Thr Phe Asp Ser Pro Ala His Trp Ala
    1145                1150                1155

Gln Lys Gly Ser His Gln Ile Ser Leu Asp Asn Pro Asp Tyr Gln
    1160                1165                1170

| | | | | | | | | | | |
|---|---|---|---|---|---|---|---|---|---|---|
| Gln | Asp 1175 | Phe | Phe | Pro | Lys 1180 | Glu | Ala | Lys | Pro | Asn Gly 1185 Ile Phe Lys |
| Gly | Ser 1190 | Thr | Ala | Glu | Asn 1195 | Ala | Glu | Tyr | Leu | Arg Val 1200 Ala Pro Gln |
| Ser | Ser 1205 | Glu | Phe | Ile | Gly 1210 | Ala | Lys | Glu | Thr | Ala Ala 1215 Ala Lys Phe |
| Glu | Arg 1220 | Gln | His | Met | Asp 1225 | Ser | Ser | Thr | Ser | Ala Ala 1230 |

```
<210> SEQ ID NO 34
<211> LENGTH: 6
<212> TYPE: PRT
<213> ORGANISM: Artificial Sequence
<220> FEATURE:
<223> OTHER INFORMATION: Description of Artificial Sequence: Synthetic
      6xHis tag

<400> SEQUENCE: 34

His His His His His His
1               5
```

HIGH THROUGHPUT DRUG SCREENING METHODS

RELATED PATENT APPLICATION

This patent application claims the benefit of Provisional Patent Application No. 63/114,927, filed on Nov. 17, 2020, the entire content of which is incorporated herein by reference, including all text, tables and drawings.

SEQUENCE LISTING

The instant application contains a Sequence Listing which has been submitted electronically in ASCII format and is hereby incorporated by reference in its entirety. Said ASCII copy, created on Nov. 17, 2021, is named "062554-0562957_SL_ST25.txt" and is 43,786 bytes in size.

FIELD OF THE INVENTION

Embodiments of the invention relate to novel high-throughput screening methods for detection and identification of test compounds that interact with, or bind to, a target polypeptide of interest. Methods presented herein are relatively fast, and are amenable to automation and multiplexing.

SUMMARY

Methods provided herein are based, in part, on a modified type of enzyme complementation assay that requires the assembly of two components, a nuclease acceptor and a nuclease donor, that can assemble into a functional nuclease complex capable of cleaving a labeled nucleic acid substrate. The nuclease acceptor is provided as a fusion protein comprising the nuclease acceptor (e.g., an S-tag acceptor peptide) and a target polypeptide of interest (e.g., a viral coat protein). The assay is conducted, in certain embodiments, in the presence of a test compound and a denaturant (e.g., heat) that denatures the fusion protein and prevents assembly of an active nuclease complex. If a test compound interacts with and/or binds to the target polypeptide and inhibits denaturation of the fusion protein, an active nuclease complex is formed and cleavage of the labeled substrate can be detected, thereby identifying a potential drug candidate (i.e., a test compound) that interacts with the target polypeptide (e.g., a viral coat protein).

In some aspects, presented herein is a method of determining if a test compound can interact with a target polypeptide, the method comprising (a) contacting a fusion protein with (i) a test compound, (ii) a denaturant, (iii) a nuclease donor, and (iv) a nucleic acid substrate; and (b) detecting an amount of a cleavage product produced from the nucleic acid substrate, or an amount of non-cleaved (uncleaved) substrate remaining from the cleavage reaction.

In certain embodiments, the contacting of (a) comprises contacting a cell, or a lysate derived from the cell, with (i) the test compound, (ii) the denaturant, (iii) the nuclease donor, and/or (iv) the nucleic acid substrate, wherein the cell or the cell lysate comprises the fusion protein. In some embodiments, the nucleic acid substrate comprises a pair of FRET labels. In some embodiments, the amount of the cleavage product comprises detecting an amount of a fluorescence signal emitted from the cleavage product and obtaining data points, and the fluorescence signal allows for the identification of a target saturation dose, the apparent equilibrium dissociation constant ($K_D$), the half maximal effective concentration (EC50) of target engagement, between the target polypeptide and the test compound.

In some aspects, presented herein is a high-throughput assay comprising conducting any of the method presented herein, in a plurality of vessels, wherein each vessel comprises the fusion protein. In some embodiments, each vessel comprises a different fusion protein. In some embodiments, the plurality of vessels comprises at least 96, at least 384, or at least 1536 vessels.

In some aspects, presented herein is a kit comprising a plurality of vessels, the first vessel comprising a fusion protein, the second vessel comprising a nuclease donor, and the third vessel comprising a nucleic acid substrate.

Certain aspects of the technology are described further in the following description, examples, claims and drawings.

BRIEF DESCRIPTION OF THE DRAWINGS

The drawings illustrate embodiments of the technology and are not limiting. For clarity and ease of illustration, the drawings are not made to scale and, in some instances, various aspects may be shown exaggerated or enlarged to facilitate an understanding of particular embodiments.

FIG. 19 shows an exemplary strategy for screening an array of pathogen proteins derived from, for example, a coronavirus. Microfluidic chips are another embodiment of an array designed for faster signal development and high-content drug screening.

FIG. 23A shows that EGFR micro-tagged protein in thermal challenge identified a temperature of maximum signal ($T_{max}$) of 59° C. FIG. 23B shows MTH1 micro-tagged protein in thermal challenge identified a temperature of aggregation ($T_{agg}$) of 55° C. FIG. 23C shows BCL6 micro-tagged protein in thermal challenge identified a temperature of minimum signal ($T_{min}$) of 46.5° C.

FIG. 26A shows examination, after 15 minutes, of the reaction shown in FIG. 25A to identify the target saturation dose. FIG. 26B shows that removing the data points above the saturating dose allowed Sigmoidal Dose-response curve fitting to identify the EC50 of Target Engagement that is the same as that identified at the early time point (in FIGS. 25A-25C). FIG. 26C shows that the observable fluorescence signal data could also be fit to a Saturation Binding Equation (One-site total) using GraphPad Prism to identify an Apparent Equilibrium Dissociation Constant (apparent $K_D$) for the drug binding to the protein target.

FIG. 27A shows a kinetic trace showing fluorescence over time for each concentration of inhibitor tested. FIG. 27B shows that, at higher drug concentrations, the later time point (5 min) had lower signal than the early time point (0 min, first detection at start of the kinetic trace). This decreased signal at higher concentrations of drug resulted in a bell-shaped curve. FIG. 27C shows a bell-shaped curve identifying the saturating concentration of drug (target saturation dose) that gave maximum effect (Emax). FIG. 27D shows that EC50 of target engagement could be determined from fitting a Sigmoidal-Dose Response curve to the early time point data. FIG. 27E shows that a saturation binding curve can be generated from the identification of the target saturation dose, and that a non-linear regression analysis of curve fitting could identify an apparent equilibrium dissociation constant $K_D$. The EC50 of Target Engagement and Apparent $K_D$ were identical, demonstrating that the fluorescence readout was directly proportional to drug binding and could be used to determine apparent affinity binding constants.

FIG. 28A shows EC50 of target engagement from fluorescence detection after 2 minutes of the enzyme complementation reaction after the MTH1 micro-tagged protein (MTH1-3aa-S-tag fusion protein) was heated at 55° C. in the presence of increasing concentrations of the inhibitor (S)-Crizotinib. FIG. 28B shows fluorescence detection of the reaction after 10 minutes and bell-shaped curve fitting to identify target saturation does and Emax. FIG. 28C shows saturation binding curve fitting (One Site-Total) using GraphPad Prism to determine the apparent $K_D$.

in FIG. 29A, cell lysates were exposed to UV-B for the indicated times and the aggregated and insoluble fraction was removed by centrifugation. Shown is an immunoblot for the proteins GSK3beta and Actin. Both proteins denatured and became insoluble after increased exposure to UV-B. In FIG. 29B, in the presence of the GSK3beta inhibitor (CHIR99021), target engagement was represented by the stabilization of the GSK3beta protein when the lysates were exposed to UV-B for 4 min. The non-specific control, GAPDH, was not stabilized from UV-B induced denaturation by the GSK3beta specific inhibitor.

DETAILED DESCRIPTION

Provided herein, in some embodiments, is a target-independent platform for monitoring drug-target engagement within cells. In some embodiments, the platform utilizes a modification of a cellular-thermal shift assay (CTSA) based on a premise that upon heating, a protein will begin to unfold, denature, and form insoluble aggregates as buried hydrophobic sites become exposed. The average, mean or absolute temperature at which protein melting and aggregation occurs is often described as a $T_{agg}$ (or $T_m$). Heat-induced aggregation is sometimes altered by a small molecule that can indirectly interact with, or directly bind to a polypeptide causing a detectable shift in the $T_{agg}$ (referred to as thermal shift). For some CTSA assays, the insoluble aggregated proteins are removed by centrifugation and soluble proteins that are stabilized by interaction or binding of a small molecule remain within the soluble fraction. An amount of the remaining soluble protein can be determined by various protein detection methods such as Western blotting. Such methods are often time consuming, expensive and tedious; require special training to conduct; and are therefore not amenable to high throughput drug screening methods. High throughput drug discovery requires a quick and inexpensive method that can be used to screen large numbers of chemical compounds in a relatively short amount of time to identify new drug candidates.

Figure 1:
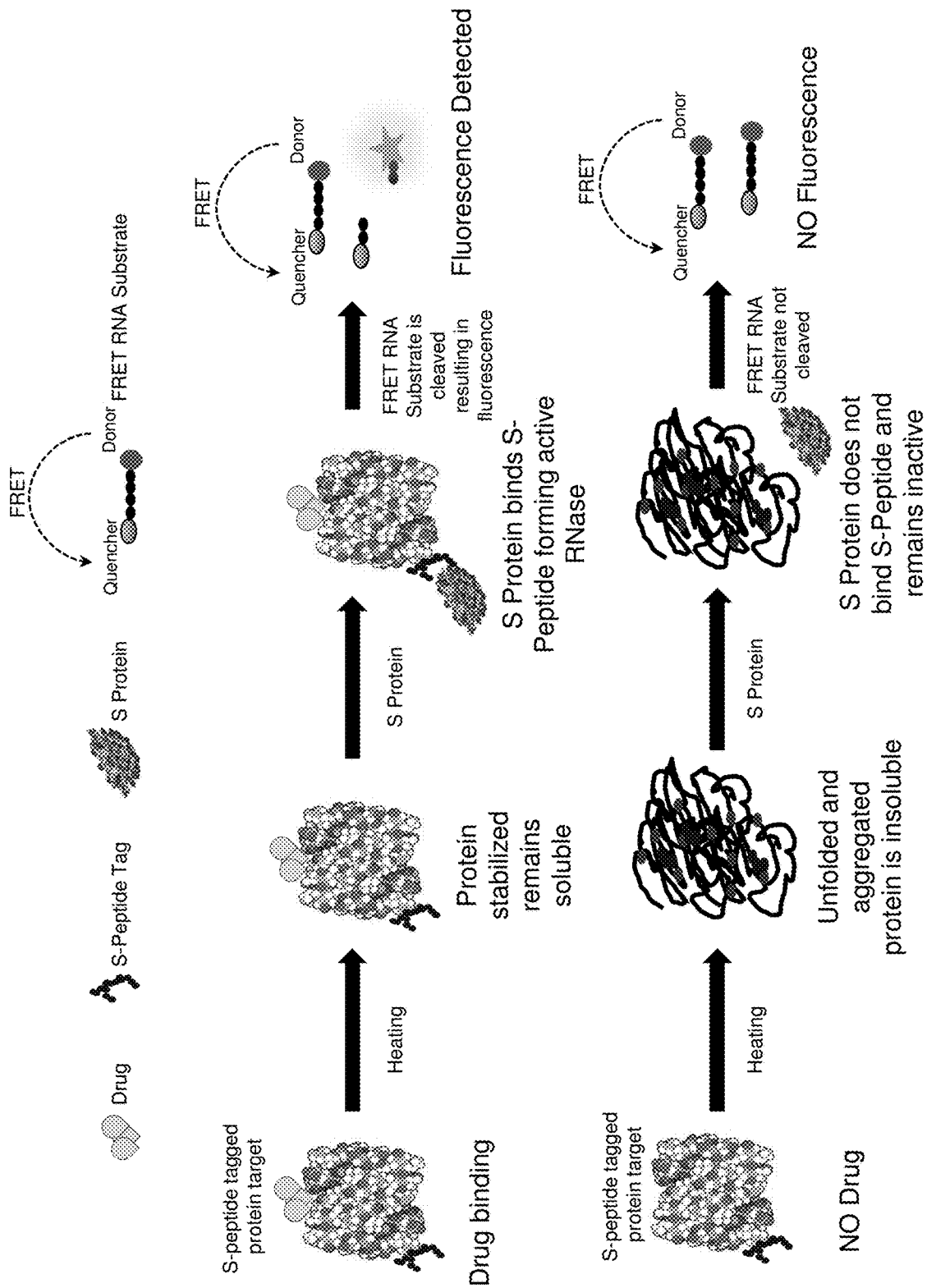
FIG. 1 shows a schematic illustration of an embodiment of an S-tag complementation strategy.

Provided herein is a modified enzyme complementation assay that can be used for high throughput screening of compounds that stabilize selected target polypeptides when exposed to heat (e.g., CTSA) or another denaturant (e.g., ultraviolet light, microwaves, radiation or chemical denaturants). The modified enzyme complementation assay utilized herein is based, in part, on assembly of (i) a nuclease donor and (ii) a nuclease acceptor that, when assembled, form a functional nuclease complex that is capable of cleaving a small nucleic acid substrate flanked by a pair of FRET labels (e.g., a FRET labeled nucleic acid substrate). In some embodiments, the modified enzyme complementation assay utilized herein is based, in part, on assembly of (i) a ribonuclease (RNase) donor and (ii) an S-tag acceptor peptide that, when assembled, form a functional RNase enzyme complex that is capable of cleaving a nucleic acid substrate flanked by a pair of FRET labels (e.g., a FRET-labeled DNA/RNA substrate). The assay is monitored by detection of the presence or amount of the cleaved nucleic acid FRET-labeled substrate (FIG. 1), which provides a detectable signal when cleaved. The S-tag acceptor peptide is provided as a fusion protein comprising the S-tag acceptor peptide and a target polypeptide of interest. If the target polypeptide is denatured and aggregates due to the presence of a denaturant, the S-tag acceptor peptide portion of the aggregated fusion protein is unable to associate with the RNase acceptor. Therefore, when the target polypeptide denatures, an active RNase complex is not formed and no cleavage product is detected. If a test compound interacts with the target polypeptide and due to that interaction, prevents denaturation of the target polypeptide, a functional RNase enzyme complex is formed and cleavage of the FRET-labeled DNA/RNA substrate is detected. Using this method, test compounds can be identified that interact with a target polypeptide of interest, such as a protein of a pathogen, to identify drug candidates, for example. The assay methods presented herein can be used as high-throughput platforms to screen a library of test compounds in a fast and efficient manner.

In some embodiments, the fusion protein of the assay can be expressed by a cell using a suitable method. The cell comprising the fusion protein can then be contacted with a test compound in the presence of a denaturant (e.g., heat) to determine if the test compound can prevent denaturation of the target polypeptide. There are many advantages of the assay methods presented herein compared to traditional screening methods. For example, (i) the assay methods herein are very rapid such that a cleaved FRET-labeled DNA/RNA substrate can be detected with seconds to minutes, (ii) the S-tag acceptor peptide is relatively small and, as determined herein, does not interfere with denaturation of the larger target polypeptide portion of the fusion protein, (iii) the assay eliminates the need to perform Western blot analysis, (iv) the assay is relatively inexpensive, (v) the assay can be implemented as a multiplex assay to screen hundreds or even thousands of test compounds, (vi) the assay can be monitored in real time, (vii) the assay design and real time monitoring can provide quantitative measures of drug binding to the target polypeptide, and (viii) the assay is amenable to automation.

Fusion Proteins

In some embodiments, the method comprises contacting a fusion protein with one or more of a test compound, a denaturant, a nuclease donor, and a nucleic acid substrate. In some embodiments, the method comprises contacting a fusion protein with one or more of a test compound, a denaturant, an RNase donor and a nucleic acid substrate flanked by a pair of FRET labels (e.g., a FRET-labeled RNA substrate). In certain embodiments, a fusion protein comprises a target polypeptide and a nuclease acceptor. In some embodiments, the nuclease acceptor is an S-tag acceptor domain. In some embodiments, a fusion protein comprises a target polypeptide and an S-tag acceptor peptide.

A fusion protein may comprise one or more or two or more nuclease acceptors. In some embodiments, the fusion protein nay comprise one or more or two or more S-tags. Any suitable target polypeptide of interest can be used for a method herein. A target polypeptide and nuclease acceptor (e.g., an S-tag acceptor peptide) can be attached by a suitable covalent bond or linker. Non-limiting examples of linkers include one or more amino acids, peptide linkers, alkanes, PEG, an optionally substituted C1-C50 alkyl, optionally substituted C2-C50 alkenyl, alkynyl, acyl, acyloxy, alkoxy, aryloxy, cycloalkyl, cycloalkenyl, cycloalkoxy, aryl, aminocarbonyl, azido, carboxy, silanes, thiols, sulfoxide, sulfones, sulfonate ester, cyano, amide, amino, ester, phosphonic acid, other suitable polymers, derivatives thereof, the like and combinations thereof. In some embodiments, a linker comprises a peptide comprising two or more amino acids, 2 to 100 amino acids, 5 to 100 amino acids, 2 to 50 amino acids, 5 to 50 amino acids, 2 to 25 amino acids. 5 to 25 amino acids, 2 to 20 amino acids, 5 to 20 amino acids, 2 to 10 amino acids or 5 to 10 amino acids. In some embodiments, a linker comprises a peptide of 1 to 20, 1 to 10, or 1 to 5 amino acids. In some embodiments, a fusion protein is assembled by attaching a target polypeptide to a nuclease acceptor (e.g., an S-tag acceptor peptide), for example by use of a suitable linking chemistry. In some embodiments, a fusion protein is expressed using a suitable expression system, as a single contiguous polypeptide comprising the a nuclease acceptor (e.g., an S-tag acceptor peptide) and the target polypeptide. In sore embodiments, a target polypeptide is attached to the C-terminus of a nuclease acceptor (e.g. an S-tag acceptor peptide). In some embodiments, a target polypeptide is attached to the N-terminus of a nuclease acceptor (e.g., an S-tag acceptor peptide).

In some embodiments, the fusion protein comprises a target polypeptide and a nuclease acceptor. In some embodiments, the fusion protein comprises a target polypeptide and a nuclease. In some embodiments, the fusion protein comprises a target polypeptide, an N-terminal domain of a nuclease and a first domain allowing for dimerization of the N-terminal domain to a C-terminal domain of the same nuclease fused to a second domain complementary to the domain allowing for dimerization. In some embodiments, the nuclease acceptor is an S-tag donor peptide and the nuclease is an S protein. In some embodiments, a split-Cas9 system is designed where the nuclease domain and the helical domain are cloned and expressed independently, then complemented in a controlled reaction. This enables a more controlled nuclease activity of the Cas9 enzyme. Either of these domains or their sub-domains, can be fused with a target polypeptide, then complemented with the rest of the enzyme in a cellular target engagement system (Wright A V et al. "Rational design of a split-Cas9 enzyme complex." Proceedings of the National Academy of Sciences of the United States of America vol. 112,10 (2015): 2984-9. doi: 10.1073/pnas.1501698112). In some embodiments, the nuclease is selected from the group consisting of Cas9, Micrococcal nuclease, RNase H, a non-natural nuclease hybrid such as Cas9-Fok1, and Cpf1/Cas12a. In some embodiments, the nuclease is Cas9, the first domain allowing for dimerization is Coh2, and the second domain is DocS. Coh2 and DocS are two *C. thermocellum* proteins that interact with high affinity. A Coh2-DocS complementation system can be designed where either of these proteins, or domains or sub-domains thereof, is fused with a target polypeptide, then complemented with the rest of the Coh2-DocS complex in a cellular target engagement system (Yu Y et al. Engineering a far-red light-activated split-Cas9 system for remote-controlled genome editing of internal organs and tumors. Sci Adv. 2020; 6(28):eabb1777. Published 2020 Jul. 10. doi:10.1126/sciadv.abb1777).

In some embodiments, the signal controller is any optional compound or excitant that may control the enzymatic activity of the complemented active enzyme, control the start of the target engagement reaction, control the speed of this reaction, and/or control the duration/maturity of the reaction. In some embodiments, the signal controller is an antibody, chemical, peptide, temperature, UV, microwave, or light. In some embodiments, the signal controller is far-red light. In some embodiments, binding of the Coh2 and DocS domains is enabled by a signal controller, wherein the signal controller is far-red light.

A fusion protein may comprise one or more linkers. In some embodiments, a fusion protein comprises one or more linkers between a target polypeptide and a nuclease acceptor domain. In some embodiments, a fusion protein comprises one or more linkers between a target polypeptide and a nuclease. In some embodiments, a fusion protein comprises one or more linkers between a target polypeptide and an N-terminal domain of a nuclease and a first domain allowing for dimerization of the N-terminal domain to a C-terminal domain of the same nuclease fused to a second domain complementary to the domain allowing for dimerization.

Nucleases

The methods herein rely, in part, on the assembly of a functional nuclease enzyme complex wherein an N-terminal domain of a first nuclease enzyme and a C-terminal domain of a second nuclease enzyme assemble to form an active enzyme complex capable of cleaving a nucleic acid substrate. The methods herein rely, in part, on the assembly of a functional RNase enzyme complex wherein an N-terminal domain of a first RNase enzyme and a C-terminal domain of a second RNase enzyme assemble to form an active enzyme complex capable of cleaving a FRET-labeled RNA or DNA/RNA substrate. In some embodiments, a suitable RNase has a domain structure such that (i) an N-terminal portion of the protein can be separated from a C-terminal portion of the protein, (ii) the isolated N-terminal and C-terminal portions are devoid of enzymatic activity, and (iii) the isolated N-terminal portion and isolated C-terminal portion of the RNase can self-assemble in a non-covalent manner to form a functional RNase enzyme. Non-limiting examples of a suitable RNase protein that can be used for a method herein includes bovine RNase A (accession AAB35594; UniprotKB P61823)); human RNase A (NCBI accession NP_002924.1); chimpanzee RNase A (NCBI accession XP_520673.1); canine RNase A (NCBI accession number XP_532618.2); mouse RNase A (NCBI accession number NP_035401.2); rat RNase A (NCBI accession number XP_223969.2); homologues thereof, the like, and derivatives thereof having RNase activity. In some embodiments, an RNase is bovine pancreatic RNase A (e.g., UniProtKB P61823) or derivative thereof, having the following sequence of the mature protein,

```
                                                    (SEQ ID NO: 21)
KETAAAKFERQHMDSSTSAASSSNYCNQMMKSRNLTKDRCKPVNTFVHES

LADVQAVCSQKNVACKNGQTNCYQSYSTMSITDCRETGSSKYPNCAYKTT

QANKHIIVACEGNPYVPVHFDASV,
``` where the underlined portion represents the S-tag peptide sequence of the protein.

In some embodiments, the nuclease is a ribonuclease or a deoxyribonuclease. In some embodiments, the nuclease is a ribonuclease. In some embodiments, the nuclease is a deoxyribonuclease.

In some embodiments, the nuclease is a sequence-specific nuclease. In some embodiments, the nuclease is a Clustered Regularly Interspaced Short Palindromic Repeats (CRISPR)-associated protein (i.e., a Cas protein). In some embodiments, the Cas protein is Cas9 (Csn1), Cas12a (Cpf1), Cas12b (C2c1), Cas13a (C2c2), Cas13b (C2c6) or Cas13c (C2c7). In some embodiments, the Cas protein is Cas9.

In some embodiments, the nuclease is a non-natural nuclease hybrid. In some embodiments, the non-natural nuclease hybrid is Cas9-Fok1.

In some embodiments, the nuclease is an RNase. In some embodiments, the RNase is an RNase A, RNase H, or RNase S.

In some embodiments, the nuclease is a Micrococcal nuclease.

Nuclease Donors

In some embodiments, a nuclease donor is a nuclease. In some embodiments, a nuclease donor comprises or consists of a C-terminal portion of a suitable nuclease. In some embodiments, a nuclease donor is an RNase donor. In some embodiments, an RNase donor comprises or consists of a C-terminal portion of a suitable RNase. In some embodiments, an RNase donor is an RNase S protein. In some embodiments, the RNase donor is an S protein of the RNase S complex. In some embodiments, the RNase S is a complex comprising two proteolytic fragments of RNase A. An RNase donor (e.g., an RNase S protein) can be made using a suitable method. In one non-limiting example, an RNase donor is made by treating an RNase A with subtilisin, which, under appropriate conditions, cleaves a single peptide bond of an RNase thereby providing an N-terminal portion (i.e., the S-peptide, e.g., about 15-25 amino acids) and a C-terminal portion (i.e., the S protein, e.g., about 90 to 120 amino acids). In another, non-limiting, example an RNase donor is made using recombinant technology such that the C-terminal (S protein) portion of an RNase is expressed using a suitable expression system. An isolated RNase donor is substantially devoid of enzymatic activity (e.g., RNase activity) until it contacts a suitable S-tag acceptor peptide.

In some embodiments, an RNase donor comprises an amino acid sequence having at least 80%, at least 85%, at least 90%, at least 91%, at least 92%, at least 93%, at least 94%, at least 95% or 100% identity to the amino acid sequence

```
                                                    (SEQ ID NO: 19)
MSSSNYCNQMMKSRNLTKDRCKPVNTFVHESLADVQAVCSQKNVACKNGQ

TNCYQSYSTMSITDCRETGSSKYPNCAYKTTQANKHIIVACEGNPYVPVH

FDASV
or
```

```
                                                    (SEQ ID NO: 20)
MSSSNYCNQMMKSRNLTKDRCKPVNTFVHESLADVQAVCSQKNVACKNGQ

TNCYQSYSTMSITDCRETGSSKYPNCAYKTTQANKHIIVACEGNPYVPVH

FD.
```

In some embodiments, an RNase donor comprises a polypeptide comprising at least 85, at least 90, at least 95, or at least 100 contiguous amino acids of the amino acid sequence of SEQ ID NO:19 or SEQ ID NO:20.

Derivatives of a nuclease donor may comprise conservative amino acid substitutions or amino acid analogues. In some embodiments, a nuclease donor comprises a suitable amino acid tag (e.g., a histidine tag, a flag tag, or the like). In some embodiments, derivatives of an RNase donor may comprise conservative amino acid substitutions or amino acid analogues. In some embodiments, a RNase donor comprises a suitable amino acid tag (e.g., a histidine tag, a flag tag, or the like).

Nuclease Acceptors

In some embodiments, a nuclease acceptor, or a nuclease acceptor domain, is a domain allowing for assembly of a functional nuclease enzyme complex wherein an N-terminal domain of a first nuclease and a C-terminal domain of a second, or the same first nuclease assemble to form an active enzyme complex capable of cleaving a nucleic acid substrate. In some embodiments, a nuclease acceptor is an acceptor peptide that comprises a suitable S-tag. A nuclease acceptor peptide often comprises or consists of a relatively small N-terminal portion of a nuclease protein. An S-tag acceptor peptide often comprises or consists of a relatively small N-terminal portion of an RNase protein. An S-tag peptide confers RNase enzymatic activity when it non-covalently associates with an RNase donor (e.g., an S Protein). Any suitable S-tag acceptor peptide and RNase donor combination can be used for a method herein. Various combinations of an S-tag acceptor peptide and an RNase donor can be readily tested for use in a method herein without requiring undue experimentation. Often an S-tag acceptor peptide derived from one species will associate with an RNase donor derived another species to form a functional enzyme complex. In some embodiments, derivatives of an S-tag peptide and/or derivatives of an RNase donor can be used for a method herein.

In some embodiments, the length of a nuclease acceptor peptide is in a range of 10 to 60 amino acids, 10 to 40 amino acids, 15 to 30 amino acids, 15 to 25 amino acids, 10 to 25 amino acids, or 8 to 25 amino acids. In some embodiments, a nuclease acceptor peptide comprises, consists of, or consists essentially of about 15 to 25 amino acids. In certain embodiments, a nuclease acceptor peptide has no detectable secondary structure. In certain embodiments, a nuclease acceptor peptide is highly soluble. In certain embodiments, a nuclease acceptor peptide has no net charge a neutral pH.

In some embodiments, the length of an S-tag acceptor peptide is in a range of 10 to 60 amino acids, 10 to 40 amino acids, 15 to 30 amino acids, 15 to 25 amino acids, 10 to 25 amino acids, or 8 to 25 amino acids. In some embodiments, an S-tag acceptor peptide comprises, consists of, or consists essentially of about 15 to 25 amino acids. In certain embodiments, an S-tag acceptor peptide has no detectable secondary structure. In certain embodiments, an S-tag acceptor peptide is highly soluble. In certain embodiments, an S-tag acceptor peptide has no net charge a neutral pH.

In some embodiments, an S-tag acceptor peptide comprises or consists of a peptide having an amino acid sequence having at least 80%, at least 85%, at least 90%, at least 91%, at least 92%, at least 93%, at least 94%, at least 95%, or 100% identity to an amino acid sequence selected from KETAAAKFERQHMDSSTSAA (SEQ ID NO.:1), KETNWAWFWDQHMDSSTSA (SEQ ID NO:2), KETGWALFVQQHMDSSTSA (SEQ ID NO:3), KETVMANFQMQHMDSSTSA (SEQ ID NO:4), KETGDAVFARQHMDSSTSA (SEQ ID NO:5), KETGWAAFVKQHMDSSTSA (SEQ ID NO:6), KETGWATFVEQHMDSSTSA (SEQ ID NO:7), KETKLAFFLKQHMDSSTSA (SEQ ID NO:8), KETWWAWFFGQHMDSSTSA (SEQ ID NO:9); KETTWAEFTWQHMDSSTSA (SEQ ID NO:10), KETPWASFNKQHMDSSTSA (SEQ ID NO:11), KETAMAMFVTQHMDSSTSA (SEQ ID NO:12), KETLWAWFMWQHMDSSTSA (SEQ ID NO:13), KETAAAKFERQHMDS (SEQ ID NO:14), KETAAAKFERQHMNS (SEQ ID NO:15), NRAWSEFLWQHLAPV (SEQ ID NO:16), NRGWSEFLWQHHAPV (SEQ ID NO:17) and NRAWSVFQWQHIAPA (SEQ ID NO:18), and derivatives thereof. In some embodiments, an S-tag acceptor peptide comprises a at least 10, at least 11, at least 12, at least 13, at least 14, or at least 15 contiguous amino acids of an amino acid sequence selected from SEQ ID NO.:1, SEQ ID NO:2, SEQ ID NO:3, SEQ ID NO:4, SEQ ID NO:5, SEQ ID NO:6, SEQ ID NO:7, SEQ ID NO:8, SEQ ID NO:9, SEQ ID NO:10, SEQ ID NO:11, SEQ ID NO:12, SEQ ID NO:13, SEQ ID NO:14, SEQ ID NO:15, SEQ ID NO:16, SEQ ID NO:17, and SEQ ID NO:18, and derivatives thereof. In some embodiments an S-tag acceptor peptide is an S-peptide discloses in Backer et al. (2002) Protein Expression and Purification 26:455-461; Dwyer et al. (2001) Biochemistry 40(45):13491-500; Kim and Raines (1993) Protein Science 2:348-356; and Beintema, J. J. (1987) Life Chem. Rep. 4:333-389, which are incorporated herein by reference. Derivatives of S-tag acceptor peptides may comprise conservative amino acid substitutions or amino acid analogues. In certain embodiments, S-tag acceptor peptides can be made and/or selected for using methods described in Yu and Smith (1996) Methods in Enzymology 267, 3-27; and Goldberg et al. (1999) PNAS 96:2019-2024.

Target Polypeptides

A fusion protein may comprise a suitable target polypeptide of interest. In some embodiments, a target polypeptide has a length in a range of 10 to 1000, 10 to 500, 10 to 250, 10 to 125 or 10 to 50 amino acids. In certain embodiments, a target polypeptide comprises a polypeptide, or portion thereof, derived from a suitable pathogen, non-limiting examples of which include a virus, a bacteria, a fungus, and a parasite. Non-limiting examples of a virus include a virus of the family Adenoviridae, Papovaviridae, Parvoviridae, Herpesviridae, Poxviridae, Anelloviridae, Pleolipoviridae, Reoviridae, Picornaviridae, Caliciviridae, Togaviridae, Arenaviridae, Flaviviridae, Orthomyxoviridae (e.g., Influenzavirus), Paramyxoviridae, Bunyaviridae, Rhabdoviridae, Filoviridae, Coronaviridae (e.g., SARS, SARS-CoV-2, MERS, HKU1), Astroviridae, Bornaviridae, Arteriviridae, Rotavirus and Hepeviridae. In certain embodiments, the virus is SARS-Cov2 coronavirus. In certain embodiments, the virus an influenza virus. In certain embodiments, the virus a Hepatitis A, B or C virus. In certain embodiments, the virus a Herpes virus. In some embodiments, the pathogen is a bacteria. In certain embodiments the bacteria is *Helicobacter pylori, Mycobacterium tuberculosis* or a *Mycobacterium*.

In some embodiments, a target polypeptide is modified. Non-limiting examples of a modification of a polypeptide include one or more amino acid substitutions, deletions or additions. For example, in some embodiments, a method herein is conducted as a multiplex or high-throughput assay using a plurality of vessels (e.g., microtiter wells) where each well comprises a different fusion protein, each fusion protein comprising a different target polypeptide. The different target polypeptides can be different proteins and/or modification of a target polypeptide. In one non-limiting example, the target polypeptide is a viral capsid protein (e.g., a spike protein of SARS-Cov2, or a haemagluttinin protein of influenza virus), and each of the vessels or microtiter wells includes a different modification of the viral capsid protein (e.g. random or computer-generated mutations).

In some embodiments, a target polypeptide is a naturally occurring polypeptide, or a portion thereof. In some embodiments, a target polypeptide is synthetic. In some embodiments, a target polypeptide is naturally produced or recombinantly produced. In some embodiments, a target polypeptide comprises a protein, or a portion of a protein, that is isolated, purified and/or recombinantly expressed as a soluble protein (e.g., isolated, purified or expressed as a soluble fusion protein). In some embodiments, a target polypeptide or fusion protein is expressed in or on a cell. In some embodiments, a target polypeptide or fusion protein is expressed on a surface of a cell. In certain embodiments, the cell is a suitable eukaryotic cell (e.g., a mammalian cell). In certain embodiments, the cell is a prokaryotic cell (e.g., a bacteria).

In some embodiments, the target polypeptide is mutT homolog 1 (MTH1). In some embodiments, the nuclease acceptor is an S-tag peptide. In some embodiments, there no linker between MTH1 and the S-tag peptide. In some embodiments, the amino acid sequence of a MTH1-S-tag construct is shown in SEQ ID NO:25.

Test Compounds

The methods herein can be used to screen any suitable test compound or library of test compounds.

As used herein, the phrase "test compound" refers to any suitable compound that can be screened for the ability to interact with, or bind to, a target polypeptide of interest using a method described herein. Non-limiting examples of a test compound include small compounds (e.g., small organic or inorganic molecules), large compounds (e.g., greater than 5000 Da), polysaccharides, carbohydrates, sugars, fatty acids, lipids, biological macromolecules, (e.g., peptides, polypeptides, proteins, peptide analogs and derivatives, peptidomimetics, nucleic acids, nucleotides, nucleotide analogs), naturally occurring or synthetic compounds, binding agents (e.g., antibodies, or binding fragments thereof, including non-naturally occurring and synthetic binding agents (e.g., TandAbs, nanobodies, aptamers, BiTEs, SMIPs, DARPins, DNLs, affibodies, Duocalins, adnectins, fynomers, Kunitz Domains Albu-dabs, DARTs, DVD-IG, Covx-bodies, peptibodies, scFv-Igs, SVD-Igs, dAb-Igs, Knob-in-Holes, triomAbs, and the like), derivatives thereof, polymers thereof, salts thereof, isomers thereof, polymorphs thereof, and combinations thereof. In some embodiments, a test compound is contained within an extract made from biological materials such as extracts of bacteria, plants, fungi, animal cells, or animal tissues. In some embodiments, a test compound is contained within a biological fluid. Accordingly, in some embodiments, a test compound comprises an extract or biological fluid. Small compounds include molecules having a molecular weight greater than about 40 daltons (Da), but less than 5000 Da, less than 3000 Da, or less than 1000 Da. Small compounds may comprise any suitable chemical moiety or group, non-limiting examples of which include alkanes, alkenes, alkynes, alcohols, halogens, ketones, aldehydes, carboxylic acids, ethers, esters, amines, amides, saturated, partially saturated or unsaturated ring structures, nucleotides, nucleosides, polyatomic nonmetals (e.g., P, S, Se), transition metals, post-transition metals, metalloids, the like, salts thereof, and combinations thereof.

In certain embodiments, test compounds include synthetic or naturally occurring compounds of a suitable library. A multitude of small molecule libraries are known in the art, some of which are commercially available. Commercially available compound libraries can be obtained from, for example, ArQule, Pharmacopia, graffinity, Panvera, Vitas-M Lab, Biomol International and Oxford. Methods for developing small molecule, polymeric and genome based libraries are described, for example, in Ding, et al. J Am. Chem. Soc. 124: 1594-1596 (2002) and Lynn, et al., J. Am. Chem. Soc. 123: 8155-8156 (2001). Chemical compound libraries from, for example, NIH Roadmap, Molecular Libraries Screening Centers Network (MLSCN) can also be used. Any suitable method can be used to make a small compound library. A compound library can be screened using a suitable method described herein.

In certain embodiments, a test compound comprises a molecular weight of 40 to 500,000 Da, 40 to 200,000 Da, 40 to 100,000 Da, 40 to 50,000 Da, 40 to 25,000 Da, 40 to 10,000 Da, 40 to 5000 Da, or 40 to 1000 Da. In certain embodiments, a test compound comprises a molecular weight of 5000 to 500,000 Da, 10,000 to 500,000 Da, 25,000 to 500,000 Da, or 5000 to 100,000 Da.

A test compound can be tested at any suitable concentration. In some embodiments, a test compound is tested at a concentration of at least 1 pM, at least 10 pM, at least 100 pm, at least 1 nM, at least 10 nM, at least 100 nM, at least 1 µM, at least 10 µM, at least 100 µM or at least 1 mM. In some embodiments, a test compound is tested at a concentration in a range of 1 pM to 100 mM, 1 pM to 10 mM, 1 pM to 1 mM, 10 pM to 100 mM, 10 pM to 10 mM, 10 pM to 1 mM, 100 pM to 100 mM, 100 pM to 10 mM, or 100 pM to 1 mM. In some embodiments, a test compound is tested at a concentration of less than 100 mM, less than 10 mM, less than 1 mM or less than 100 nM. In some embodiments, a test compound is tested or assayed at one or more different concentrations.

Substrates

In some embodiments a fusion protein and/or a nuclease donor, or a mixture or cell comprising a fusion protein and a nuclease donor is contacted with suitable nucleic acid substrate. In some embodiments a fusion protein and/or an RNase donor, or a mixture or cell comprising a fusion protein and an RNase donor is contacted with suitable nucleic acid substrate. In some embodiments, a nucleic acid substrate is a nucleic acid that can be cleaved by a nuclease disclosed herein or by an assembled nuclease enzyme complex described herein. In some embodiments, a nucleic acid substrate is a nucleic acid that can be cleaved by an RNase disclosed herein or by an assembled RNase enzyme complex described herein (e.g., comprising an S-tag acceptor peptide and RNase donor). In some embodiments, a nucleic acid substrate comprises RNA and/or DNA. In some embodiments, a nucleic acid substrate comprises ribonucleotides, deoxyribonucleotides, analogues thereof or mixtures thereof. A nucleic acid substrate may be single stranded or double stranded. In certain embodiments, a nucleic acid substrate comprises 2 or more, 3 or more. 5 or more or 10 or more nucleotides. In certain embodiment, a nucleic acid substrate comprises at least 1 pyrimidine nucleotide. In certain embodiments, a nucleic acid substrate comprises at least 2, at least 3 or at least 4 adjacent pyrimidine nucleotides. In some embodiments, the fusion protein comprises a nuclease, or a nuclease acceptor domain in contact with a nuclease donor, wherein the nuclease or nuclease donor is a ribonuclease such as Cas9 or Cpf1. In some embodiments, the ribonuclease, e.g., Cas9 or Cpf1, is contacted with a guide RNA. In some embodiments, a guide RNA (gRNA) directs the ribonuclease to a target nucleic acid substrate.

In certain embodiments, a nucleic acid substrate comprises a suitable detectable label. In certain embodiments, a detectable label of a substrate provides a detectable signal, a change in a detectable signal (e.g., an increase or decrease in a signal, or a wavelength shift), or loss of a detectable signal upon cleavage of a labeled substrate by a nuclease (e.g., an RNase). In some embodiments, a detectable signal emitted from a label of a nucleic acid substrate is undetectable until after cleavage of the substrate. In some embodiments, a detectable signal emitted from a label of a nucleic acid substrate is enhanced after cleavage of the substrate. In certain embodiments, a detectable signal emitted from a label of a nucleic acid substrate is reduced after cleavage of the substrate.

Non-limiting examples of a detectable label include a metallic label, a fluorescent label, a fluorescent protein (e.g., green fluorescent protein (GFP)), a PH sensitive protein or PH sensitive GFP (e.g., a PHlourin, or the like), any suitable fluorophore (e.g., mCherry), a chromophore, a chemiluminescent label, an electro-chemiluminescent label (e.g., Origen™), a phosphorescent label, a quencher (e.g., a fluorophore quencher), a fluorescence resonance energy transfer (FRET) pair (e.g., donor and acceptor), a protein (e.g., an enzyme (e.g., horseradish peroxidase, 0-galactosidase, luciferase, alkaline phosphatase and the like)), an antigen or part thereof, a linker, a member of a binding pair), an enzyme substrate, a small molecule (e.g., biotin, avidin), a mass tag, quantum dots, nanoparticles, the like or combinations thereof. Any suitable fluorophore or light emitting material can be used as a detectable label. Non-limiting examples of a fluorescent label include fluorescein, rhodamine, Texas Red, phycoerythrin, allophycocyanin, 6-carboxyfluorescein (6-FAM), 2,7-dimethoxy-4',5'-dichloro-6-carboxyfluorescein (JOE), 6-carboxy-X-rhodamine (ROX), 6-carboxy-2',4',7,4,7-hexachlorofluorescein (HEX), 5-carboxyfluorescein (5-FAM) or N.N.N',N'-tetramethyl-6-carboxyrhodamine (TAMRA), cyanine dyes, such as Cy3, Cy5, Alexa 542, Bodipy 630/650, fluorescent particles, fluorescent semiconductor nanocrystals, the like, and combinations thereof. A detectable label can be detected and/or quantitated by a variety of suitable techniques such as, for example, digital photography, flow cytometry, gel electrophoresis, chip analysis (e.g., any chip methodology), microarray, mass spectrometry, cytofluorimetric analysis, fluorescence microscopy, confocal laser scanning microscopy, laser scanning cytometry, suitable plate readers, the like and combinations thereof.

Figure 2:
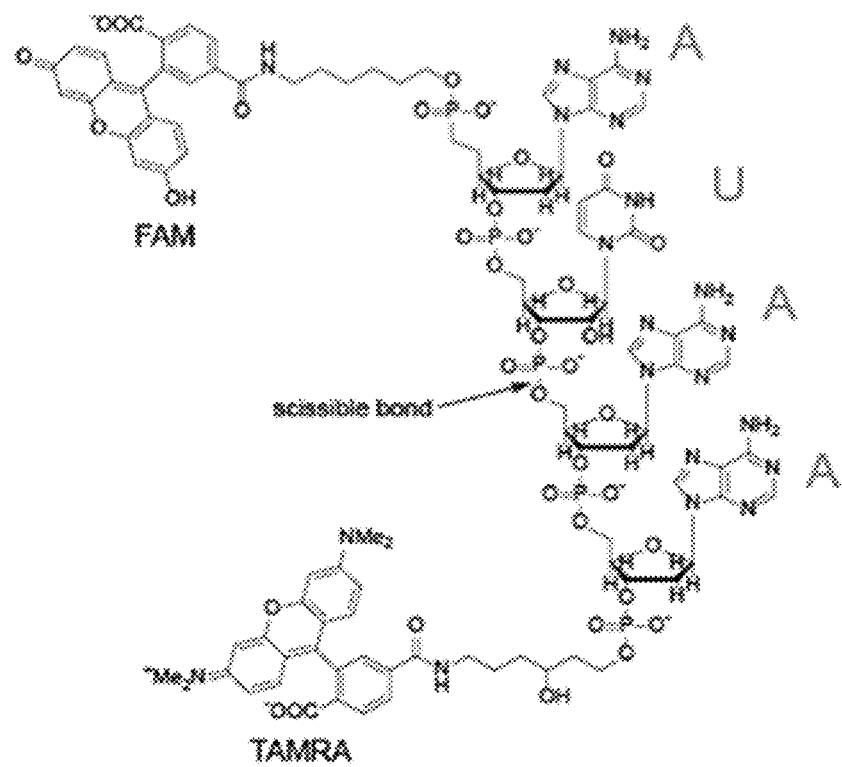
FIG. 2 shows a chemical structure of one embodiment of an optimized fluorogenic substrate, 6-FAM-dArUdAdA-6-TAMRA, where 6-FAM refers to 6-carboxyfluorescein and 6-TAMRA refers to 6-carboxy-tetramethylrhodamine. The "scissile bond" that is cleaved by active RNase S upon complementation with S-tag is identified.
Figure 3:
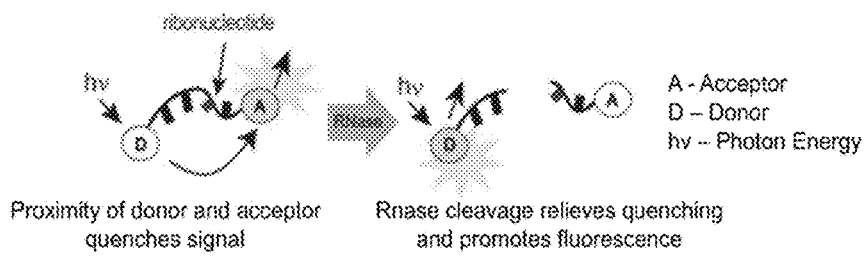
FIG. 3 shows a schematic illustration of fluorescence light emission as a result of cleavage of a fluorogenic substrate by active RNase S formed upon complementation of an S protein with an S-tag acceptor peptide. The figure shows the acceptor fluorochrome (A) and the donor fluorochrome (D) of a pair of FRET labels.

In some embodiments, a nucleic acid substrate comprises a suitable fluorescence energy transfer (FRET) label. One advantage of FRET-labeled nucleic acids is that they can readily enter an intact cell thereby allowing detection of cleavage of the substrate in whole cells. In certain embodiments, a nucleic acid substrate comprises a pair of FRET labels comprising a suitable fluorescent donor/acceptor pair separated by polynucleotide comprising an RNase cleavable sequence such that fluorescence emission of the donor is quenched until the substrate is cleaved by an assembled RNase complex. In certain embodiments a pair of FRET labels comprises 6-carboxyfluorescein (6-FAM) and 6-carboxy-tetramethylrhodamine (6-TAMRA) (FIG. 2) separated by two or more contiguous nucleotides. In some embodiments a nucleic acid substrate comprises (6-FAM)-X-(6-TAMRA), wherein X comprises a polynucleotide comprising 2 to 10 nucleotides. In some embodiments a nucleic acid substrate comprises 6-FAM-dArUdAdA-6-TAMRA (FIG. 2), where rU is uridine and dA is deoxyadenine.

In certain embodiments of a method described herein, an amount of cleavage of a substrate is determined using a suitable method. In certain embodiments the presence or absence of a cleavage product of a nucleic acid substrate is determined using a suitable method. In some embodiments, the presence, absence or amount of cleavage of a pair of FRET labels labeled nucleic acid substrate is determined using a suitable method. The presence, absence or amount of cleavage of a labeled nucleic acid substrate can be determined at a suitable time after contacting a cell or mixture with a nucleic acid substrate or nuclease donor. The presence, absence or amount of cleavage of a labeled nucleic acid substrate can be determined at a suitable time after contacting a cell or mixture with a nucleic acid substrate or RNase donor. In some embodiments, the presence, absence or amount of cleavage of a labeled nucleic acid substrate is determined dynamically over a period of time, for example to determine a rate of cleavage. A predetermined amount of a cleavage product can be determined using a suitable positive control. For example, a positive control may utilize a fusion protein comprising a known protein, and a test compound that is known to interact with and stabilize the known protein when exposed to a denaturant, thereby allowing complementation of the S-tag acceptor peptide with an RNase donor protein to form an active nuclease complex. The presence or amount of nucleic acid substrate cleaved by the active nuclease complex of the positive control can be used as a base line to detect other test compounds that interact with a target polypeptide.

Figure 11:
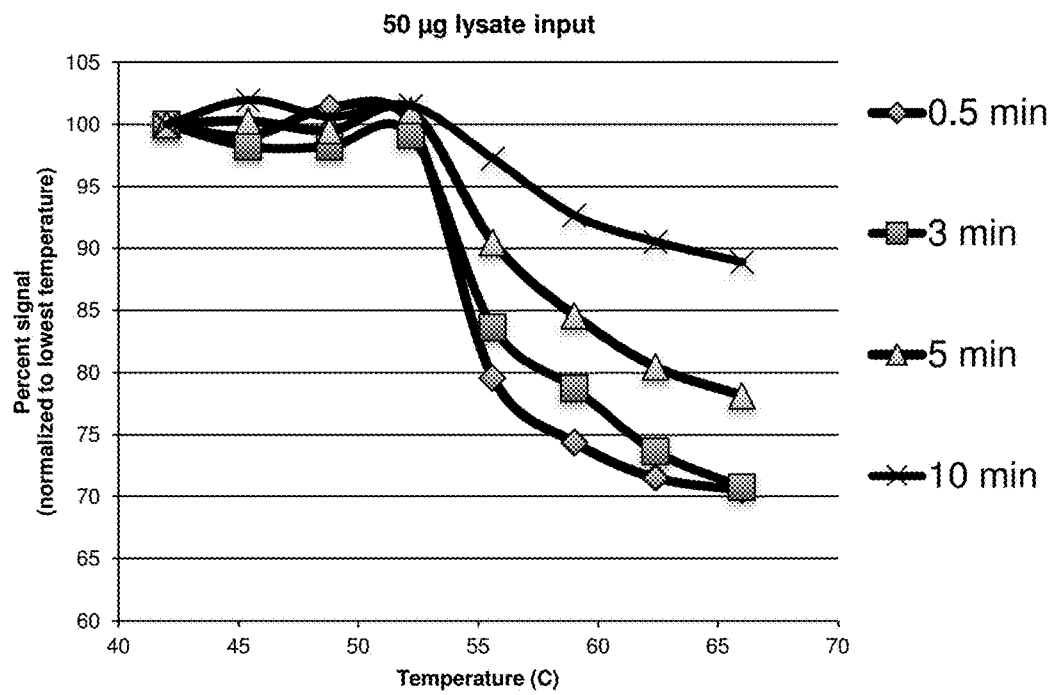
FIG. 11 shows the effect of incubation time (legend) on signal separation as a function of temperature (x-axis) with heating of 50 µg of cell lysates prepared from MTH1-3aa-S-tag expressing cells.
Figure 12:
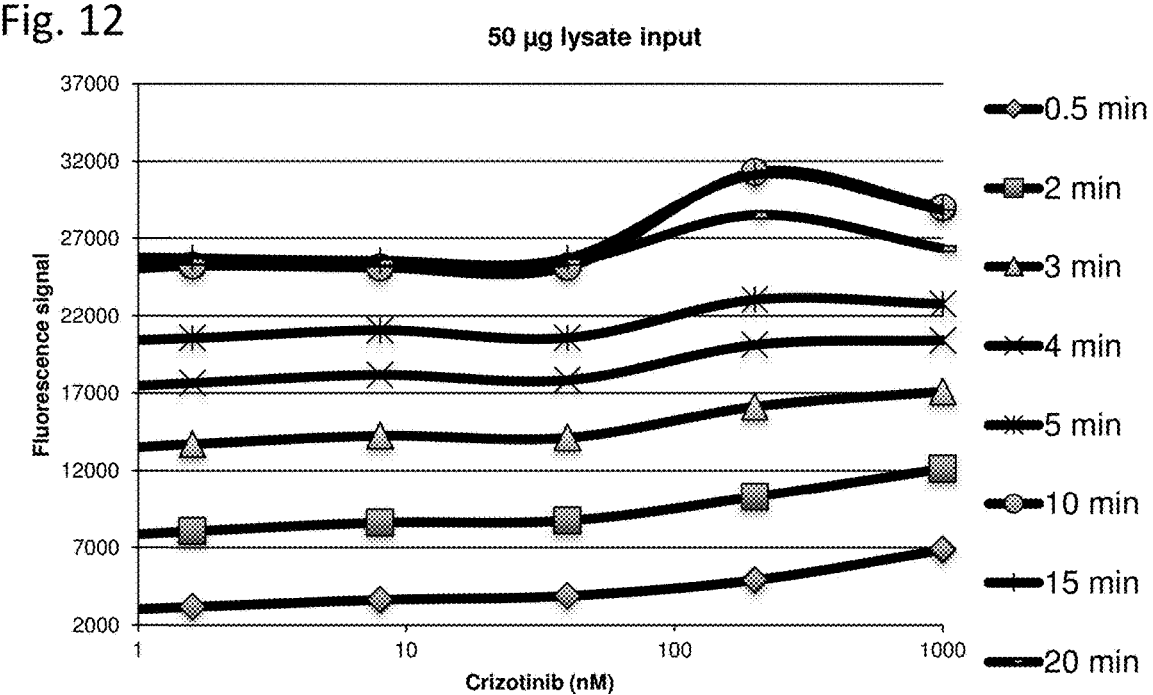
FIG. 12 shows the effect of incubation time (legend) on fluorescence signal (y-axis) as a function of Crizotinib (test compound and inhibitor of MTH1) concentration (x-axis) incubated with 50 µg of cell lysates prepared from MTH1-3aa-S-tag expressing cells.
Figure 13:
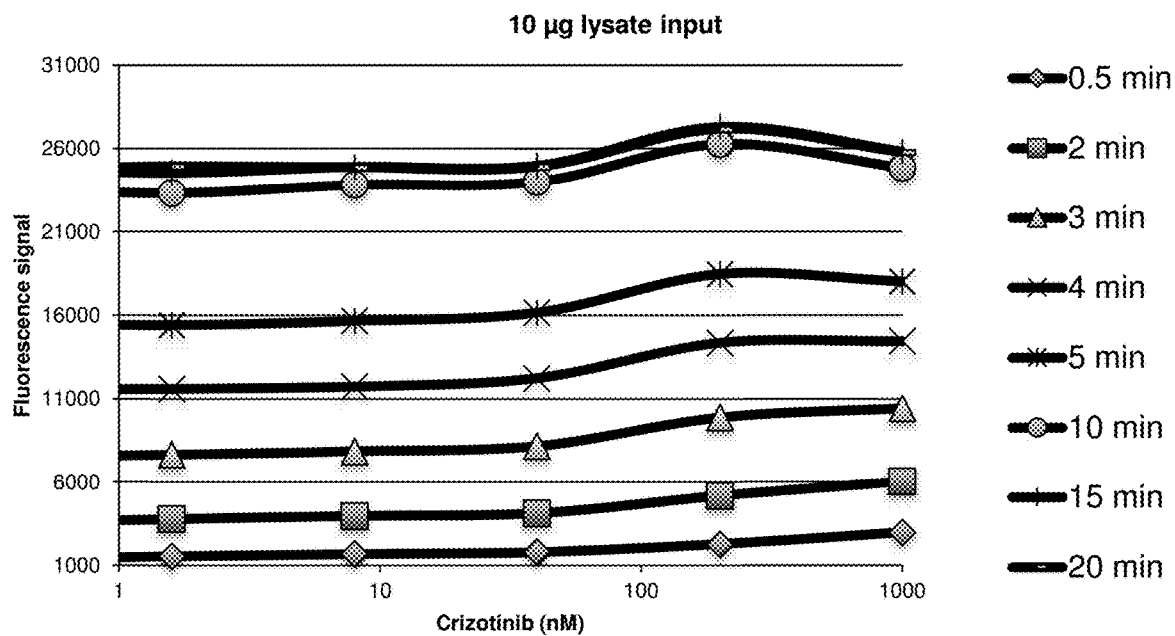
FIG. 13 shows the effect of incubation time (legend) on fluorescence signal (y-axis) as a function of Crizotinib (test compound and inhibitor of MTH1) concentration (x-axis) incubated with 10 µg of cell lysates prepared from MTH1-3aa-S-tag expressing cells.

Cleavage and detection of cleavage of a pair of FRET labels labeled nucleic acid substrate is very rapid (often requiring less than 30 seconds) (e.g., see FIGS. 11-13). Accordingly, in certain embodiments, FRET labeled substrates are used for high-throughput methods described herein and allow for automation of the methods described herein.

Denaturants

In some embodiments, a fusion protein is contacted with a denaturant. Non-limiting examples of a denaturant include (i) heat, (ii) ultraviolet light, (iii) microwaves, (iv) radiation and (iv) a chemical denaturant.

In certain embodiments, contacting a fusion protein with a denaturant comprises contacting a fusion protein, or a cell or mixture comprising a fusion protein, with heat. In some embodiments, a fusion protein is contacted with an amount of heat sufficient to denature and/or aggregate a fusion protein. In certain embodiments, contacting a fusion protein with heat comprises heating a fusion protein, or a cell or mixture comprising a fusion protein, to a temperature in a range of 40° C. and 90° C., 40° C. and 80° C., 40° C. and 75° C., 45° C. and 75° C., 50° C. and 75° C., or 55° C. and 70° C. In certain embodiments, contacting a fusion protein with heat comprises heating a fusion protein, or a cell or mixture comprising a fusion protein, to a temperature of at least 40° C., at least 50° C., at least 60° C., at least 65° C., or at least 70° C. In certain embodiments, contacting a fusion protein with heat comprises heating a fusion protein, or a cell or mixture comprising a fusion protein, from a temperature of about 30° C.-40° C. to a temperature of about 50° C. to 70° C. In certain embodiments, contacting a fusion protein with heat comprises exposing a fusion protein, or a cell or mixture comprising a fusion protein, to a temperature gradient in a range of 30° C. to 90° C., 30° C. to 80° C., 30° C. to 75° C., 37° C. to 75° C., 37° C. to 70° C. In some embodiments, contacting a fusion protein with a temperature gradient comprises increasing the temperature of a fusion protein, or a cell or mixture comprising a fusion protein, at a rate of at least about 1 to 10° C. per minute, or about 1 to 5° C. per minute. In some embodiments, contacting a fusion protein with heat comprises exposing a fusion protein, or a cell or mixture comprising a fusion protein, to heat, or an increasing temperature gradient for a period of time of at least 30 seconds, at least 1 minute, at least 3 minutes or at least 5 minutes.

In certain embodiments, a fusion protein is contacted with, or exposed to, a denaturant for period of time. In some embodiments, a fusion protein is contacted with, or exposed to a denaturant for a time period of at least 20 seconds, at least 30 seconds, at least 1 minute, at least 3 minutes, at least 5 minutes, at least 10 minutes, at least 15 minutes, at least 20 minutes, or at least 30 minutes.

In certain embodiments, contacting a fusion protein with a denaturant comprises subjecting a fusion protein, or a cell or mixture comprising a fusion protein, to one or more freeze-thaw cycles.

Figure 29A:
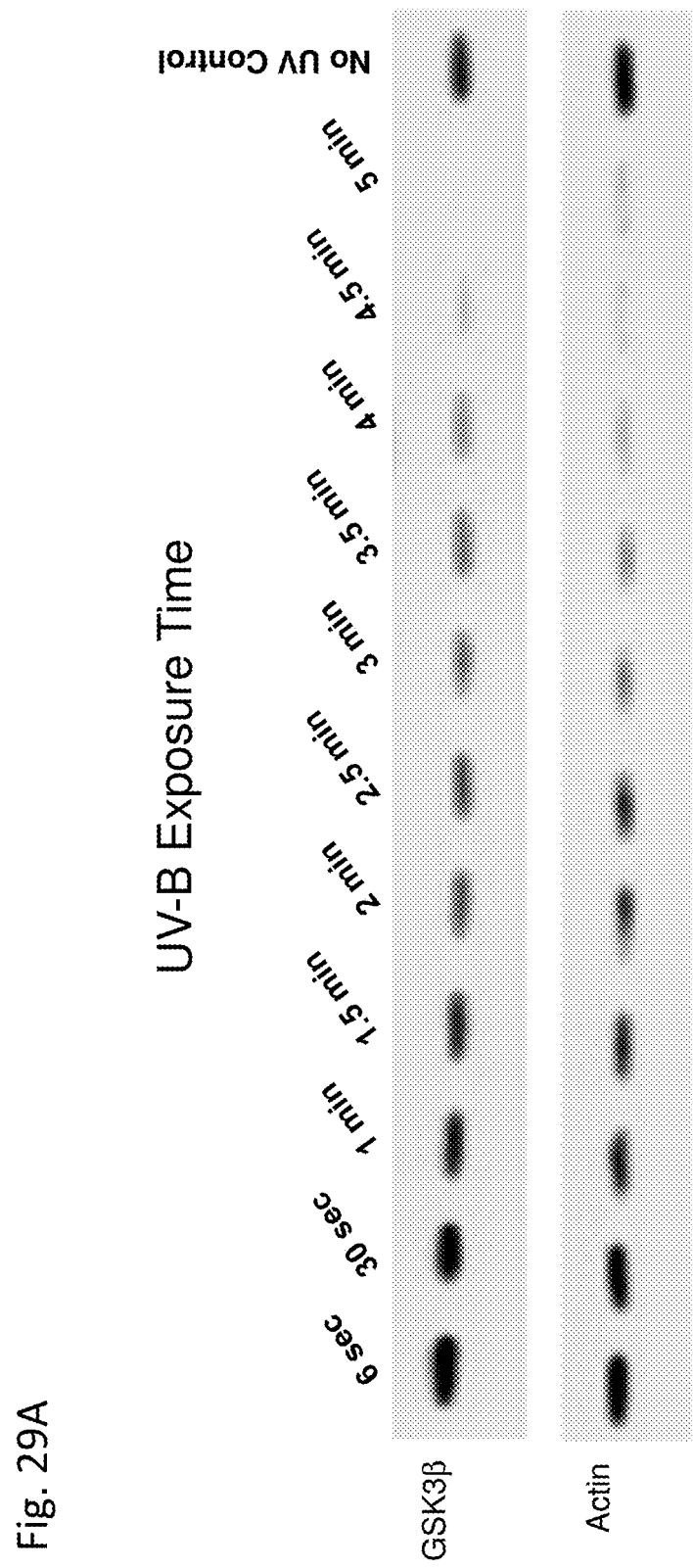
FIGS. 29A-29B shows an exemplary denaturation induced by UV-B exposure and Drug Stabilization of the protein from UV induced loss.
Figure 29B:
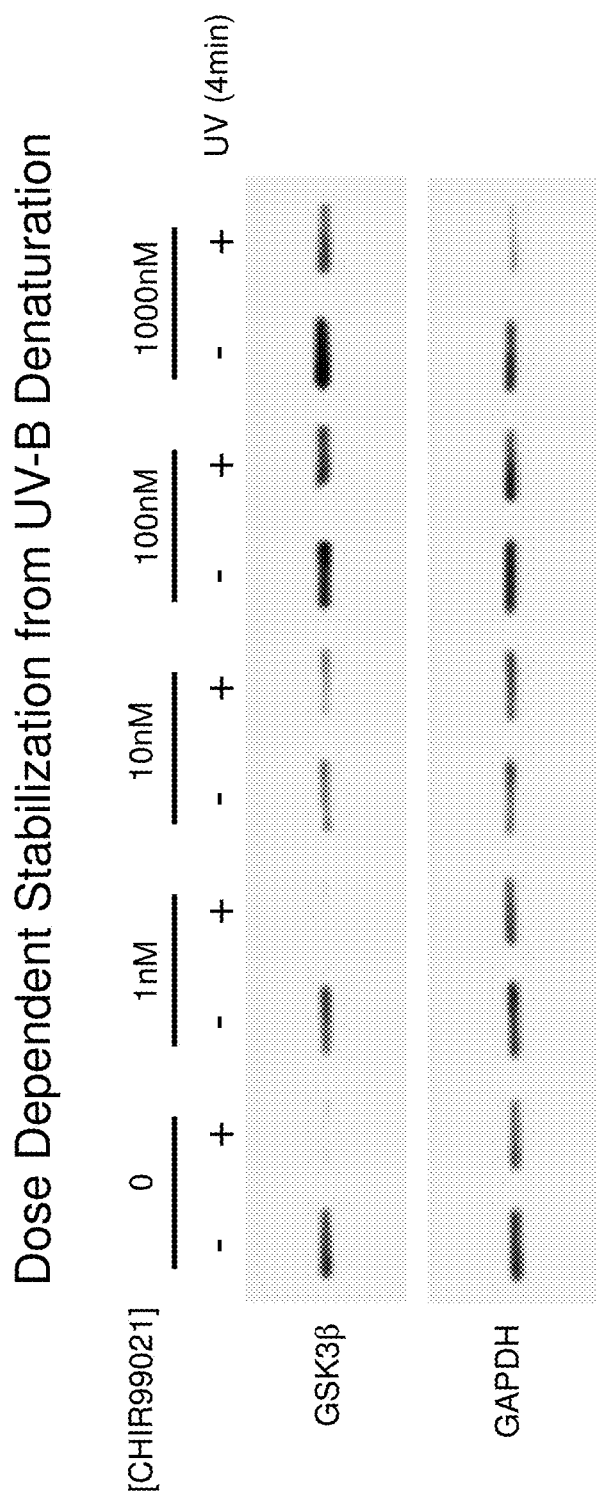
Figure 30:
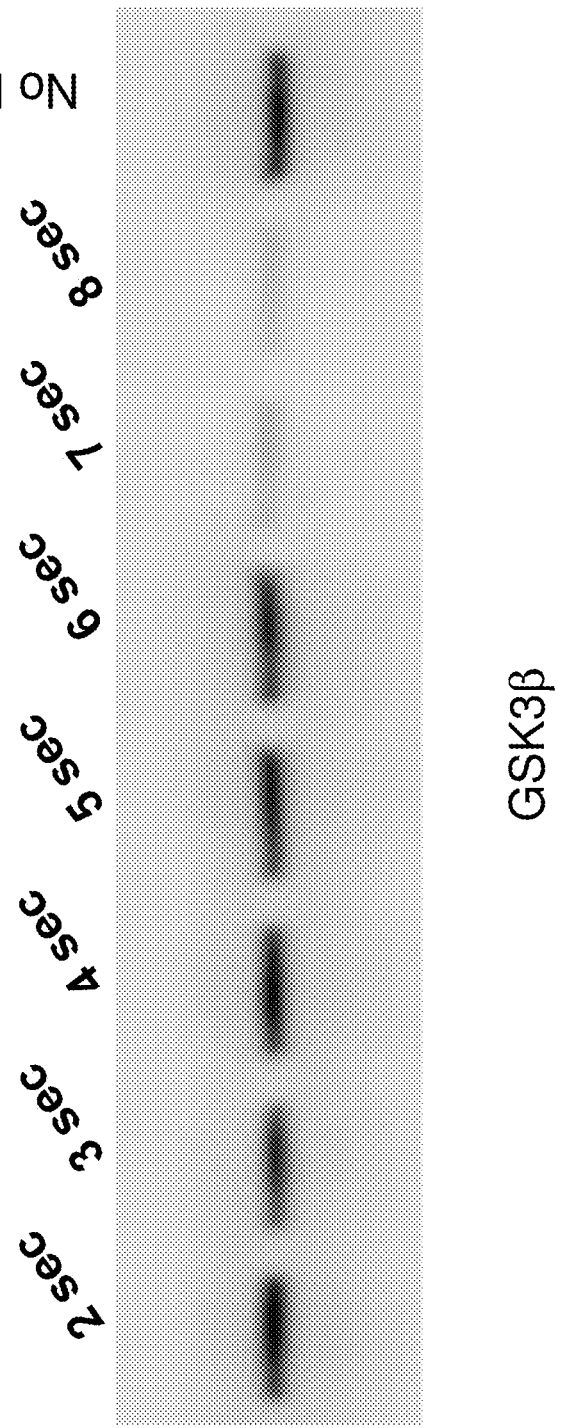
FIG. 30 shows that an exemplary microwave irradiation (MWI) induced denaturation of proteins. Cell lysates were exposed to microwave irradiation for the indicated times and the denatured and aggregated insoluble proteins removed by centrifugation. The soluble fraction was used for immunoblot analysis for the protein GSK3beta.

In certain embodiments, contacting a fusion protein with a denaturant comprises exposing a fusion protein, or a cell or mixture comprising a fusion protein, with a suitable amount of electromagnetic radiation sufficient to denature a protein, non-limiting examples of which include ultraviolet light (e.g., FIGS. 29A and B), microwaves (e.g., FIG. 30), or radiation (e.g., beta or gamma radiation). In some embodiments, denaturation of a protein can be performed with UV at 250 nm for 5 min, or 0.1 joules/cm$^2$.

In certain embodiments, contacting a fusion protein with a denaturant comprises contacting a fusion protein, or a cell or mixture comprising a fusion protein, with a chemical denaturant, non-limiting examples of which include an oxidizing agent, a toxin, an acid, a base, a carcinogen, and a chemotherapeutic agent. Simple routine test can be performed to quickly determine the amount of a chemical denaturant needed to denature a fusion protein. In some embodiments, a fusion protein, or a cell or mixture comprising a fusion protein, is contacted with a chemical denaturant in the presence of a test compound, and the chemical denaturant is substantially removed before contacting the fusion protein with a nuclease donor (e.g., an RNase donor protein) (e.g., by incorporating a washing step). In certain embodiments, contacting a fusion protein with a denaturant comprises contacting a fusion protein, or a cell or mixture comprising a fusion protein, with a chemical denaturant at a concentration in a range of 1 fM to 500 mM, 1 pM to 100 mM, 1 nM to 10 mM, 1 nM to 1 mM, or 1 nM to 100 µM.

Exemplary Methods

In some embodiments, a fusion protein is contacted with test compound and a denaturant. In some embodiments, an isolated fusion protein is contacted with a test compound and/or a denaturant. In some embodiments, a fusion protein located within or on a cell, or in a mixture (e.g., a cell lysate) is contacted with a test compound and/or a denaturant. In some embodiments, a fusion protein is contacted with a test compound before or after contacting the fusion protein with a denaturant. In some embodiments, a fusion protein is contacted with a test compound and a denaturant simultaneously, or substantially at the same time. In some embodiments, a fusion protein is contacted with a test compound and a denaturant simultaneously. In some embodiments, a fusion protein is contacted with a test compound and a denaturant simultaneously at the same time. In some embodiments, a fusion protein is contacted with a test compound and a denaturant substantially at the same time (e.g., the fusion protein is contacted with the test compound and a denaturant sequentially, within a few minutes of the previous contacting). In some embodiments, a fusion protein is expressed in or on a cell (e.g., on a cell surface) and the cell is contacted with a test compound and/or a denaturant.

In certain embodiments, a method comprises contacting a cell with a nucleic acid that encodes or directs the expression of a fusion protein. For example, in some embodiments, a method comprises transfecting or transforming a cell with a nucleic acid (e.g., a vector) that encodes or directs the expression of a fusion protein, followed by contacting the cell, or a lysate of the cell, with a test compound, denaturant, nuclease donor (e.g., an RNase donor) and/or a nucleic acid substrate. In certain embodiments, a method comprises introducing a nucleic acid that encodes or directs the expression of a fusion protein into a cell using a suitable method. For example, a nucleic acid can be introduced into a eukaryotic cell using a viral vector, or into a bacteria cell using a phage.

In some embodiments, a fusion protein is contacted with a ribonuclease (RNase) donor and/or a nucleic acid substrate. In certain embodiments, a mixture comprising a fusion protein, a test compound and/or a denaturant is contacted with an RNase donor and/or a nucleic acid substrate. In some embodiments, a fusion protein located within or on a cell, or in a mixture (e.g., a cell lysate, e.g., a mixture comprising a fusion protein, a test compound and/or a denaturant) is contacted with an RNase donor and/or a nucleic acid substrate. In some embodiments, a fusion protein is contacted with an RNase donor before or after contacting the fusion protein with a nucleic acid substrate. In some embodiments, a fusion protein is contacted with an RNase donor and a nucleic acid substrate simultaneously, or substantially at the same time.

In certain embodiments, a cell comprising a fusion protein is contacted with a denaturant and a test compound, the denaturant is optionally removed or withdrawn, the cell is exposed to a nuclease donor and a nucleic acid substrate, and cleavage of the nucleic acid substrate is detected or quantitated. In certain embodiments, a cell comprising a fusion protein is contacted with a denaturant and a test compound, the denaturant is optionally removed or withdrawn, the cell is exposed to an RNase donor and a nucleic acid substrate, and cleavage of the nucleic acid substrate is detected or quantitated. In some embodiments, a mixture or cell comprising a fusion protein is contacted with a test compound, an RNase donor, a nucleic acid substrate and a denaturant substantially at the same time, and cleavage of the substrate is detected and/or quantitated. For example, a cell can be recombinantly produced to express a fusion protein, an RNase donor and/or a nucleic acid substrate, which expression, in some embodiments, is controlled by one or more inducible promoters. The cell, or a lysate thereof, is then contacted with a test compound and a denaturant, e.g., by addition of the test compound and applying heat, while cleavage of a nucleic acid substrate comprising a pair of FRET labels is monitored in real time. Variations of such a method are also contemplated herein.

In some embodiments, during or after contacting a fusion protein with heat, an absolute, average or mean temperature of aggregation ($T_{agg}$), mean temperature of maximum signal ($T_{max}$), or mean temperature of minimum signal ($T_{min}$) of the fusion protein is determined. In some embodiments, a $T_{agg}$, $T_{max}$, or $T_{min}$ is determined in the absence of a test compound. In some embodiments, a $T_{agg}$, $T_{max}$, or $T_{min}$ is determined in the presence of a solvent control, or control compound (e.g., compound known to have no effect on the $T_{agg}$, $T_{max}$, or $T_{min}$ of the fusion protein, or a compound known to increase or decrease a $T_{agg}$, $T_{max}$, or $T_{min}$ of the fusion protein). Such controls can be used to determine a threshold $T_{agg}$, $T_{max}$, or $T_{min}$ (e.g., a predetermined threshold), which, in some embodiments, is used to identify compounds that interact with or bind to a target polypeptide. For example, in certain embodiments, a test compound that changes or shifts a $T_{agg}$, $T_{max}$, or $T_{min}$ of a fusion protein to an amount above a predetermined threshold is often identified as a test compound that interacts with or binds to target polypeptide.

Similar methods can be used to identify a test compound that interacts with or binds to a target polypeptide when electromagnetic radiation, a freeze-thaw or chemical is used as the denaturant. For example, a critical time of exposure, concentration of denaturant, thaw temperature, wavelength, or energy required to denature a fusion protein can be determined in the absence of a test compound and/or in the presence of a control compound to determine a predetermined threshold amount. In some embodiments, any test compound that causes a shift or change in the threshold amount is determined to be a compound that interacts with or binds to the target polypeptide of the fusion protein.

In certain embodiments, a method or assay described herein is conducted as a multiplex assay and/or a high-throughput assay comprising conducting the method in at least 96, at least 100, at least 384, at least 500, at least 1000, at least 1536, at least 5000, or at least 10,000 separate vessels. In certain embodiments, a method or assay described herein is conducted as a multiplex assay and/or a high-throughput assay wherein some or all of the steps of the method are conducted substantially simultaneously, or at the same time in a plurality of vessels. In some embodiments, some or all of a plurality of separate vessels used in a multiplex assay and/or a high-throughput assay is contacted with, or comprises, a different fusion protein, a different denaturant, a different test compound, a different nuclease donor, and/or a different nucleic acid substrate. In some embodiments, some or all of a plurality of separate vessels used in a multiplex assay and/or a high-throughput assay is contacted with, or comprises, a different fusion protein, a different denaturant, a different test compound, a different RNase donor, and/or a different nucleic acid substrate. In some embodiments, some or all of a plurality of separate vessels used in a multiplex assay and/or a high-throughput assay is contacted with, or comprises, the same fusion protein, the same denaturant, the same test compound, the same nuclease donor, and/or the same nucleic acid substrate. In some embodiments, some or all of a plurality of separate vessels used in a multiplex assay and/or a high-throughput assay is contacted with, or comprises, the same fusion protein, the same denaturant, the same test compound, the same RNase donor, and/or the same nucleic acid substrate. A "vessel" as used herein, refers to any suitable vessel, tube or a well. A vessel can be a well, for example a well in a microtiter plate.

In certain embodiments, a method or assay described herein is conducted as a multiplex assay and/or a high-throughput assay using an array of surface-bound fusion proteins often located at addressable location on a suitable substrate (e.g., a chip). In some embodiments, an array comprises at least 20, at least 96, at least 100, at least 384, at least 500, at least 1000, at least 1536, at least 5000, or at least 10,000 different fusion proteins bound to the surface of a suitable substrate.

Methods and assays described herein provide for increased responsiveness and sensitivity over other types of complementation assays. The methods provided herein can detect the presence of an active test compound below nanomolar (nM) levels.

In some embodiments, in a method described herein, the nucleic acid substrate comprises one or more detectable labels. In some embodiments, the nucleic acid substrate comprises one or more FRET labels. In some embodiments, the nucleic acid substrates comprises a pair of FRET labels, wherein the amount of the cleavage product comprises detecting the amount of a fluorescence signal emitted from the cleavage product and obtaining data points, and wherein the fluorescence signal allows for the identification of a target saturation dose, the apparent equilibrium dissociation constant ($K_D$), the half maximal effective concentration (EC50) of target engagement, between the target polypeptide and the test compound.

In some embodiments, the target saturation dose of the test compound is identified by the peak fluorescence value (Emax) after cleavage/depletion of the nucleic acid FRET-labeled substrate in the enzyme reaction. In some embodiments, the apparent equilibrium dissociation constant ($K_D$) between the target polypeptide and the test compound is identified by plotting a saturation binding curve, wherein datapoints beyond the Emax are excluded from the plot. In some embodiments, the EC50 of target engagement is determined from the early datapoints in the reaction where there is excess of the nucleic acid FRET-labeled substrate.

Kits

In some embodiments, a kit is provided. In some embodiments, the kit comprises a plurality of vessels, the first vessel comprising a fusion protein, the second vessel comprising a nuclease donor, and the third vessel comprising a nucleic acid FRET-labeled substrate.

In some embodiments, the fusion protein comprises a target polypeptide and a nuclease acceptor. In some embodiments, the nuclease acceptor is an S-tag acceptor peptide and the nuclease donor is RNase S.

EXAMPLES

Example 1

Materials: Reagents, Cell Lines, and Constructs

The following antibodies were obtained from Cell Signaling Technology: Rabbit mAb S-Tag (D2K2V) XP (Cat #12774), anti-MTH1 (D6V40) Rabbit mAb (Cat #43918). HEK-293 cells were from ATCC (Cat #CRL-1573) and were cultured in DMEM (Millipore SIGMA Cat #D5796) supplemented with 10% Fetal Bovine Serum (FBS) (Millipore SIGMA Cat #F2442), and 1× Penicillin/Streptomycin (Millipore SIGMA Cat #P4333). Trypsin-EDTA solution 1× (0.05% trypsin, 0.02% EDTA) was from Millipore SIGMA (Cat #59417C) and 20×TBS solution was from Teknova (Cat #T1680). Triton-X-100 was from Millipore SIGMA (Cat #X100). The MTH1 inhibitor (S)-Crizotinib (Crizotinib) was from Millipore SIGMA (Cat #PZ0240). DMSO was from Millipore SIGMA (Cat #673439). The 96 well plates were from CELLTREAT Scientific (Cat #229196); white PCR plates were from BIORAD (cat #MLL9651) and the Microseal 'B' film for sealing the PCR plates was from BIORAD (Cat #MSB1001); black 96 well plates from COSTAR (Cat #3915). Transfection of the cells was using Lipofectamine 2000 transfection reagent (Thermo Fisher Scientific Cat #11668027) according to manufacturer recommended protocol. The optimized fluorogenic substrate (5'-6FAM/ArUAA/3' TAMRA_(NHS ester) (v3)) was purchased from IDT. The S Protein was cloned with 6× His tag (SEQ ID NO:34) at the carboxy terminus into vector pET-30a(+) for bacterial expression using KPN1 GGTACC and BamH1 GGATCC cloning sites by Synbio Technologies Inc. The S protein His tag fusion protein was expressed and purified from bacteria by Synbio Technologies Inc.

The sequence of the cloned construct encoding the RNase donor was as follows:

(SEQ ID NO: 22)
GGTACCATGAGCAGCTCCAACTACTGTAACCAGATGATGAAGAGCCGGAA

CCTGACCAAAGATCGATGCAAGCCAGTGAACACCTTTGTGCACGAGTCCC

TGGCTGATGTCCAGGCCGTGTGCTCCCAGAAAAATGTTGCCTGCAAGAAT

GGGCAGACCAATTGCTACCAGAGCTACTCCACCATGAGCATCACCGACTG

CCGTGAGACCGGCAGCTCCAAGTACCCCAACTGTGCCTACAAGACCACCC

AGGCGAATAAACACATCATTGTGGCTTGTGAGGGAAACCCGTACGTGCCA

GTCCACTTTGATGCTTCAGTGCATCACCATCACCATCACTAGGGATCC.

The sequence encoding the 6× His tag (SEQ ID NO:34) is bold and the TAG stop codon is underlined.

The corresponding translated amino acid sequence of the His tagged RNase donor protein (S protein) was:

(SEQ ID NO: 23)
MSSSNYCNQMMKSRNLTKDRCKPVNTFVHESLADVQAVCSQKNVACKNGQ

TNCYQSYSTMSITDCRETGSSKYPNCAYKTTQANKHIIVACEGNPYVPVH

FDASVHHHHHH.

Cloning of the S-tag acceptor peptide with the mutT homologue (MTH1) protein (i.e., the target polypeptide) was performed by Synbio Technologies Inc. Cloning of the S-tag acceptor peptide to the carboxy terminal of MTH1 was as follows in vector pcDNA3.1(+): cloning site KPN1 GGTACC and BamH1 GGATCC (bold).

We generated the encoding construct with no linker between MTH1 and the S-tag peptide (underlined) as shown below:

(SEQ ID NO: 24)
GGTACCATGGGCGCCTCCAGGCTCTATACCCTGGTGCTGGTCCTGCAGCC

TCAGCGAGTTCTCCTGGGCATGAAAAAGCGAGGCTTCGGGGCCGGCCGGT

GGAATGGCTTTGGGGGCAAAGTGCAAGAAGGAGAGACCATCGAGGATGGG

GCTAGGAGGGAGCTGCAGGAGGAGAGCGGTCTGACAGTGGACGCCCTGCA

CAAGGTGGGCCAGATCGTGTTTGAGTTCGTGGGCGAGCCTGAGCTCATGG

ACGTGCATGTCTTCTGCACAGACAGCATCCAGGGGACCCCCGTGGAGAGC

GACGAAATGCGCCCATGCTGGTTCCAGCTGGATCAGATCCCCTTCAAGGA

CATGTGGCCCGACGACAGCTACTGGTTTCCACTCCTGCTTCAGAAGAAGA

AATTCCACGGGTACTTCAAGTTCCAGGGTCAGGACACCATCCTGGACTAC

-continued

ACACTCCGCGAGGTGGACACGGTCAAGGAAACTGCAGCAGCCAAGTTTGA

GCGGCAGCACATGGACTCCAGCACTTCCGCTGCCTAGGCTGCCTAGGGAT

CC.

The translated amino acid sequence for resulting fusion protein comprising the MTH1 and carboxy terminal S-tag acceptor peptide is shown below. The 20 amino acid sequence of the S-tag acceptor peptide is underlined. It was determined that the S-tag can be shortened to the first 15 amino acids and still act as an S-tag acceptor peptide.

(SEQ ID NO: 25)
MGASRLYTLVLVLQPQRVLLGMKKRGFGAGRWNGFGGKVQEGETIEDGAR

RELQEESGLTVDALHKVGQIVFEFVGEPELMDVHVFCTDSIQGTPVESDE

MRPCWFQLDQIPFKDMWPDDSYWFPLLLQKKKFHGYFKFQGQDTILDYTL

REVDTVKETAAAKFERQHMDSSTSAA.

We also generated an encoding construct for a fusion protein comprising a 3 amino acid linker (boxed) between the MTH1 target polypeptide and the S-tag acceptor peptide (underlined) as shown below:

(SEQ ID NO: 26)
GGTACCATGGGCGCCTCCAGGCTCTATACCCTGGTGCTGGTCCTGCAGCCT

CAGCGAGTTCTCCTGGGCATGAAAAAGCGAGGCTTCGGGGCCGGCCGGTGG

AATGGCTTTGGGGGCAAAGTGCAAGAAGGAGAGACCATCGAGGATGGGGCT

AGGAGGGAGCTGCAGGAGGAGAGCGGTCTGACAGTGGACGCCCTGCACAAG

GTGGGCCAGATCGTGTTTGAGTTCGTGGGCGAGCCTGAGCTCATGGACGTG

CATGTCTTCTGCACAGACAGCATCCAGGGGACCCCCGTGGAGAGCGACGAA

ATGCGCCCATGCTGGTTCCAGCTGGATCAGATCCCCTTCAAGGACATGTGG

CCCGACGACAGCTACTGGTTTCCACTCCTGCTTCAGAAGAAGAAATTCCAC

GGGTACTTCAAGTTCCAGGGTCAGGACACCATCCTGGACTACACACTCCGC

GAGGTGGACACGGTC[GCCGCCGCC]AAGGAAACTGCAGCAGCCAAGTTTGAG

CGGCAGCACATGGACTCCAGCACTTCCGCTGCCTAGGCTGCCTAGGGATCC

The translated amino acid sequence for the resulting fusion protein comprising the MTH1 target polypeptide with a 3 amino acid spacer and a carboxy terminal S-tag acceptor peptide is shown below. The S-tag is underlined and the 3 amino acid spacer is boxed.

(SEQ ID NO: 27)
MGASRLYTLVLVLQPQRVLLGMKKRGFGAGRWNGFGGKVQEGETIEDGARR

ELQEESGLTVDALHKVGQIVFEFVGEPELMDVHVFCTDSIQGTPVESDEMR

PCWFQLDQIPFKDMWPDDSYWFPLLLQKKKFHGYFKFQGQDTILDYTLREV

DTV[AAA]KETAAAKFERQHMDSSTSAA

An encoding construct comprising a 10 amino acid linker (boxed) between the MTH1 target polypeptide and S-tag acceptor peptide (underlined) was also constructed as shown below:

(SEQ ID NO: 28)
GGTACCATGGGCGCCTCCAGGCTCTATACCCTGGTGCTGGTCCTGCAGCCT

CAGCGAGTTCTCCTGGGCATGAAAAAGCGAGGCTTCGGGGCCGGCCGGTGG

AATGGCTTTGGGGGCAAAGTGCAAGAAGGAGAGACCATCGAGGATGGGGCT

AGGAGGGAGCTGCAGGAGGAGAGCGGTCTGACAGTGGACGCCCTGCACAAG

GTGGGCCAGATCGTGTTTGAGTTCGTGGGCGAGCCTGAGCTCATGGACGTG

CATGTCTTCTGCACAGACAGCATCCAGGGGACCCCCGTGGAGAGCGACGAA

ATGCGCCCATGCTGGTTCCAGCTGGATCAGATCCCCTTCAAGGACATGTGG

CCCGACGACAGCTACTGGTTTCCACTCCTGCTTCAGAAGAAGAAATTCCAC

GGGTACTTCAAGTTCCAGGGTCAGGACACCATCCTGGACTACACACTCCGC

GAGGTGGACACGGTC[GCCGCCGCCGCCGCCGCCGCCGCCGCCGCC]AAGGAA

ACTGCAGCAGCCAAGTTTGAGCGGCAGCACATGGACTCCAGCACTTCCGCT

GCCTAGGCTGCCTAGGGATCC.

The translated amino acid sequence of the MTH1 target polypeptide with a 10 amino acid spacer and a carboxy terminal S-tag acceptor peptide is shown below. The S-tag is underlined and the 10 amino acid spacer is boxed.

(SEQ ID NO: 29)
MGASRLYTLVLVLQPQRVLLGMKKRGFGAGRWNGFGGKVQEGETIEDGAR

RELQEESGLTVDALHKVGQIVFEFVGEPELMDVHVFCTDSIQGTPVESDE

MRPCWFQLDQIPFKDMWPDDSYWFPLLLQKKKFHGYFKFQGQDTILDYTL

REVDTVAAAAAAAAAAKETAAAKFERQHMDSSTSAA.

Methods: Protocol for Assessing Drug Target Engagement Using the S-Tag (Micro-Tag) System A. Test Cell Numbers in Kinetic Read HEK-293 cells were transfected with an MTH1-S-tag fusion construct using Lipofectamine 2000. This protocol was improved using reverse transfection whereby the cells were lifted and re-plated with the transfection reagent along with DNA. Twenty-four hours after transfection, the cells were lifted with trypsin, washed with 1×TBS and cells were counted. A dilution series of cell number was tested.

Cells were diluted to 1×10$^6$ cells/ml (i.e. 1000 cells/μl) in 1×TBS (cold TBS). Cell counts in a range of 50,000 cells down to 1000 cells were tested in a final volume of 50 μl with cold TBS in 96 well plates. To each well containing 50 μl cells, 50 μl of room temp 1%-Triton-X 100 in TBS was added to get a final of concentration of 0.5% Triton-X-100. Wells were mixed by pipetting up down and allowed to incubate for 10 min at room temp to gently lyse the cell membranes. 80 μl from each well was transferred to a black costar plate while avoiding air bubbles, and 10 μl of a 10× S protein (RNase donor) was added to a final concentration of 1 ng/μl, followed by addition of 10 μl of 10× Substrate (nucleic acid FRET-labeled substrate) to get a final of substrate concentration of 50 nM. 10× S Protein (10 ng/l) was prepared at room temp in 0.5% triton-X in TBS just prior to use. 10× Substrate (500 nM) was prepared at room temp with dH$_2$O just prior to use.

The plate was read immediately in kinetic mode (excitation=485 nm, emission=520 nm) with the PolarStar Omega 96-well plate reader. Every plate was read every minute for 10 minutes (11 time points were generated). The appropriate dilution of cells was selected that gave a highest signal without saturating the signal within 6 min.

B. Identify $T_{agg}$ for the Experiment by Running Thermal Gradient

Cells were diluted to $1\times10^6$ cells/ml (1000 cells/ul) in 1×TBS (cold TBS).

The correct dilution of cells was prepared in a final volume of 50 µl with cold TBS in a white PCR plate. The plates were exposed to a thermal gradient from 40° C. to 64° C. for 15 min. using a thermal cycler (MJ Research PTC-200 Peltier Thermal Cycler) and allowed to sit at room temp for 1 min, followed by addition of 50 µl of room temp 1% Triton-X-100 in TBS to get final of 0.5% Triton-X-100. The wells were mixed by pipetting up down followed by incubation for 10 minutes at room temp.

80 ul of lysate from each well was transferred to a black costar plate while avoiding air bubbles, followed by addition of 10 µl of 10× S protein (RNase donor) to get a final concentration of 1 ng/µl, followed by 10 µl of 10× Substrate (nucleic acid substrate) to get a final concentration of 50 nM. The plate was read immediately in kinetic mode (ex=485 nm, em=520 nm) with the PolarStar Omega 96-well plate reader. The plate was read every minute for 10 minutes. The $T_{agg}$ for the MTH1-S-tag fusion protein was determined to be about 50° C. C. Test inhibitor doses for the given cell number and $T_{agg}$ The inhibitor (i.e., test compound) doses were tested using the optimal cell number and $T_{agg}$ determined from the above experiment. Cells were diluted to $1\times10^6$ cells/ml (1000 cells/ul) in 1×TBS (cold TBS). The correct dilution of cells was prepared in a final volume of 50 ul with cold TBS in white PCR plates. 0.5 ul of 100× Crizotinib (a multitargeted small molecule tyrosine kinase inhibitor) in DMSO was added (or other inhibitor to be tested). For Crizotinib the EC50 was tested in a range of approximately 50 nM. Control wells included DMSO tested at the $T_{agg}$ (50° C.) (the 0% stability control) and DMSO tested at 40° C. (the 100% stability control).

Cells were incubated with inhibitor 40 min. on ice, then placed in a thermal cycler at $T_{agg}$ for 15 min. (Control wells were heated separately at 40° C. for 15 min), followed by room temp for 1 min, followed by addition of 50 ul of room temp 1% Triton-X-100 in TBS to get final of 0.5% Triton-X-100. Cells were mixed by pipetting up down followed by incubation for 10 minutes at room temp. 80 µl was transferred to black costar plate while avoiding air bubbles, followed by addition of 10 µl of 10× S protein to get a final of 1 ng/µl, and 10 µl of 10× Substrate to get a final of 50 nM. Plates were read immediately in kinetic mode (ex=485 nm, em=520 nm) with the PolarStar Omega 96-well plate reader, every minute for 10 minutes. Fluorescence units were plotted with corresponding inhibitor (test compound) dose to determine the EC50 for protein stabilization.

Results

Figure 4:
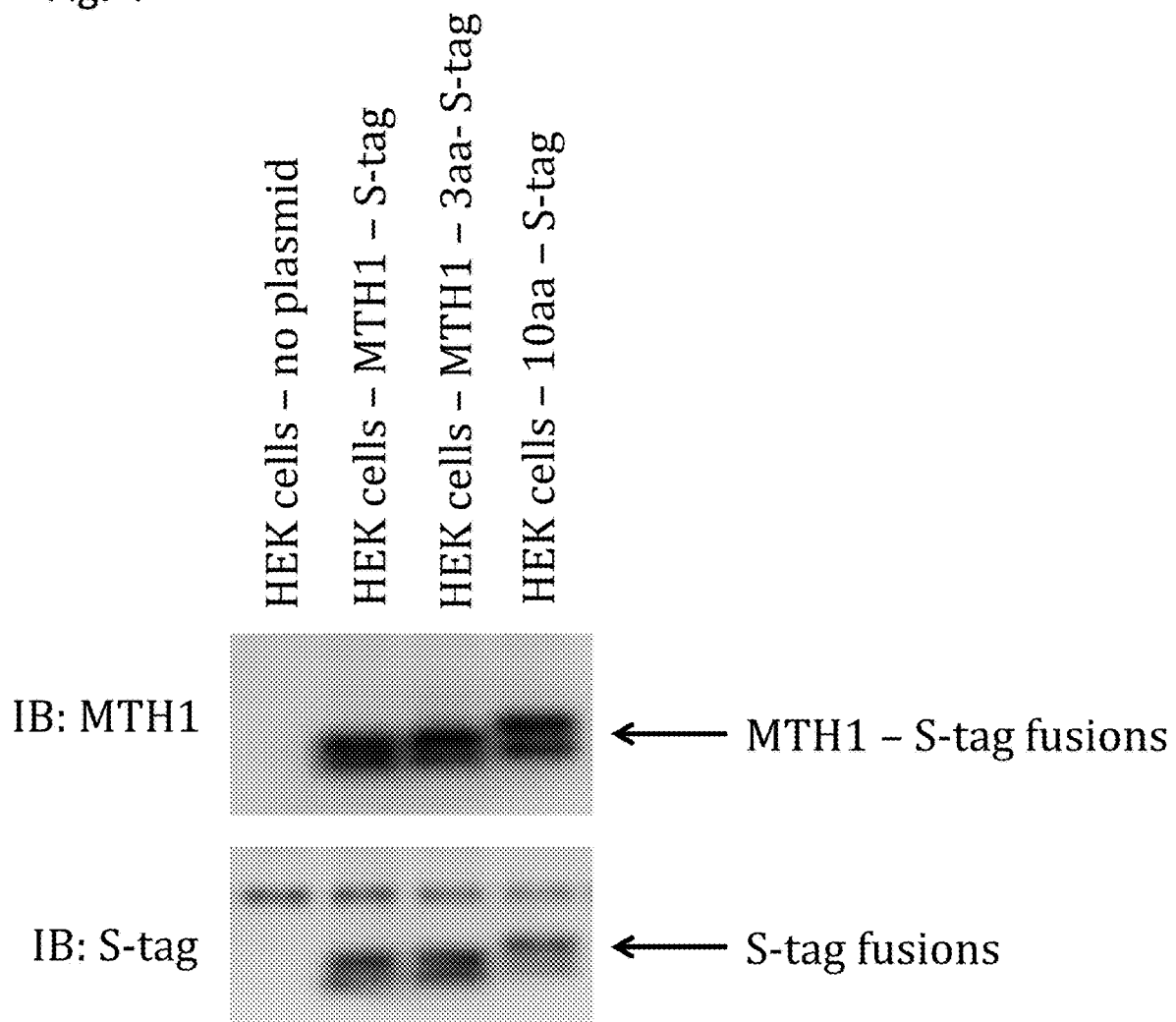
FIG. 4 shows an immunoblot showing expression of an exemplary in HEK-293 cells where the fusion protein comprises an S-tag acceptor peptide (S-tag) and a target polypeptide (MTH1) with or without an optional 3 amino acid linker (3aa) or 10 amino acid linker (10aa).

HEK293 mammalian cells were transfected with the three MTH-1-S-tag peptide fusion protein constructs to determine if spacer length between target polypeptide and the S-tag acceptor peptide impacts the detection of functional RNase S complementation. FIG. 4 shows equal expression of the constructs in the HEK293 cells as determined by Western blot.

Figure 5:
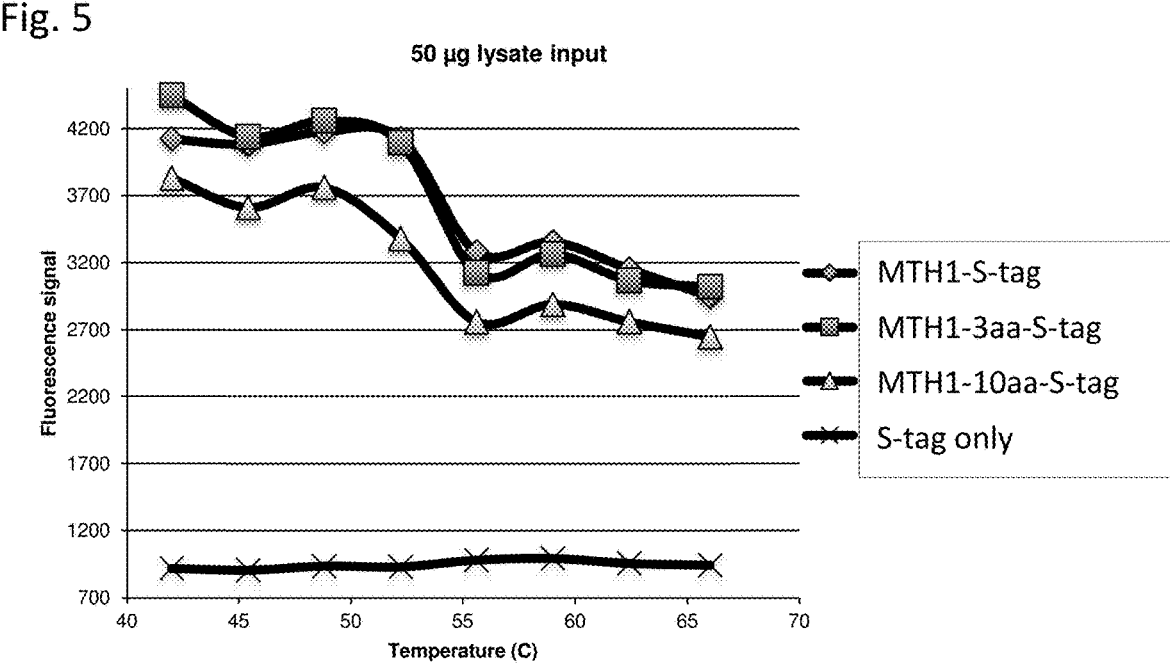
FIG. 5 shows a comparison of fluorescence signal (y-axis) resulting from fusion proteins having no linker (MTH1-S-tag) or different sized linkers (MTH1-3aa-S-tag or MTH1-10aa-S-tag) as a function of temperature (x-axis). In this assay, the S-tag alone (i.e., an S-tag not incorporated into a fusion protein) fails to produce any signal. Without being limited to theory, it may be that the S-tag peptide is thermodynamically unstable and therefore lacks a thermal melting profile under heat challenge when not incorporated into a fusion protein. This property makes contribution of the S-tag to the fused target protein minimal, and also makes it ideal for target engagement studies.

Testing 50 µg of transfected cells lysate input and comparing the different lengths of the spacer showed that there was no significant effect of spacer length on fluorescent signal (FIG. 5). Spacer length did not appear to play a significant role in signal levels or temperature of aggregation ($T_{agg}$) of the target protein. Structural and inertness and thermal insensitivity of the S-tag did not contribute to the biophysical stability of the target protein. This greatly improved downstream applications of this S-tag technology, and its use with a wide range of target proteins. Also, the data showed that in the absence of expression of S-tag fusion there was no detectable signal demonstrating specificity of the S-tag S protein complementation.

Figure 6:
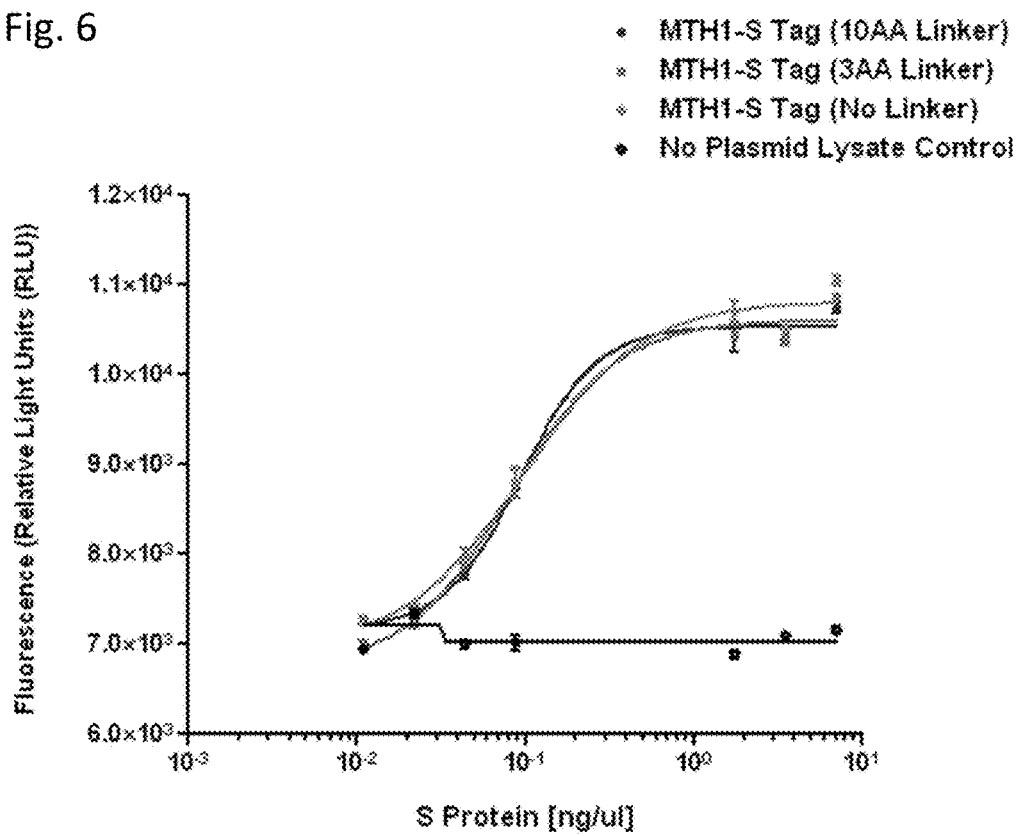
FIG. 6 shows a relationship between the amount of the nuclease donor (S Protein, x-axis) and fluorescence signal (relative light units, RLU) (y-axis) for different MTH1-S-tag fusion protein constructs.

To determine if S protein concentration impacts fluorescent signal, increasing concentration of S protein with the different S-tag fusions was tested. FIG. 6 shows that S protein concentration started to saturate signal at about 1-2 ng/ul S protein. The data demonstrated the sensitivity of the system, as it requires only minimal levels of S protein to drive enzyme complementation.

Similarly increasing concentration of the FRET nucleic acid substrate was tested and it was observed that the ideal concentration was in a range of 50 nM or more (Table 1).

| | | FRET Probe (nM) | | | | | | | | | | |
|---|---|---|---|---|---|---|---|---|---|---|---|---|
| | | 600 | 200.00 | 66.67 | 22.22 | 7.41 | 2.47 | 0.82 | 0.27 | 0.09 | 0.03 | 0.01 | 0 |
| S protein | 6 | 14525 | 4220 | 580 | 78 | 76 | 74 | 74 | 75 | 70 | 68 | 68 | 70 |
| (ng/µl) | 2.00 | 13242 | 3609 | 639 | 77 | 76 | 73 | 73 | 73 | 72 | 70 | 71 | 70 |
| | 0.67 | 1147 | 430 | 122 | 70 | 73 | 72 | 71 | 70 | 71 | 71 | 70 | 69 |
| | 0.22 | 549 | 225 | 98 | 73 | 69 | 70 | 71 | 71 | 70 | 71 | 70 | 69 |
| | 0.07 | 397 | 171 | 85 | 74 | 72 | 73 | 72 | 72 | 71 | 74 | 70 | 71 |
| | 0.02 | 365 | 159 | 89 | 71 | 73 | 73 | 74 | 72 | 72 | 71 | 71 | 70 |
| | 0.01 | 367 | 154 | 88 | 72 | 72 | 72 | 73 | 74 | 72 | 71 | 72 | 68 |
| | 0 | 349 | 144 | 85 | 69 | 70 | 71 | 70 | 71 | 69 | 71 | 70 | 68 |

Figure 7:
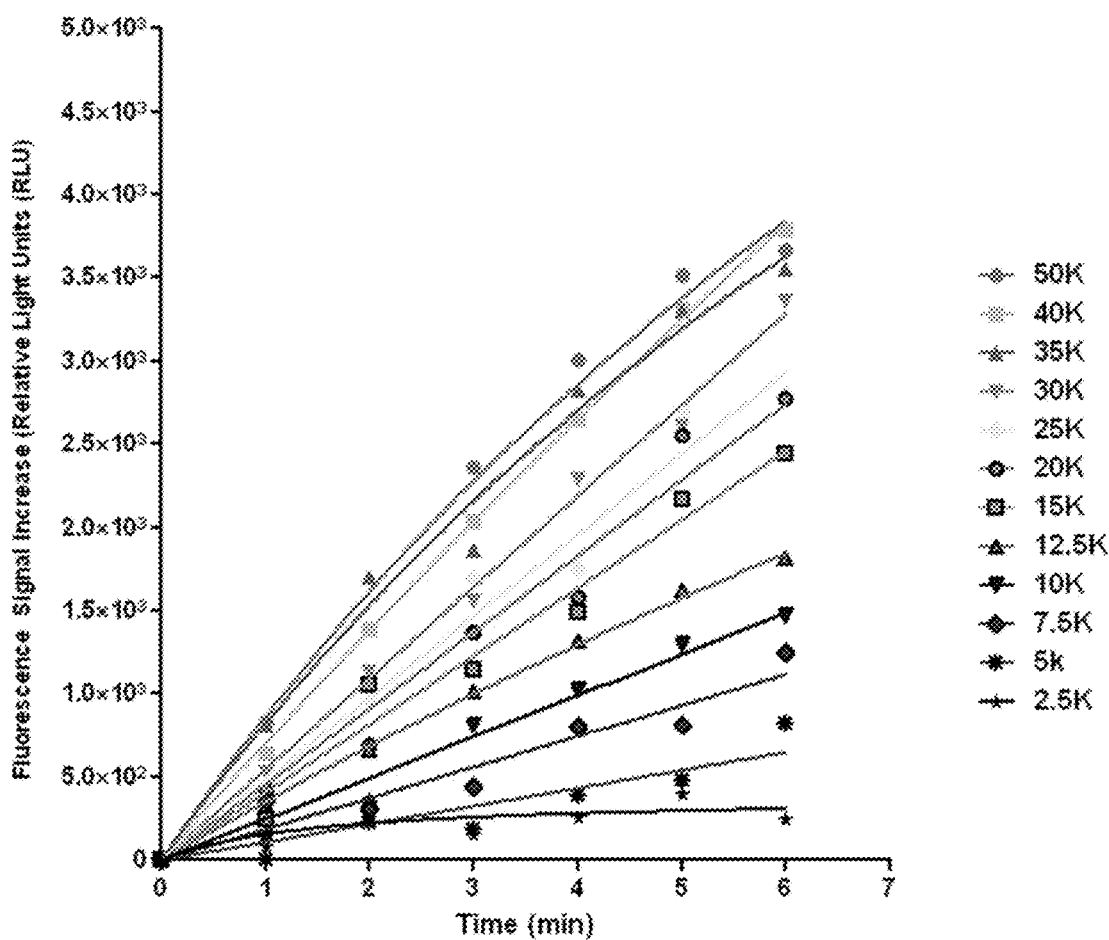
FIG. 7 shows the results of a dilution test of different cell numbers (legend) showing fluorescence signal (Y-axis) as a function of time (x-axis). Cells in this assay overexpressed the MTH1-3aa-S-tag fusion protein).
Figure 8:
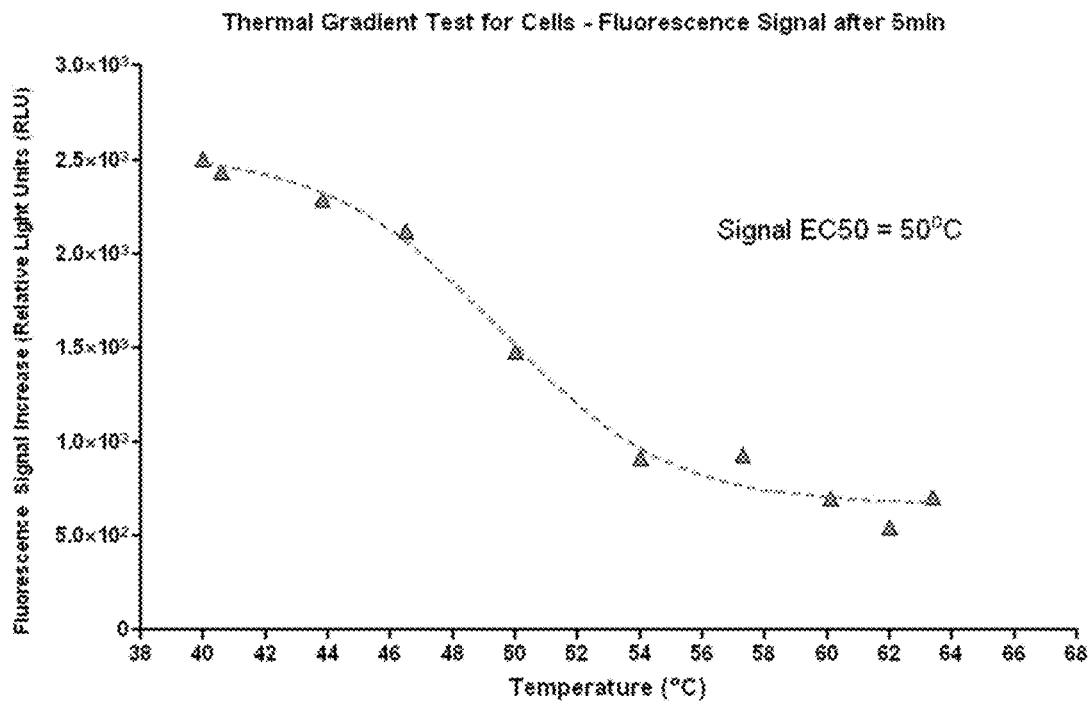
FIG. 8 shows the results of increasing temperature (x-axis) on fluorescent signal (y-axis) to identify a temperature of aggregation ($T_{agg}$) for MTH1-3aa-S-tag in cells.
Figure 9:
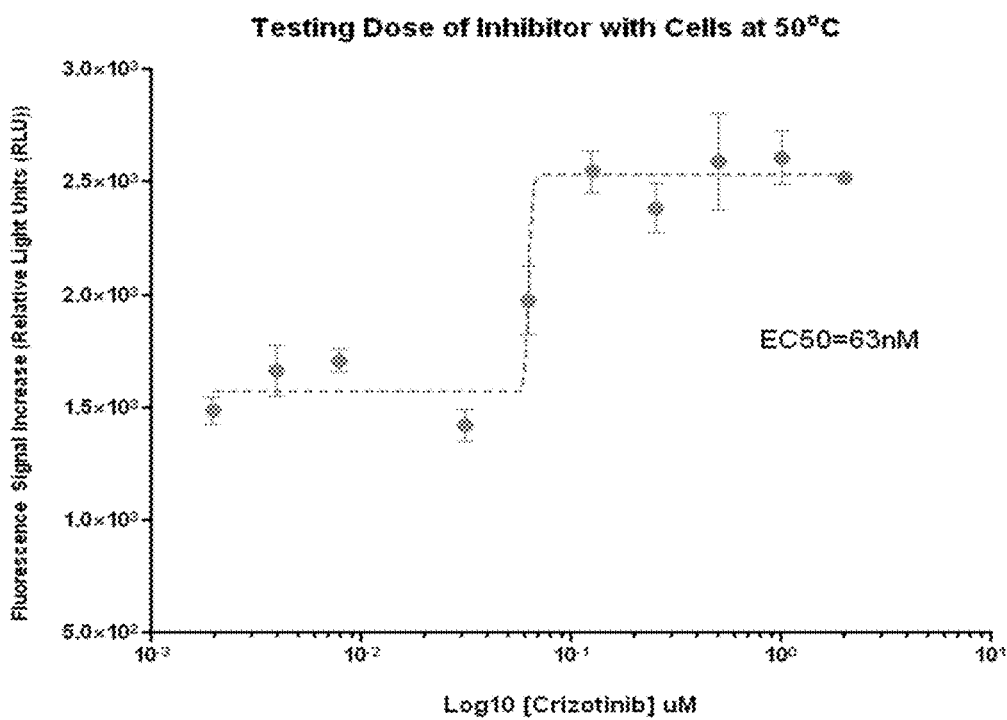
FIG. 9 shows the results of increasing inhibitor (test compound) concentration (x-axis) on fluorescent signal (y-axis) after cells are heated at the $T_{agg}$ in the presence of the inhibitor (test compound).
Figure 10:
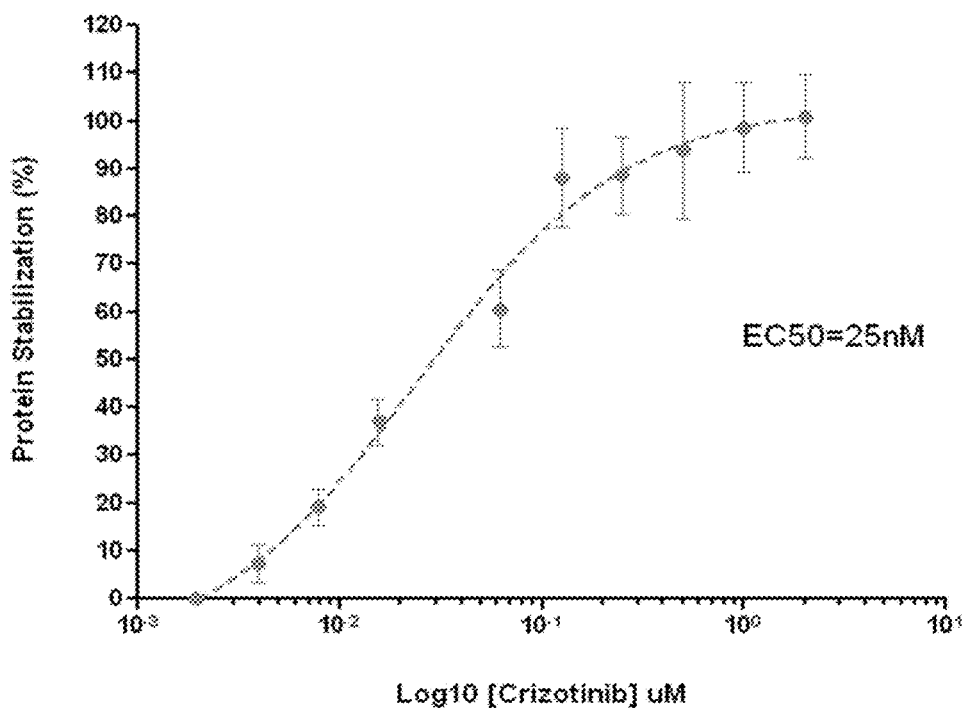
FIG. 10 shows the results of increasing concentration of an inhibitor (y-axis) on protein stabilization (y-axis) at 50° C.

The kinetics of the cleavage of the fluorogenic substrate was rapid and detection was sensitive. FIG. 7 showed a variation of fluorescent signal with respect to cell number. Once optimal cell numbers were determined then the $T_{agg}$ for the fusion protein was identified by performing a modified cellular-thermal shift assay (CTSA). FIG. 8 demonstrated that for the MTH1-S-tag fusion, the $T_{agg}$ was approximately 50° C. Using the $T_{agg}$, a dose response curve was performed to identify binding of the small molecule Crizotinib to the fusion protein. Cells transfected with the MTH1-S-tag fusion protein were incubated with the MTH1 inhibitor (S) Crizotinib at increasing concentrations (FIG. 9). Crizotinib stabilized the MTH1 fusion protein as indicated by an increase in fluorescence signal (FIG. 9). The EC50 was determined using the formula for protein stabilization shown below and indicated an EC50 for protein stabilization of approximately 25 nM (FIG. 10).

Formula for Protein Stabilization:

$$(1-((RLU_{40° C.}-RLU_{50° C.})-(RLU_x-RLU_{50° C.}))/(RLU_{40° C.}-RLU_{50° C.})))*100$$

where RLU is relative light units.

TABLE 2

Signal detected without centrifugation after heat challenge. Fluorescence was detected at wavelength ex = 475 nm/em = 500-550 nm.

| | | Fluorescent reagent (nM) | | | | | | | | | | |
|---|---|---|---|---|---|---|---|---|---|---|---|---|
| | | 120.000 | 40.000 | 13.333 | 4.444 | 1.481 | 0.494 | 0.165 | 0.055 | 0.018 | 0.006 | 0.002 | 0 |
| S protein (ng/μl) | 1.2 | 14525 | 4220 | 580 | 78 | 76 | 74 | 74 | 75 | 70 | 68 | 68 | 70 |
| | 0.4 | 13242 | 3609 | 639 | 77 | 76 | 73 | 73 | 73 | 72 | 70 | 71 | 70 |
| | 0.134 | 1147 | 430 | 122 | 70 | 73 | 72 | 71 | 70 | 71 | 71 | 70 | 69 |
| | 0.044 | 549 | 225 | 98 | 73 | 69 | 70 | 71 | 71 | 70 | 71 | 70 | 69 |
| | 0.014 | 397 | 171 | 85 | 74 | 72 | 73 | 72 | 72 | 71 | 74 | 70 | 71 |
| | 0.004 | 365 | 159 | 89 | 71 | 73 | 73 | 74 | 72 | 72 | 71 | 71 | 70 |
| | 0.002 | 367 | 154 | 88 | 72 | 72 | 72 | 73 | 74 | 72 | 71 | 72 | 68 |
| | 0 | 349 | 144 | 85 | 69 | 70 | 71 | 70 | 71 | 69 | 71 | 70 | 68 |

TABLE 3

Signal detected with centrifugation after heat challenge. Fluorescence was detected at wavelength ex (excitation) = 475 nm/em (emission) = 500-550 nm. Plate was centrifuged at 12 K rpm after heat challenge.

| | | Fluorescent reagent (nM) | | | | | | | | | | |
|---|---|---|---|---|---|---|---|---|---|---|---|---|
| | | 120.000 | 40.000 | 13.333 | 4.444 | 1.481 | 0.494 | 0.165 | 0.055 | 0.018 | 0.006 | 0.002 | 0 |
| S protein (ng/μl) | 1.2 | 15334 | 4592 | 780 | 290 | 201 | 144 | 129 | 92 | 75 | 70 | 67 | 65 |
| | 0.4 | 14417 | 3959 | 809 | 242 | 170 | 145 | 118 | 89 | 75 | 71 | 70 | 66 |
| | 0.134 | 1254 | 397 | 126 | 97 | 83 | 77 | 75 | 73 | 69 | 71 | 70 | 68 |
| | 0.044 | 618 | 248 | 99 | 76 | 75 | 77 | 72 | 71 | 70 | 71 | 71 | 68 |
| | 0.014 | 437 | 184 | 89 | 72 | 72 | 71 | 72 | 72 | 71 | 71 | 70 | 66 |
| | 0.004 | 393 | 179 | 92 | 74 | 74 | 73 | 72 | 71 | 70 | 69 | 69 | 68 |
| | 0.002 | 392 | 164 | 89 | 73 | 72 | 71 | 69 | 71 | 71 | 69 | 66 | 67 |
| | 0 | 374 | 145 | 86 | 73 | 72 | 72 | 70 | 69 | 68 | 69 | 67 | 65 |

*Note that there is no difference is signal levels in Tables 2 and 3. Removal of the centrifugation step speeds up signal detection, reduces time spent between sample dispensing and signal reading, and importantly greatly improves downstream applications of this S-tag (Micro-tag) technology.

Short incubation time of lysate with S protein and substrate was sufficient for complete signal development (FIG. 11). The shortest incubation time (0.5 min) was sufficient for complete signal development. At longer incubation times signal quality was not compromised. Such fast signal development is important for downstream application of this technology, particularly for array and chip applications.

Low lysate/cell input in combination with short incubation times yielded sensitive signal demonstrating a melting profile of the target protein (MTH1-3aa-S-tag) when engaged with its ligand (Crizotinib) (FIGS. 12 & 13). Signal pattern between high and low lysate inputs was identical for Crizotinib-MTH1 engagement. These figures demonstrate persistence of a signal pattern at longer incubation times, despite signal saturation. Such flexibility of lysate/cell input in combination with incubation time can be used to detect engagement EC50 of ligands of various target engagement potencies.

Figure 14:
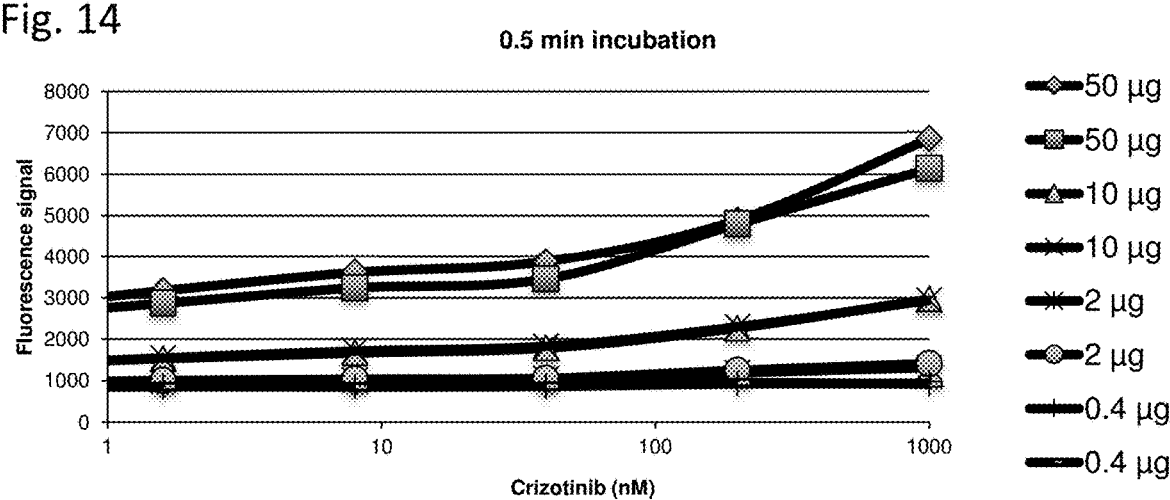
FIG. 14 shows the effect of the amount of lysate (legend) (prepared from cells expressing MTH1-3aa-S-tag) on fluorescence signal (y-axis) as a function of Crizotinib (test compound and inhibitor of MTH1) concentration (x-axis) for a 0.5-minute incubation.
Figure 15:
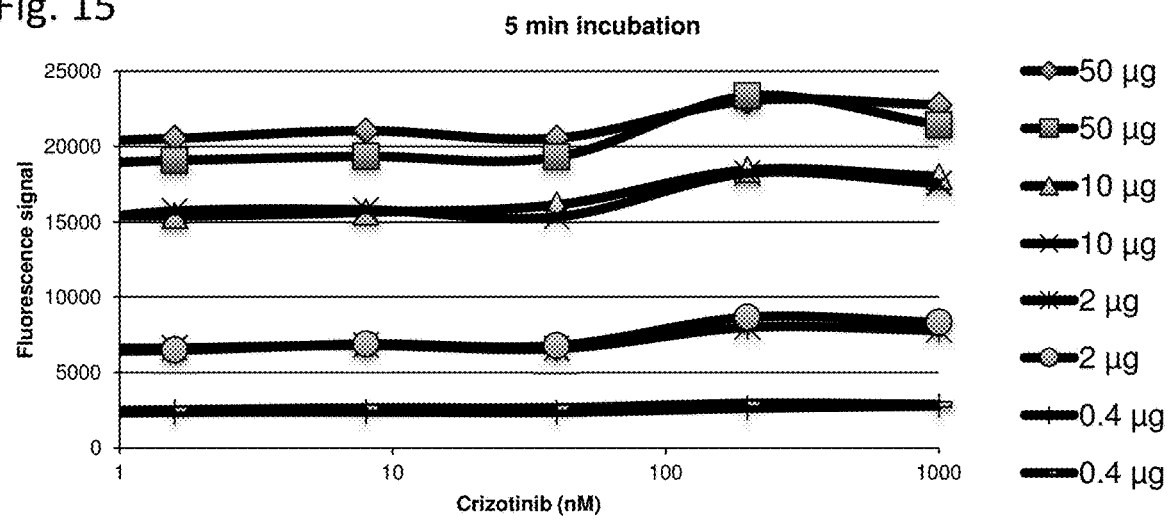
FIG. 15 shows the effect of the amount of lysate (legend) (prepared from cells expressing MTH1-3aa-S-tag) on fluorescence signal (y-axis) as a function of Crizotinib (test compound and inhibitor of MTH1) concentration (x-axis) for 5-minute incubation.
Figure 16:
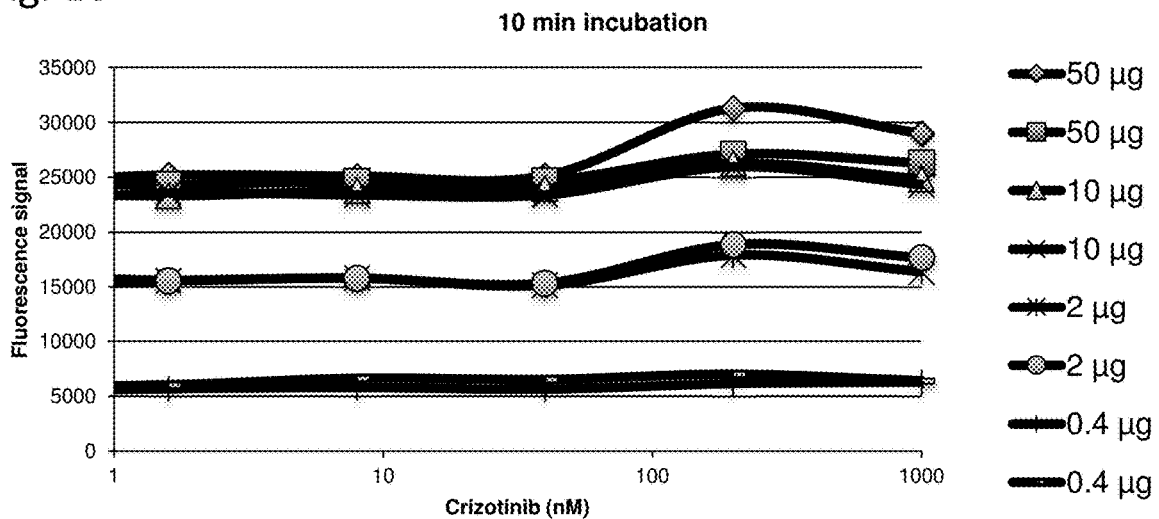
FIG. 16 shows the effect of the amount of lysate (legend) (prepared from cells expressing MTH1-3aa-S-tag) on fluorescence signal (y-axis) as a function of Crizotinib (test compound and inhibitor of MTH1) concentration (x-axis) for 10-minute incubation.

FIG. 14-16 demonstrate the effect of lysate/cell input in combination with incubation times on signal pattern and persistence, demonstrating melting profiles of the target protein (MTH1-3aa-S-tag) when engaged with its ligand (Crizotinib). Note that signal pattern between short and long incubation times was identical for Crizotinib-MTH1 engagement (FIGS. 14-16). Note persistence of signal pattern at longer incubation times, despite signal saturation. Also note wide signal separation at short incubation time of 0.5 min, and narrower signal separation at longer incubations. Also note reciprocity between lysate input and incubation time. Such flexibility of lysate/cell input in combination with incubation time can be used to detect engagement EC50 of ligands of various target engagement potencies, as well as various applications where various amounts of lysate input or incubation times may be preferred.

Example 2—Target Engagement in Plate Array Format

In one embodiment of a method or assay described herein, a target polypeptide is a protein, or modified protein thereof, encoded by a pathogen (non-limiting examples include coronaviruses, influenza virus, hepatitis virus, and even bacteriophages). The fusion protein comprises the target pathogen protein expressed with an N-terminal and/or C-terminal S-tag (e.g., a S-tag acceptor peptide). An expression construct for the pathogen protein would include a codon optimized cDNA to allow for maximum expression of the fusion protein. In this example, an array is used such that DNA encoding the fusion protein is provided to cells in a multi-well format (96 or 384 or 1536 well format) for expression in a cell line of interest. The DNA can be transfected into cells located in each of the wells of a multi-well plate to allow for protein expression. The plate array can be used to test single or multiple agents (drugs, i.e., test compounds) on all of the fusion proteins in a single run. In addition, the array can be tested with multiple doses of a single or multiple test compounds. The array can be used in a high-throughput method for testing compound libraries on the entire proteome of a pathogen. The array can be used to screen test compound binding under various physiological conditions (e.g., different buffers, presence of serum components, growth factors, or other stimulants). The plate can then be put through a gradient heating denaturation step followed by addition of the RNase donor for enzyme complementation and FRET-labeled substrate cleavage detection. Fluorescence detection using a plate reader would be performed in kinetic mode to monitor any potential increase in fluorescence over time.

Example 3—Incorporating Potential Virus Mutations in the Target Engagement Array In this example, an array comprises a variety of computer-generated combinations of highly mutated/mutagenic regions of SARS-Cov2 coronavirus proteins, or another pathogen. For example, various potential mutations of the Spike protein are generated using in silico tools and the target polypeptide variations fused to S-tag acceptor peptides are displayed on the array for drug engagement. The array would consist of plasmid DNA encoding the tagged proteins. Transfection of the DNA into a cell of choice and drug screening with one or more test compounds would follow. A random or focused library of drug compounds can be screened for engagement using a heat gradient denaturation step, followed by enzyme complementation, substrate cleavage and fluorescence detection.

Such an array can identify test compounds that engage one or more of the various viral protein targets. The array can address the response of virus mutations to therapeutics. The array can also explore therapeutic options to circumvent virus mutations, and potentially prevent future pandemics from an identical or related family of coronaviruses.

Example 4—Array of Influenza Virus, Either Complete or Partial

Each protein of an influenza virus is fused to an S-tag peptide acceptor. The repertoire of the selected influenza virus proteins can be limited to the highly mutated proteins of the Influenza virus family. The array can display highly mutated targets from historical Influenza pandemics and seasonal outbreaks; such targets can include Haemmaglutinin (HA), Neuraminidase (NA), M1, Nucleoprotein or other influenza targets. The array can similarly include computer-generated version of the highly mutated proteins of Influenza virus. The array is used to screen a panel of drug compounds for direct engagement with the virus proteins.

Such an array can identify drugs that engage with the various potential targets of influenza virus, both existing and predicted. The array assay can address the response of potential virus mutations to potential therapeutic test compounds. It can also address the effect of certain mutations on the virility of the future mutated versions of the pathogen. Both drugs and virus proteins can be ranked for engagement potency. The array will also identify therapeutics options to circumvent virus mutations, and potentially prevent future pandemics from identical family of Influenza viruses. Most effective, broad-specificity drugs can be also identified as potential therapeutics for future pandemics.

Example 5—Combined Array of Pathogen Families

This array provides a combined display of Hepatitis A, B and C viruses in one multiplex assay. Therapeutically important targets of the three viruses are displayed, and expressed in host liver cells. A panel of drugs are tested for target engagement in single-dose or multiple-dose patterns. The array can be expanded to other pathogen families such as Herpesviruses and Rotaviruses etc. Target engagement will be determined using the S-tag complementation assay for each target.

Combined pathogen testing provides an accelerated discovery path for multi-spectrum therapeutics. Drugs are ranked for target engagement potency per target in each pathogen sub-class. In this particular case, this approach enables discovery for multi-specific/multi-spectrum drugs for the Hepatitis family of viruses. It is especially useful for testing, discovery, ranking and validation of existing therapies and novel therapies for clinical and research purposes.

Example 6—Array of Bacteriophage Proteins

Bacteriophages of choice can be those that infect specific pathogenic bacteria, such as *Helicobacter pylori*, multi-drug resistant *Mycobacterium tuberculosis*, or broad-class pathogens such as *Mycobacterium* family. In each case, the individual proteins of the bacteriophage are cloned as S-tag fusion proteins, and displayed in an array as indicated above. The array can include variation from a single class or multiple classes of bacteriophages. The array can similarly include proteins representing bacterium surface receptors. A panel of drugs can be tested to for engagement with individual bacteriophage proteins or bacteriophage-bacteria protein pairs, using the S-tag complementation assay for each target.

Such an array is used for discovery of proteome-stabilizing drugs to enhance bacteriophage activity on host bacteria. The array is also used to identify agents that can enhance infectivity of the bacterium host, via enhanced bacteriophage-receptor interactions. Using this method, it is possible to discover drugs and therapeutic agents that can enhance bacteriophage activity on clinically important pathogens, such as multi-resistant *Mycobacterium tuberculosis*. Such drugs can be used in the clinic for clearance of drug-resistant pathogens from the human host.

Example 7—Array of Genetically-Randomized Pathogen Targets

Selected protein targets of a pathogen, such as Spike, Nuc or Memb proteins of SARS-CoV2 coronavirus, are genetically randomized using genome editing tools, such as CRISPR-Cas9, and fused to S-tag acceptor peptides. A library of such proteins is displayed in an array; each individual randomized edition of the virus target is represented. A panel of drugs can be screened for engagement with these virus proteins.

The array will identify drugs that engage with the various potential versions of the pathogen targets, both existing and predicted. The array can address the response of potential virus mutations to therapeutics. It can also address the effect of certain mutations on the virility of the future mutated versions of the pathogen. Both drugs and virus proteins can be ranked for engagement potency. The array will also identify therapeutics options to circumvent virus mutations, and potentially prevent future pandemics from identical family of coronaviruses. Most effective drugs can be identified; broad-specificity drugs can be also identified as potential therapeutics for future pandemics from identical pathogen families.

Example 8—Array of SARS-CoV-2 Proteome to Screen for Drug Target Engagement

Figure 17:
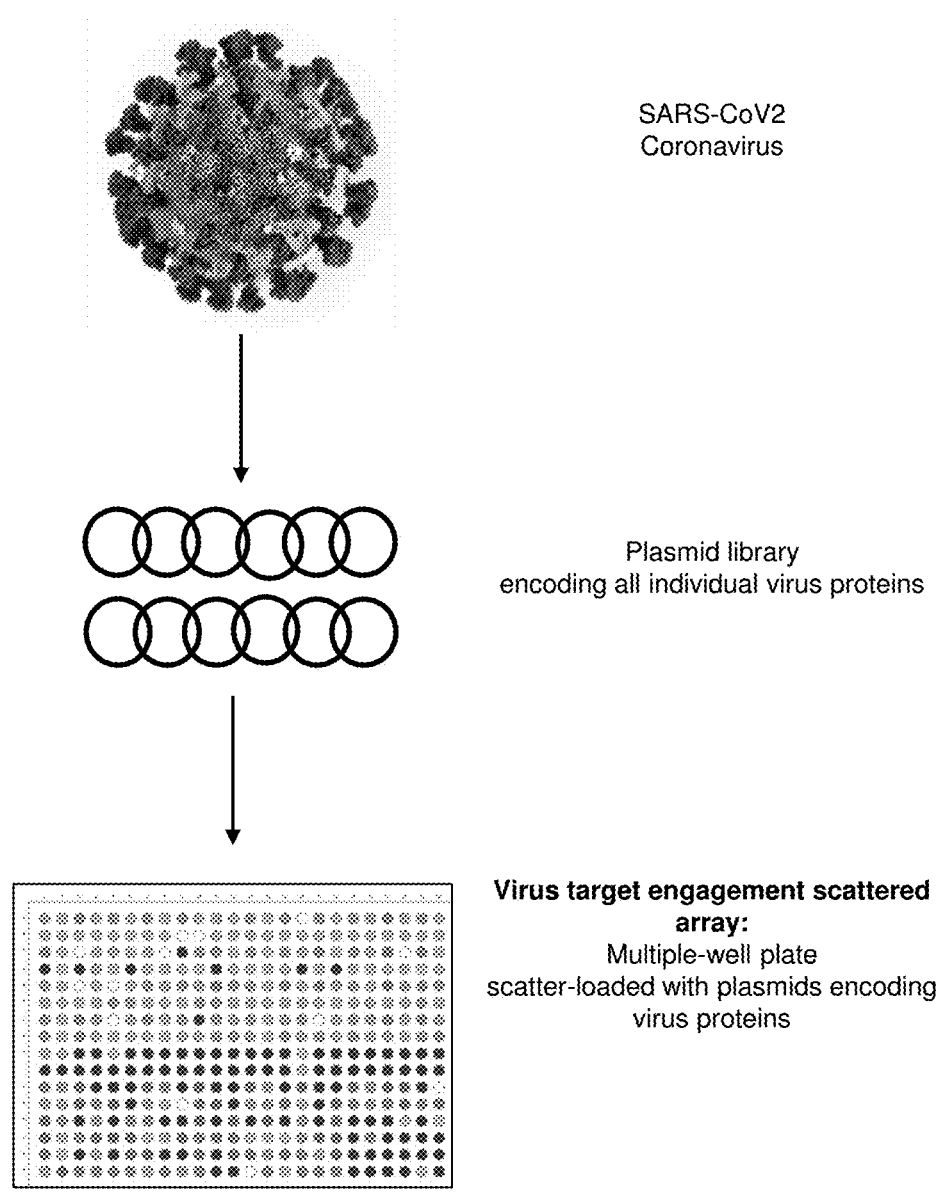
FIG. 17 provides an example of how the methods can be used to generate a scattered array displaying all proteins of SARS-CoV2 virus in one plate.
Figure 18:
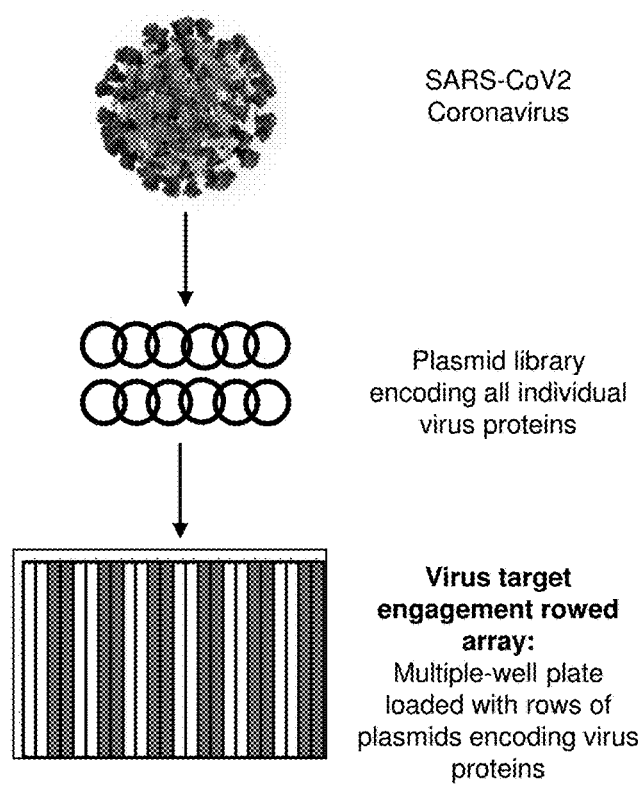
FIG. 18 provides an example of how the method can be used to generate a rowed array displaying all proteins of SARS-CoV2 virus in one plate.
Figure 20:
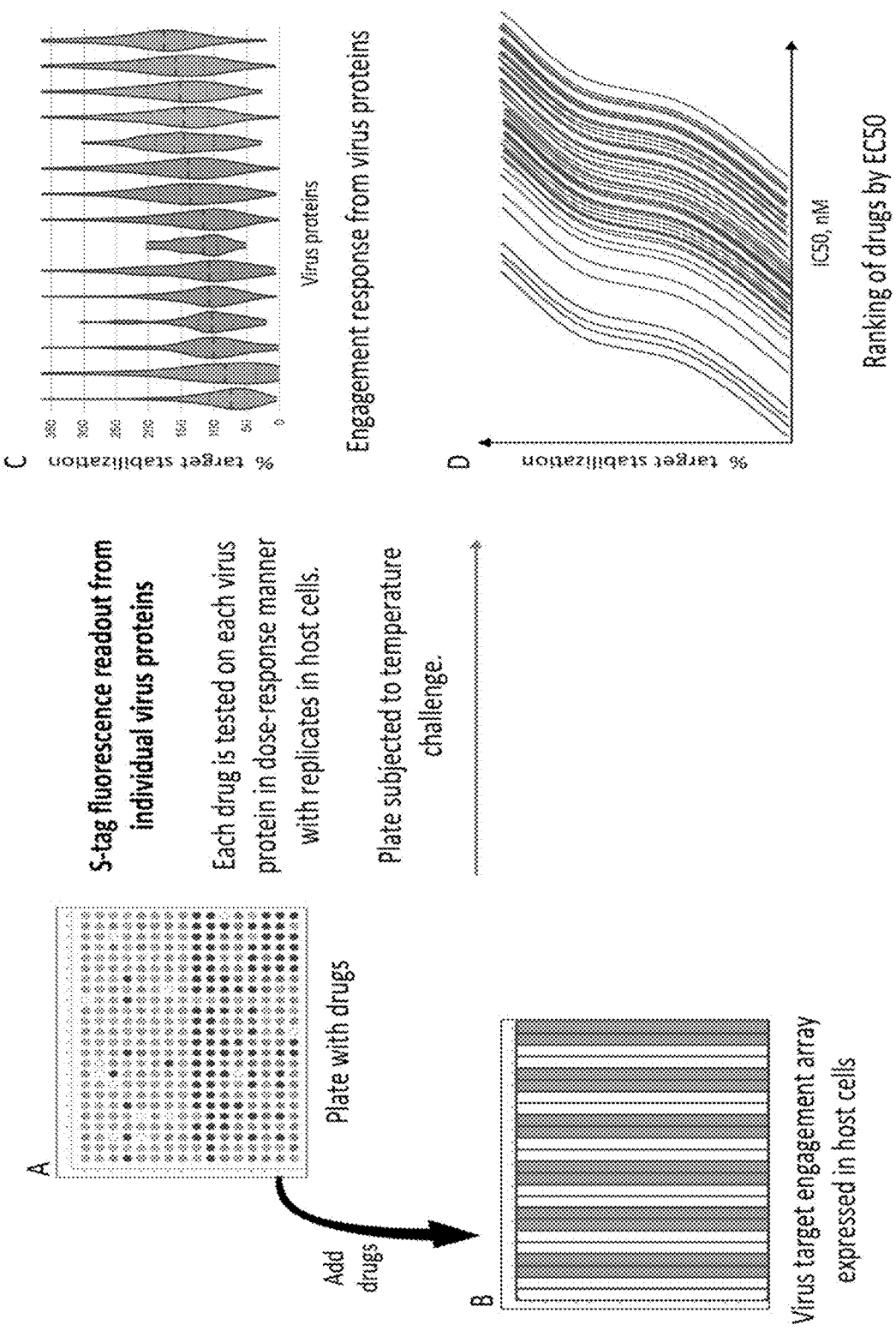
FIG. 20 shows an exemplary strategy for screening an array of peptides derived from a various pathogens showing how a pathogen array (panel A) (e.g., from FIGS. 17-19) can be used to test multiple drugs (panel B), in order to measure target engagement response (panels C & D) from each protein (i.e., target polypeptide) of the arrayed pathogen.
Figure 21:
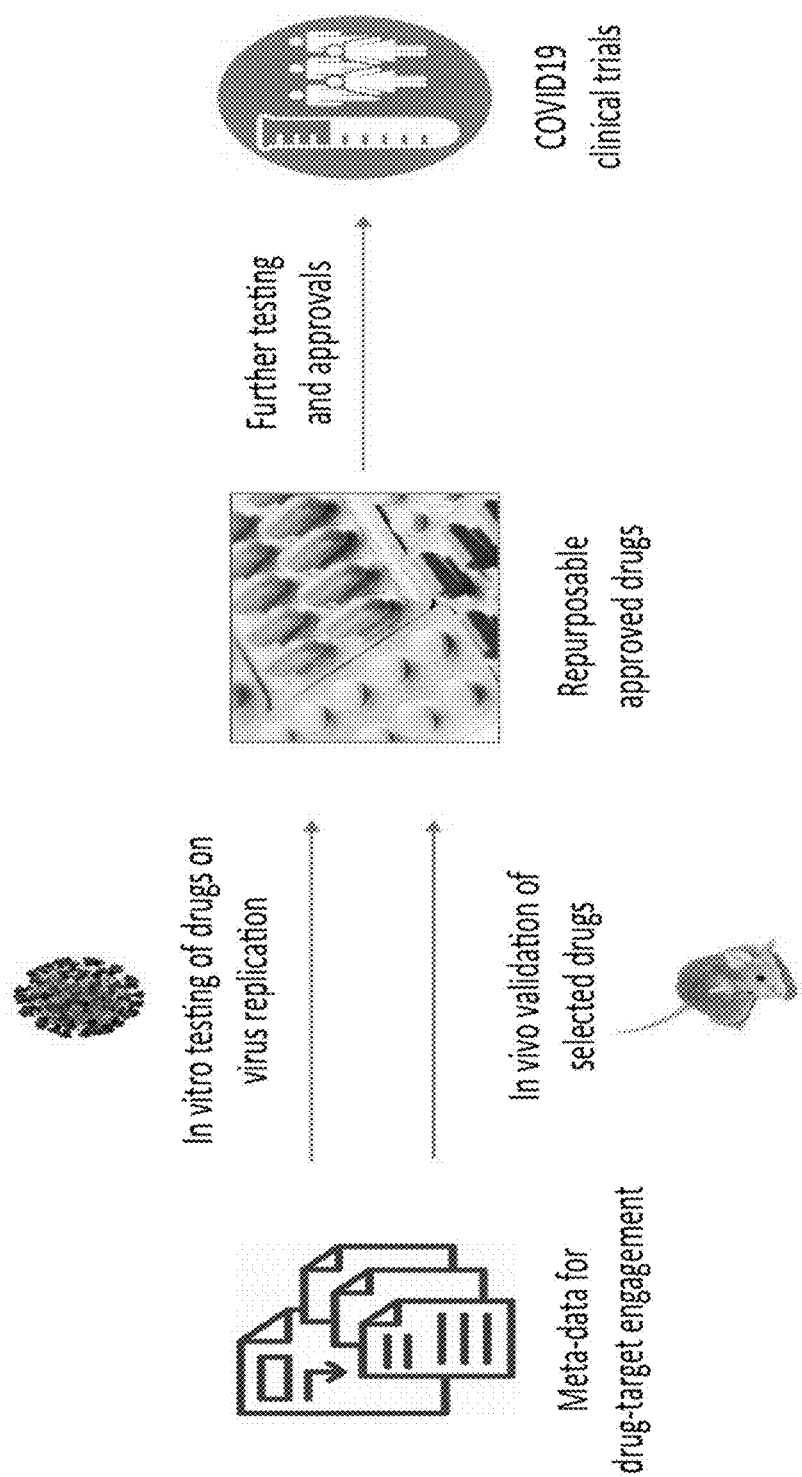
FIG. 21 shows an exemplary strategy for screening an array of small molecule compounds (test compounds) for their ability to interact with pathogen derived peptides in an effort to identify potential drug candidates for drug discovery. As demonstrated, an array (e.g., see FIG. 20) allows ranking of the virus proteins (i.e., targets) by their general response to denaturants and test compounds. An array allows ranking of multiple drugs (test compounds) by their potency of engagement (such as Effective dose and/or EC50). The system thus enables selecting the most effective drugs for the most responsive targets of the pathogen. Existing therapeutics can also be screened using a pathogen array, and thus can be re-purposed to treat, for example, COVID-19.

In one embodiment of an array, format may include the proteome of the SARS-CoV-2 proteome. The virus expresses 28 predicted proteins from viral RNA genome. The array can involve individual expression constructs for each of the viral proteins tagged with the S-tag acceptor peptide (e.g., see FIG. 17). The expression constructs can then be in a multi-well plate format for expression in a cell line of interest. The virus target engagement array plate can then be screened with single or multiple test agents for direct binding using the S-tag complementation assay for each target. The virus array may include several rows of a plate with the same tagged viral protein for expression allowing testing of agents under different physiological conditions in each row of the plate (e.g., see FIG. 18).

Example 9—Array for Discovery of Drug Formulations to Selected Individual Pathogen Targets, Such as Spike Protein of SARS-CoV2 Coronavirus This type of array represents a limited number of pathogen targets. A panel of drug compounds can be tested in various formulations to represent realistic pharmaceutical protocols. Such formulations can include enhancing agents, bulking agents, supplementary active ingredients, and combinations thereof. Engagement of such drug formulations can be tested on virus targets in a host cell model, using the S-tag complementation assay.

Expected outcome 6: Such screen will identify formulations that enhance the activity of active drug compounds for engagement with pathogen targets. Such screen will represent pharmaceutical development and can accelerate research-to-clinic transition of therapeutics. It will be particularly used for repurposing of existing drugs.

Example 10—Multi-Virus Array for Drug Target Engagement

In some embodiments of an array, several viral pathogen proteins from distinct virus may be tagged with an S-tag acceptor peptide and combined in a single array. The array would include a multi-well format with expression constructs for proteins encoded from different viruses, each fusion protein expressed in an individual well of the plate (e.g., see FIG. 19). The array can then be used to screen single or multiple test agents across proteins encoded by different viral pathogens (e.g., proteins from coronaviruses: SARS, MERS, HKU1; or from Hepatitis A, B, and C).

Example 11—Combined Array of Pathogen Families

This array provides a combined display of Hepatitis A, B and C viruses in one setting. Therapeutically important targets of the three viruses are displayed, and expressed in host liver cells. A panel of drugs are tested for target engagement in single-dose or multiple-dose pattern. The array can be expanded to other pathogen families such as Herpesviruses, or Rotaviruses etc. Target engagement will be read using the S-tag complementation assay.

Combined pathogen testing provides an accelerated discovery path for multi-spectrum therapeutics. Drugs are ranked for target engagement potency per target in each pathogen sub-class. In this particular case, this approach enables discovery for multi-specific/multi-spectrum drugs for Hepatitis family of viruses. It is especially useful for testing, discovery, ranking and validation of existing therapies and novel therapies for clinical and research purposes.

Example 12—Array of Host Proteins Required for Virus Entry

In this embodiment, an array may include expression of human, or mammalian, proteins necessary for pathogen binding and/or infection; and may include a mix of both human proteins and viral proteins known to be necessary for infection. As an example, the array may include the human angiotensin-converting enzyme 2 (ACE2) and human transmembrane serine protease 2 (TMPRSS2) as target polypeptides. These proteins are expressed on the surface of endothelial cells and play pivotal roles in SARS-CoV-2 viral entry and infection. The assay may then test single or multiple agents in varying doses to identify direct target engagement with one or both of the targets.

This array allows for multiplexing of protein targets tested with a single or multiple test agents. The virus target engagement array may be screened with multiple test agents at varying doses. Fluorescence readouts for each individual viral protein can then identify which protein a test agent is binding to and stabilizing the fusion protein under a heat gradient (e.g., see FIGS. 20A-20C). The array can also focus on a specific well with a specific viral protein tested with multiple agents at multiple doses to identify and rank drugs for ability to bind and stabilize the target under heat gradient (e.g., see FIG. 20D).

Example 13—Array of Virus-Host Interaction Proteome

Representative proteins from both SARS-Cov2 coronavirus and human host are displayed as fusion proteins comprising an S-tag acceptor peptide. For example, virus membrane proteins (Nuc, Memb, Spike) are displayed together with receptors ACE2, other members from ACE receptor family, AT1 receptor, AT2 receptor, and other potential cell surface receptors. Various host receptors can be included to represent various host tissues. Virus proteins can be displayed individually or in pairs with host proteins. A panel of drugs can be tested for engagement with single proteins of the virus or host, or their pairs.

This display can discover therapeutic options that will interfere with virus docking and integration of the virus with various host cell tissues. The array can also explore the potential infectivity of the virus with other less explored tissues of the host. Such tissues may be kidney, heart, spleen, brain, or liver.

Example 14—Whole Live Virus Array

In this embodiment, an array may include expression of chimeric live virus particles allowed to assemble with one or more component proteins fused with S-tag acceptor peptides. The array could be useful for assessing drug engagement with a protein of interest within the context of a live virus particle.

Example 15—Array of Chimeric Live Virus Particles

This embodiment of an array represents S-tag fused virus proteins, assembled into live virus particles. Cell lysates expressing these individual virus proteins are systematically added to cells where virulent SARS-CoV2 coronavirus is replicated. S-tagged virus proteins are incorporated by the host cell into live-assembled coronavirus particles. This generates an array of live chimeric coronavirus; the array is scalable. The array enables testing of drugs directly on individual virus targets in the context of live virus.

Such an array is used to test engagement of drugs to individual virus proteins in the context of live virus. The advantage of this system is the ability to incorporate the S-tagged proteins into live virus and test drugs on these live virus particles inside the host. Using S-tag complementation, one can: 1) measure virus replication as a result of drug interaction, 2) correlate target engagement with virus replication, 3) identify the virus proteins with the most impact on virus replication, and 4) discover the most clinically relevant drugs that have the most impact on virus replication.

Example 16—Different Thermal Profile Signatures of Fusion Proteins with S-Tag (Micro-Tag)

Materials and Methods

HEK-293 cells were from ATCC (Cat #CRL-1573) and were cultured in DMEM (Millipore SIGMA Cat #D5796) supplemented with 10% Fetal Bovine Serum (FBS) (Millipore SIGMA Cat #F2442), and 1× Penicillin/Streptomycin (Millipore SIGMA Cat #P4333). Trypsin-EDTA solution 1× (0.05% trypsin, 0.02% EDTA) was from Millipore SIGMA (Cat #59417C) and 20×TBS solution was from Teknova (Cat #T1680). Triton-X-100 was from Millipore SIGMA (Cat #X100). The detergent n-Dodecyl beta-D-maltoside (DDM) was from Millipore SIGMA (Cat #D4641). The MTH1 inhibitor (S)-Crizotinib was from Millipore SIGMA (Cat #PZ0240). The BCL6 inhibitors BI-3812 and BI-5273 were from Boehringer Ingelheim. DMSO was from Millipore SIGMA (Cat #673439). The 96 well plates were from CELLTREAT Scientific (Cat #229196); white PCR plates were from BIORAD (cat #MLL9651) and the Microseal 'B' film for sealing the PCR plates was from BIORAD (Cat #MSB1001); black 96 well plates from COSTAR (Cat #3915). Transfection of the cells was realized using Lipofectamine 2000 transfection reagent (Thermo Fisher Scientific Cat #11668027) according to manufacturer recommended protocol. The optimized fluorogenic substrate (5'-6FAM/ArUAA/3' TAMRA_(NHS ester) (v3)) was purchased from IDT. The S Protein was cloned with 6× His tag (SEQ ID NO:34) at the carboxy terminus into vector pET-30a(+) for bacterial expression using KPN1 GGTACC and BamH1 GGATCC cloning sites by Synbio Technologies Inc. The S protein His tag fusion protein was expressed and purified from bacteria by Synbio Technologies Inc.

The sequence of the cloned construct encoding the RNase donor was as follows:

(SEQ ID NO: 22)
GGTACCATGAGCAGCTCCAACTACTGTAACCAGATGATGAAGAGCCGGAA

CCTGACCAAAGATCGATGCAAGCCAGTGAACACCTTTGTGCACGAGTCCC

TGGCTGATGTCCAGGCCGTGTGCTCCCAGAAAAATGTTGCCTGCAAGAAT

GGGCAGACCAATTGCTACCAGAGCTACTCCACCATGAGCATCACCGACTG

CCGTGAGACCGGCAGCTCCAAGTACCCCAACTGTGCCTACAAGACCACCC

AGGCGAATAAACACATCATTGTGGCTTGTGAGGGAAACCCGTACGTGCCA

GTCCACTTTGATGCTTCAGTGCATCACCATCACCATCAC<u>TAG</u>GGATCC.

The sequence encoding the 6× His tag (SEQ ID NO:34) is bold and the TAG stop codon is underlined.

The corresponding translated amino acid sequence of the His tagged RNase donor protein (S protein) was:

(SEQ ID NO: 23)
MSSSNYCNQMMKSRNLTKDRCKPVNTFVHESLADVQAVCSQKNVACKNGQ

TNCYQSYSTMSITDCRETGSSKYPNCAYKTTQANKHIIVACEGNPYVPVH

FDASVHHHHHH.

Cloning of the S-tag acceptor peptide with the mutT homologue (MTH1) protein (i.e., the target polypeptide) was performed by Synbio Technologies Inc. Cloning of the S-tag acceptor peptide to the carboxy terminal of MTH1 was as follows in vector pcDNA3.1(+): cloning site KPN1 GGTACC and BamH1 GGATCC (bold).

We generated the encoding construct with no linker between MTH1 and the S-tag peptide (underlined) as shown below:

(SEQ ID NO: 24)
GGTACCATGGGCGCCTCCAGGCTCTATACCCTGGTGCTGGTCCTGCAGCC

TCAGCGAGTTCTCCTGGGCATGAAAAAGCGAGGCTTCGGGGCCGGCCGGT

GGAATGGCTTTGGGGGCAAAGTGCAAGAAGGAGAGACCATCGAGGATGGG

GCTAGGAGGGAGCTGCAGGAGGAGAGCGGTCTGACAGTGGACGCCCTGCA

CAAGGTGGGCCAGATCGTGTTTGAGTTCGTGGGCGAGCCTGAGCTCATGG

ACGTGCATGTCTTCTGCACAGACAGCATCCAGGGGACCCCCGTGGAGAGC

GACGAAATGCGCCCATGCTGGTTCCAGCTGGATCAGATCCCCTTCAAGGA

CATGTGGCCCGACGACAGCTACTGGTTTCCACTCCTGCTTCAGAAGAAGA

AATTCCACGGGTACTTCAAGTTCCAGGGTCAGGACACCATCCTGGACTAC

ACACTCCGCGAGGTGGACACGGTC<u>AAGGAAACTGCAGCAGCCAAGTTTGA</u>

<u>GCGGCAGCACATGGACTCCAGCACTTCCGCTGCCTAGGCTGCCTAG</u>GGAT

CC.

The translated amino acid sequence for resulting fusion protein comprising the MTH1 and carboxy terminal S-tag acceptor peptide is shown below. The 20 amino acid sequence of the S-tag acceptor peptide is underlined. It was determined that the S-tag could be shortened to the first 15 amino acids and still act as an S-tag acceptor peptide.

(SEQ ID NO: 25)
MGASRLYTLVLVLQPQRVLLGMKKRGFGAGRWNGFGGKVQEGETIEDGAR

RELQEESGLTVDALHKVGQIVFEFVGEPELMDVHVFCTDSIQGTPVESDE

MRPCWFQLDQIPFKDMWPDDSYWFPLLLQKKKFHGYFKFQGQDTILDYTL

REVDTV<u>KETAAAKFERQHMDSSTSAA</u>.

We also generated an encoding construct for a fusion protein comprising a 3 amino acid linker (boxed) between the MTH1 target polypeptide and the S-tag acceptor peptide (underlined) as shown below:

(SEQ ID NO: 26)
GGTACCATGGGCGCCTCCAGGCTCTATACCCTGGTGCTGGTCCTGCAGCCT

CAGCGAGTTCTCCTGGGCATGAAAAAGCGAGGCTTCGGGGCCGGCCGGTGG

AATGGCTTTGGGGGCAAAGTGCAAGAAGGAGAGACCATCGAGGATGGGGCT

AGGAGGGAGCTGCAGGAGGAGAGCGGTCTGACAGTGGACGCCCTGCACAAG

GTGGGCCAGATCGTGTTTGAGTTCGTGGGCGAGCCTGAGCTCATGGACGTG

CATGTCTTCTGCACAGACAGCATCCAGGGGACCCCCGTGGAGAGCGACGAA

ATGCGCCCATGCTGGTTCCAGCTGGATCAGATCCCCTTCAAGGACATGTGG

CCCGACGACAGCTACTGGTTTCCACTCCTGCTTCAGAAGAAGAAATTCCAC

GGGTACTTCAAGTTCCAGGGTCAGGACACCATCCTGGACTACACACTCCGC

GAGGTGGACACGGTC<span style="border:1px solid">GCCGCCGCC</span><u>AAGGAAACTGCAGCAGCCAAGTTTGAG</u>

<u>CGGCAGCACATGGACTCCAGCACTTCCGCTGCCTAGGCTGCCTAG</u>GGATCC

Synthesis of the BCL6 (B-Cell Lymphoma 6) S-Peptide micro-tag construct was performed at Twist Biosciences and the corresponding nucleotide sequence was:

(SEQ ID NO: 30)
ATGGCCTCGCCGGCTGACAGCTGTATCCAGTTCACCCGCCATGCCAGTGA

TGTTCTTCTCAACCTTAATCGTCTCCGGAGTCGAGACATCTTGACTGATG

TTGTCATTGTTGTGAGCCGTGAGCAGTTTAGAGCCCATAAAACGGTCCTC

ATGGCCTGCAGTGGCCTGTTCTATAGCATCTTTACAGACCAGTTGAAATG

CAACCTTAGTGTGATCAATCTAGATCCTGAGATCAACCCTGAGGGATTCT

GCATCCTCCTGGACTTCATGTACACATCTCGGCTCAATTTGCGGGAGGGC

AACATCATGGCTGTGATGGCCACGGCTATGTACCTGCAGATGGAGCATGT

TGTGGACACTTGCCGGAAGTTTATTAAGGCCAGTGAAGCAGAGATGGTTT

CTGCCATCAAGCCTCCTCGTGAAGAGTTCCTCAACAGCCGGATGCTGATG

CCCCAAGACATCATGGCCTATCGGGTCGTGAGGTGGTGGAGAACAACCT

GCCACTGAGGAGCGCCCCTGGGTGTGAGAGCAGAGCCTTTGCCCCCAGCC

TGTACAGTGGCCTGTCCACACCGCCAGCCTCTTATTCCATGTACAGCCAC

CTCCCTGTCAGCAGCCTCCTCTTCTCCGATGAGGAGTTTCGGGATGTCCG

GATGCCTGTGGCCAACCCCTTCCCCAAGGAGCGGGCACTCCCATGTGATA

GTGCCAGGCCAGTCCCTGGTGAGTACAGCCGGCCGACTTTGGAGGTGTCC

CCCAATGTGTGCCACAGCAATATCTATTCACCCAAGGAAACAATCCCAGA

AGAGGCACGAAGTGATATGCACTACAGTGTGGCTGAGGGCCTCAAACCTG

CTGCCCCCTCAGCCCGAAATGCCCCCTACTTCCCTTGTGACAAGGCCAGC

AAAGAAGAAGAGAGACCCTCCTCGGAAGATGAGATTGCCCTGCATTTCGA

GCCCCCCAATGCACCCCTGAACCGGAAGGGTCTGGTTAGTCCACAGAGCC

CCCAGAAATCTGACTGCCAGCCCAACTCGCCCACAGAGTCCTGCAGCAGT

AAGAATGCCTGCATCCTCCAGGCTTCTGGCTCCCCTCCAGCCAAGAGCCC

CACTGACCCCAAAGCCTGCAACTGGAAGAAATACAAGTTCATCGTGCTCA

ACAGCCTCAACCAGAATGCCAAACCAGAGGGGCCTGAGCAGGCTGAGCTG

GGCCGCCTTTCCCCACGAGCCTACACGGCCCCACCTGCCTGCCAGCCACC

CATGGAGCCTGAGAACCTTGACCTCCAGTCCCCAACCAAGCTGAGTGCCA

GCGGGGAGGACTCCACCATCCCACAAGCCAGCCGGCTCAATAACATCGTT

AACAGGTCCATGACGGGCTCTCCCCGCAGCAGCAGCGAGAGCCACTCACC

ACTCTACATGCACCCCCCGAAGTGCACGTCCTGCGGCTCTCAGTCCCCAC

-continued

```
AGCATGCAGAGATGTGCCTCCACACCGCTGGCCCCACGTTCCCTGAGGAG
ATGGGAGAGACCCAGTCTGAGTACTCAGATTCTAGCTGTGAGAACGGGGC
CTTCTTCTGCAATGAGTGTGACTGCCGCTTCTCTGAGGAGGCCTCACTCA
AGAGGCACACGCTGCAGACCCACAGTGACAAACCCTACAAGTGTGACCGC
TGCCAGGCCTCCTTCCGCTACAAGGGCAACCTCGCCAGCCACAAGACCGT
CCATACCGGTGAGAAACCCTATCGTTGCAACATCTGTGGGGCCCAGTTCA
ACCGGCCAGCCAACCTGAAAACCCACACTCGAATTCACTCTGGAGAGAAG
CCCTACAAATGCGAAACCTGCGGAGCCAGATTTGTACAGGTGGCCCACCT
CCGTGCCCATGTGCTTATCCACACTGGTGAGAAGCCCTATCCCTGTGAAA
TCTGTGGCACCCGTTTCCGGCACCTTCAGACTCTGAAGAGCCACCTGCGA
ATCCACACAGGAGAGAAACCTTACCATTGTGAGAAGTGTAACCTGCATTT
CCGTCACAAAAGCCAGCTGCGACTTCACTTGCGCCAGAAGCATGGCGCCA
TCACCAACACCAAGGTGCAATACCGCGTGTCAGCCACTGACCTGCCTCCG
GAGCTCCCCAAAGCCTGCaaggaaactgcagcagccaagtttgagcggca
gcacatggactccagcacttccgctgccTGA
```

The lower case letters identify the S-peptide nucleotide residues at the carboxy terminus. The resulting protein amino acid sequence of the expressed protein is shown below and the S-peptide sequence is underlined:

(SEQ ID NO: 31)
MASPADSCIQFTRHASDVLLNLNRLRSRDILTDVVIVVSREQFRAHKTVL
MACSGLFYSIFTDQLKCNLSVINLDPEINPEGFCILLDFMYTSRLNLREG
NIMAVMATAMYLQMEHVVDTCRKFIKASEAEMVSAIKPPREEFLNSRMLM
PQDIMAYRGREVVENNLPLRSAPGCESRAFAPSLYSGLSTPPASYSMYSH
LPVSSLLFSDEEFRDVRMPVANPFPKERALPCDSARPVPGEYSRPTLEVS
PNVCHSNIYSPKETIPEEARSDMHYSVAEGLKPAAPSARNAPYFPCDKAS
KEEERPSSEDEIALHFEPPNAPLNRKGLVSPQSPQKSDCQPNSPTESCSS
KNACILQASGSPPAKSPTDPKACNWKKYKFIVLNSLNQNAKPEGPEQAEL
GRLSPRAYTAPPACQPPMEPENLDLQSPTKLSASGEDSTIPQASRLNNIV
NRSMTGSPRSSSESHSPLYMHPPKCTSCGSQSPQHAEMCLHTAGPTFPEE
MGETQSEYSDSSCENGAFFCNECDCRFSEEASLKRHTLQTHSDKPYKCDR
CQASFRYKGNLASHKTVHTGEKPYRCNICGAQFNRPANLKTHTRIHSGEK
PYKCETCGARFVQVAHLRAHVLIHTGEKPYPCEICGTRFRHLQTLKSHLR
IHTGEKPYHCEKCNLHFRHKSQLRLHLRQKHGAITNTKVQYRVSATDLPP
ELPKAC<u>KETAAAKFERQHMDSSTSAA</u>-

Synthesis of the EGFR S-peptide tag construct was performed at Twist Biosciences and the corresponding nucleotide sequence was:

(SEQ ID NO: 32)
```
atgcgaccctccgggacggccggggcagcgctcctggcgctgctggctgcgctctgcccggcgagtcgggctctggagg
aaaagaaagtttgccaaggcacgagtaacaagctcacgcagttgggcacttttgaagatcattttctcagcctccagag
gatgttcaataactgtgaggtggtccttgggaatttggaaattacctatgtgcagaggaattatgatctttccttctta
aagaccatccaggaggtggctggttatgtcctcattgccctcaacacagtggagcgaattcctttggaaaacctgcaga
tcatcagaggaaatatgtactacgaaaattcctatgccttagcagtcttatctaactatgatgcaaataaaaccggact
gaaggagctgcccatgagaaatttacaggaaatcctgcatggcgccgtgcggttcagcaacaaccctgccctgtgcaac
gtggagagcatccagtggcgggacatagtcagcagtgactttctcagcaacatgtcgatggacttccagaaccacctgg
gcagctgccaaaagtgtgatccaagctgtcccaatgggagctgctggggtgcaggagaggagaactgccagaaactgac
caaaatcatctgtgcccagcagtgctccgggcgctgccgtggcaagtcccccagtgactgctgccacaaccagtgtgct
gcaggctgcacaggcccccgggagagcgactgcctggtctgccgcaaattccgagacgaagccacgtgcaaggacacct
gccccccactcatgctctacaaccccaccacgtaccagatggatgtgaaccccgagggcaaatacagctttggtgccac
ctgcgtgaagaagtgtccccgtaattatgtggtgacagatcacggctcgtgcgtccgagcctgtggggccgacagctat
gagatggaggaagacggcgtccgcaagtgtaagaagtgcgaagggccttgccgcaaagtgtgtaacggaataggtattg
gtgaatttaaagactcactctccataaatgctacgaatattaaacacttcaaaaactgcacctccatcagtggcgatct
ccacatcctgccggtggcatttagggtgactccttcacacatactcctcctctggatccacaggaactggatattctg
aaaaccgtaaaggaaatcacaggttttttgctgattcaggcttggcctgaaaacaggacggacctccatgcctttgaga
acctagaaatcatacgcggcaggaccaagcaacatggtcagttttctcttgcagtcgtcagcctgaacataacatcctt
gggattacgctccctcaaggagataagtgatgagatgtgataatttcaggaaacaaaaatttgtgctatgcaaataca
ataaactggaaaaaactgtttgggacctccggtcagaaaaccaaaattataagcaacagaggtgaaaacagctgcaagg
ccacaggccaggtctgccatgccttgtgctccccgagggctgctggggcccggagcccagggactgcgtctcttgccg
gaatgtcagccgaggcagggaatgcgtggacaagtgcaaccttctggagggtgagccaagggagtttgtggagaactct
```

-continued

```
gagtgcatacagtgccacccagagtgcctgcctcaggccatgaacatcacctgcacaggacggggaccagacaactgta
tccagtgtgcccactacattgacggccccactgcgtcaagacctgcccggcaggagtcatgggagaaaacaacaccct
ggtctggaagtacgcagacgccggccatgtgtgccacctgtgccatccaaactgcacctacggatgcactgggccaggt
cttgaaggctgtccaacgaatgggcctaagatcccgtccatcgccactgggatggtgggggcccctcctcttgctgctgg
tggtggccctggggatcggcctcttcatgcgaaggcgccacatcgttcggaagcgcacgctgcggaggctgctgcagga
gagggagcttgtggagcctcttacacccagtggagaagctcccaaccaagctctcttgaggatcttgaaggaaactgaa
ttcaaaaagatcaaagtgctgggctccggtgcgttcggcacggtgtataagggactctggatcccagaaggtgagaaag
ttaaaattcccgtcgctatcaaggaattaagagaagcaacatctccgaaagccaacaaggaaatcctcgatgaagccta
cgtgatggccagcgtggacaaccccacgtgtgccgcctgctgggcatctgcctcacctccaccgtgcagctcatcatg
cagctcatgcccttcggctgcctcctggactatgtccgggaacacaaagacaatattggctcccagtacctgctcaact
ggtgtgtgcagatcgcaaagggcatgaactacttggaggaccgtcgcttggtgcaccgcgacctggcagccaggaacgt
actggtgaaaacaccgcagcatgtcaagatcacagattttgggcgggccaaactgctgggtgcggaagagaaagaatac
catgcagaaggaggcaaagtgcctatcaagtggatggcattggaatcaattttcacacagaatctatacccaccagagtg
atgtctggagctacggggtgactgtttgggagttgatgacctttggatccaagccatgacggaatccctgccagcga
gatctcctccatcctggagaaggagaacgcctcccctcagccacccatatgtaccatcgatgtctacatgatcatggtc
aagtgctggatgatagacgcagatagtcgcccaaagttccgtgagttgatcatcgaattctccaaaatggcccgagacc
cccagcgctaccttgtcattcaggggatgaaagaatgcatttgccaagtcctacagactccaacttctaccgtgccct
gatggatgaagaagacatggacgacgtggtggatgccgacgagtacctcatcccacagcagggcttcttcagcagcccc
tccacgtcacggactcccctcctgagctctctgagtgcaaccagcaacaattccaccgtggcttgcattgatagaaatg
ggctgcaaagctgtcccatcaaggaagacagcttcttgcagcgatacagctcagaccccacaggcgccttgactgagga
cagcatagacgacaccttcctcccagtgcctgaatacataaaccagtccgttcccaaaaggcccgctggctctgtgcag
aatcctgtctatcacaatcagcctctgaaccccgcgcccagcagagacccacactaccaggaccccacagcactgcag
tgggcaaccccgagtatctcaacactgtccagcccacctgtgtcaacagcacattcgacagccctgcccactgggccca
gaaaggcagccaccaaattagcctggacaaccctgactaccagcaggacttctttcccaaggaagccaagccaaatggc
atctttaagggctccacagctgaaaatgcagaatacctaagggtcgcgccacaaagcagtgaatttattggagcaaagg
aaactgcagcagccaagtttgagcggcagcacatggactccagcacttccgctgcctga
```

The S-peptide nucleotide sequence at the carboxy terminus is underlined. The resulting protein amino acid sequence of the expressed protein is:

(SEQ ID NO: 33)
MRPSGTAGAALLALLAALCPASRALEEKKVCQGTSNKLTQLGTFEDHFLS
LQRMFNNCEVVLGNLEITYVQRNYDLSFLKTIQEVAGYVLIALNTVERIP
LENLQIIRGNMYYENSYALAVLSNYDANKTGLKELPMRNLQEILHGAVRF
SNNPALCNVESIQWRDIVSSDFLSNMSMDFQNHLGSCQKCDPSCPNGSCW
GAGEENCQKLTKIICAQQCSGRCRGKSPSDCCHNQCAAGCTGPRESDCLV
CRKFRDEATCKDTCPPLMLYNPTTYQMDVNPEGKYSFGATCVKKCPRNYV
VTDHGSCVRACGADSYEMEEDGVRKCKKCEGPCRKVCNGIGIGEFKDSLS
INATNIKHFKNCTSISGDLHILPVAFRGDSFTHTPPLDPQELDILKTVKE
ITGFLLIQAWPENRTDLHAFENLEIIRGRTKQHGQFSLAVVSLNITSLGL
RSLKEISDGDVIISGNKNLCYANTINWKKLFGTSGQKTKIISNRGENSCK
ATGQVCHALCSPEGCWGPEPRDCVSCRNVSRGRECVDKCNLLEGEPREFV
ENSECIQCHPECLPQAMNITCTGRGPDNCIQCAHYIDGPHCVKTCPAGVM
GENNTLVWKYADAGHVCHLCHPNCTYGCTGPGLEGCPTNGPKIPSIATGM
VGALLLLLVVALGIGLFMRRRHIVRKRTLRRLLQERELVEPLTPSGEAPN
QALLRILKETEFKKIKVLGSGAFGTVYKGLWIPEGEKVKIPVAIKELREA
TSPKANKEILDEAYVMASVDNPHVCRLLGICLTSTVQLIMQLMPFGCLLD
YVREHKDNIGSQYLLNWCVQIAKGMNYLEDRRLVHRDLAARNVLVKTPQH
VKITDFGRAKLLGAEEKEYHAEGGKVPIKWMALESILHRIYTHQSDVWSY
GVTVWELMTFGSKPYDGIPASEISSILEKGERLPQPPICTIDVYMIMVKC
WMIDADSRPKFRELIIEFSKMARDPQRYLVIQGDERMHLPSPTDSNFYRA
LMDEEDMDDVVDADEYLIPQQGFFSSPSTSRTPLLSSLSATSNNSTVACI
DRNGLQSCPIKEDSFLQRYSSDPTGALTEDSIDDTFLPVPEYINQSVPKR

-continued

PAGSVQNPVYHNQPLNPAPSRDPHYQDPHSTAVGNPEYLNTVQPTCVNST

FDSPAHWAQKGSHQISLDNPDYQQDFFPKEAKPNGIFKGSTAENAEYLRV

APQSSEFIGAK<u>ETAAAKFERQHMDSSTSAA</u>-

The S-peptide sequence at the carboxy terminus is underlined.

A. Cell Transfection and Lysate Preparation

HEK293 cells were transfected using Lipofectamine 2000 according to manufacturer protocol. Two days after transfection, media was removed and cells lifted by pipetting up and down using 1×TBS. Cells were centrifuged at 400 g for 4 min. The TBS wash was removed and the cells lysed with either 1% Triton X 100 in TBS for MTH1 and BCL6, or 0.5% DDM in TBS for EGFR expressing cells. Cells were lysed at 4° C. on a rotator for 1 hour and cell debris removed by gentle centrifugation for 1 minute at 6000 rpm. Lysates were transferred to a new tube and aliquots that were not used immediately in the assay were frozen at −80° C. for future use.

B. Thermal Profile

The lysates prepared from cells overexpressing the constructs were diluted 1/10 with 1× TBS and 40 ul aliquoted to PCR tubes or plates and heated at a gradient of heat in a thermal cycler for 15 minutes. After heating, the samples were immediately assayed in the enzyme complementation. A mix of 1.25 µg/ml S Protein and 250 nM FRET-labeled nucleic acid substrate in 1×TBS with 0.5% DMSO was combined with the heated sample and fluorescence detected using a microplate reader. The plate was read in kinetic mode (excitation=485 nm, emission=520 nm) with the PolarStar Omega 96-well plate reader. Every plate was read every minute for 20 minutes (21 time points were generated).

For determination of the thermal profile and to determine the $T_{agg}$, $T_{max}$, or $T_{min}$, RAW fluorescence or fluorescence signal generated per minute was plotted with temperature. A sigmoidal plot identifies temperature of aggregation, or maximal signal, or minimal signal.

C. Small Molecule Target Engagement Screening

Small molecule compounds were dissolved in DMSO at 10 mM and serial dilutions in DMSO at 100× concentration were prepared from this stock. Lysates from cells expressing the micro-tagged (S-peptide tagged) protein were diluted with cold 1×TBS at 1/10 and 39.6 ul aliquoted to a PCR plate; 0.4 ul of the 100× small molecule was added, the plate sealed, vortexed and centrifuged for 2 min. The plate was then heated at the appropriate temperature for 15 minutes followed by 1 minute cool down at 25° C. Reaction Buffer (1.25 µg/ml S Protein Binding Partner and 250 nM FRET-labeled substrate in 1×TBS with 0.5% DMSO) was prepared and 120 ul transferred to a black 96 well plate. The heated sample (30 ul) was added and fluorescence detected using a microplate reader. The plate was read in kinetic mode (excitation=485 nm, emission=520 nm) with the PolarStar Omega 96-well plate reader.

For analysis, the RAW fluorescence signal or fluorescence change per minute was plotted with inhibitor dose on a Semi-Log scale using GraphPad Prism. Nonlinear regression analysis was used for curve fitting to identify EC50 of target engagement or apparent $K_D$.

Results

The application of Micro-tag (S-tag) to cell target engagement relies on the principle of protein thermal melting. Cells or cell lysates expressing Micro-tag construct were put through a thermal gradient to identify a temperature of aggregation. This is a temperature at which a portion of the protein denatures and aggregates thus becoming insoluble. In a thermal shift assay the protein can be rescued from this heat denaturation through binding of a ligand that impacts the conformation of the protein, making it more stable under denaturing conditions such as heat challenge.

A. Thermal Profile of Micro-Tagged Targets

Figure 23A:
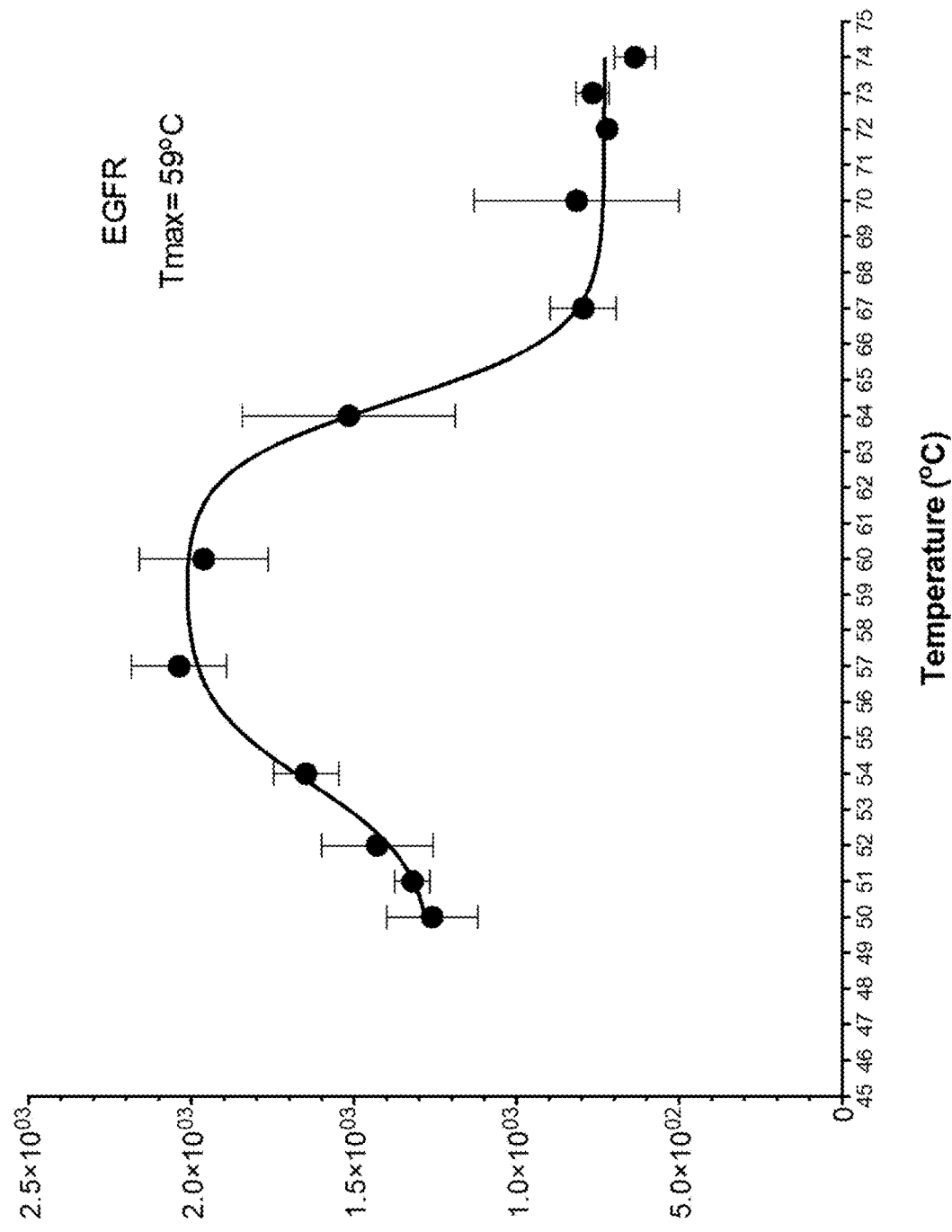
FIGS. 23A-23C show exemplary thermal profiles of several micro-tagged (S-tag) fusion protein constructs reveals unique heat signatures for these tagged proteins.
Figure 23B:
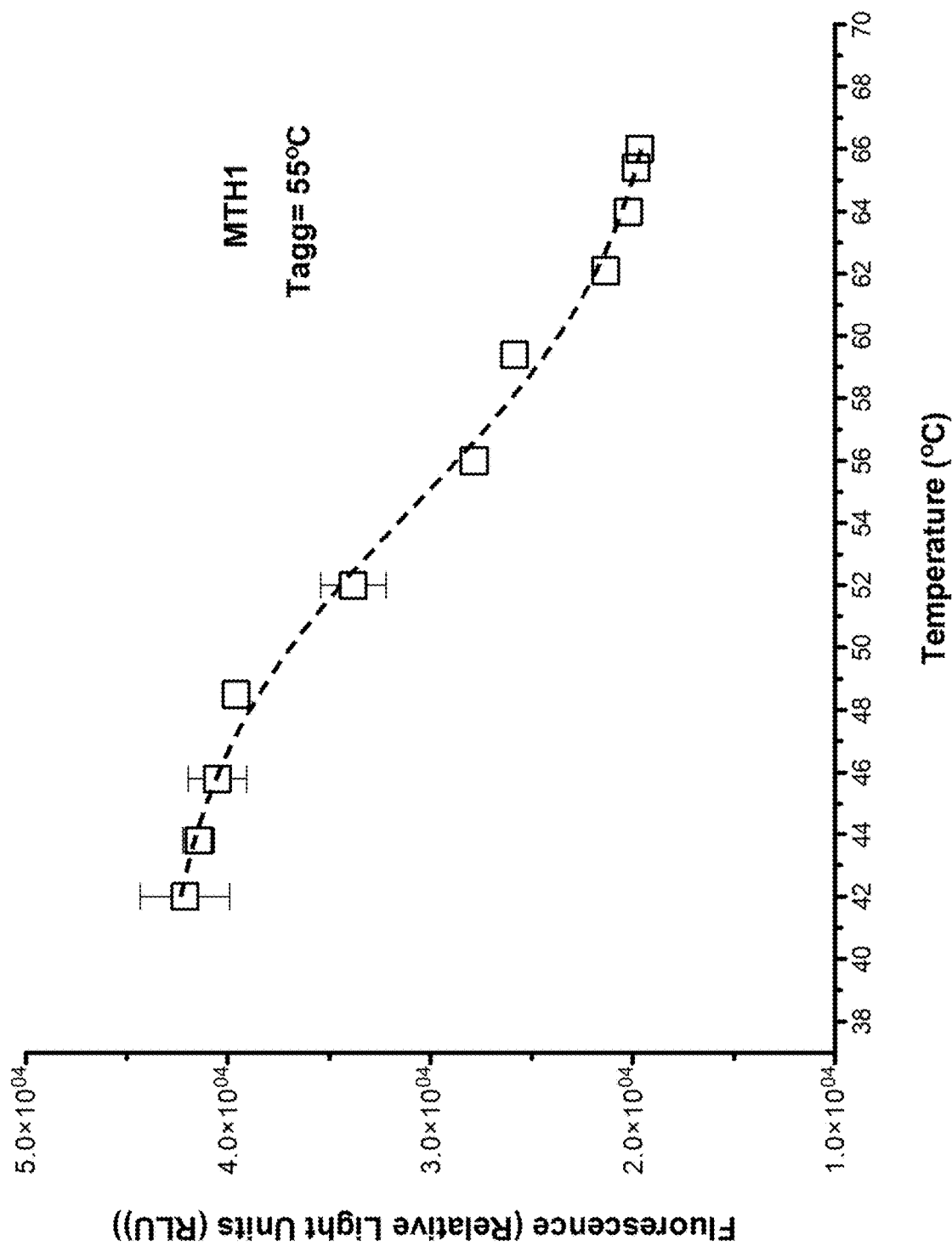
Figure 23C:
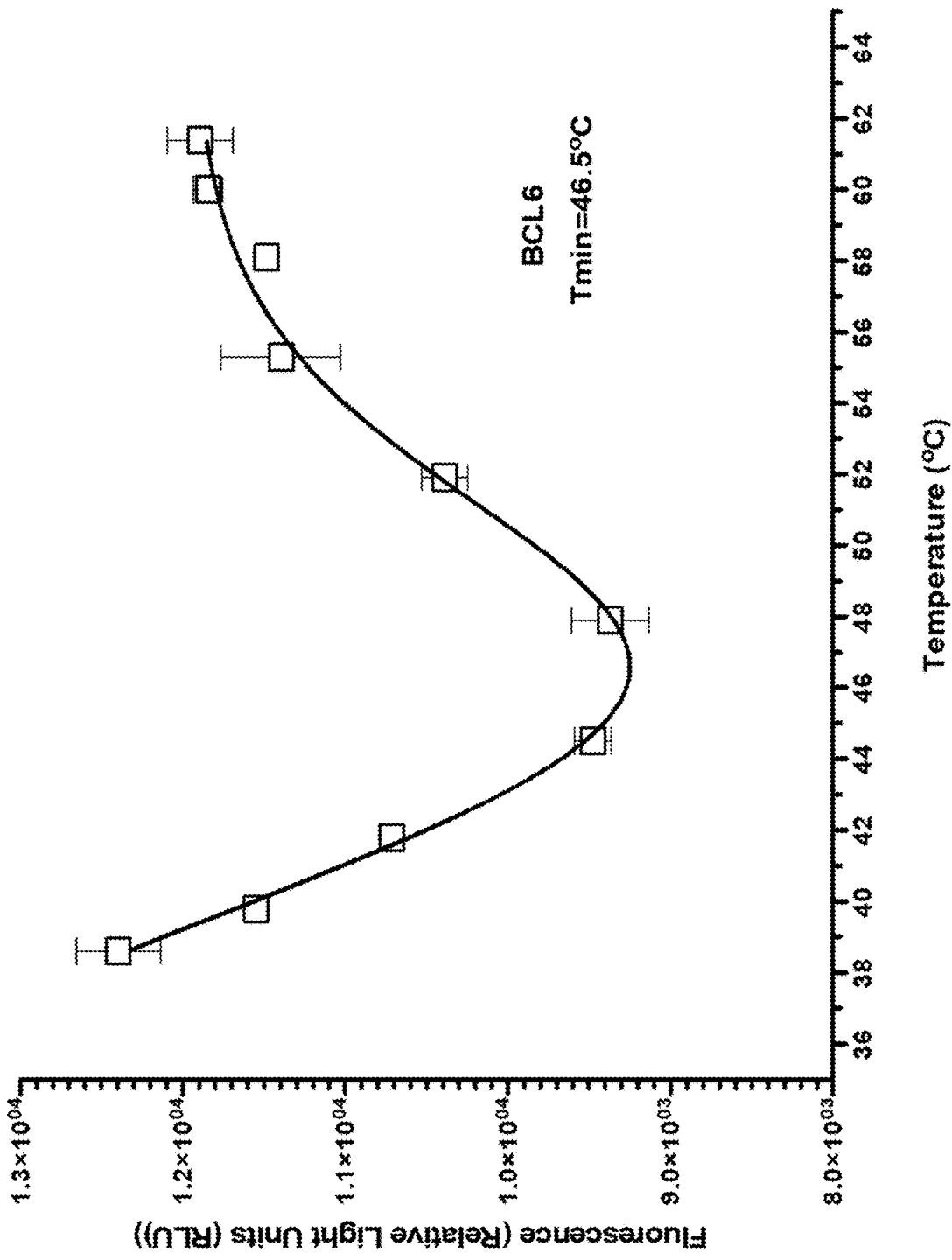

In order to screen for ligands that will bind to a micro-tagged construct, the cells expressing the construct, or non-denaturing lysates prepared from these cells, were put through a thermal gradient to identify a temperature of aggregation for the protein. However, an interesting feature for this Micro-tag system was that thermal challenge to the tagged proteins identified several different thermal signatures: a Temperature of aggregation ($T_{agg}$), a Temperature of maximal signal ($T_{max}$), and a temperature of minimal signal ($T_{min}$) (FIGS. 23A-23C).

Figure 24:
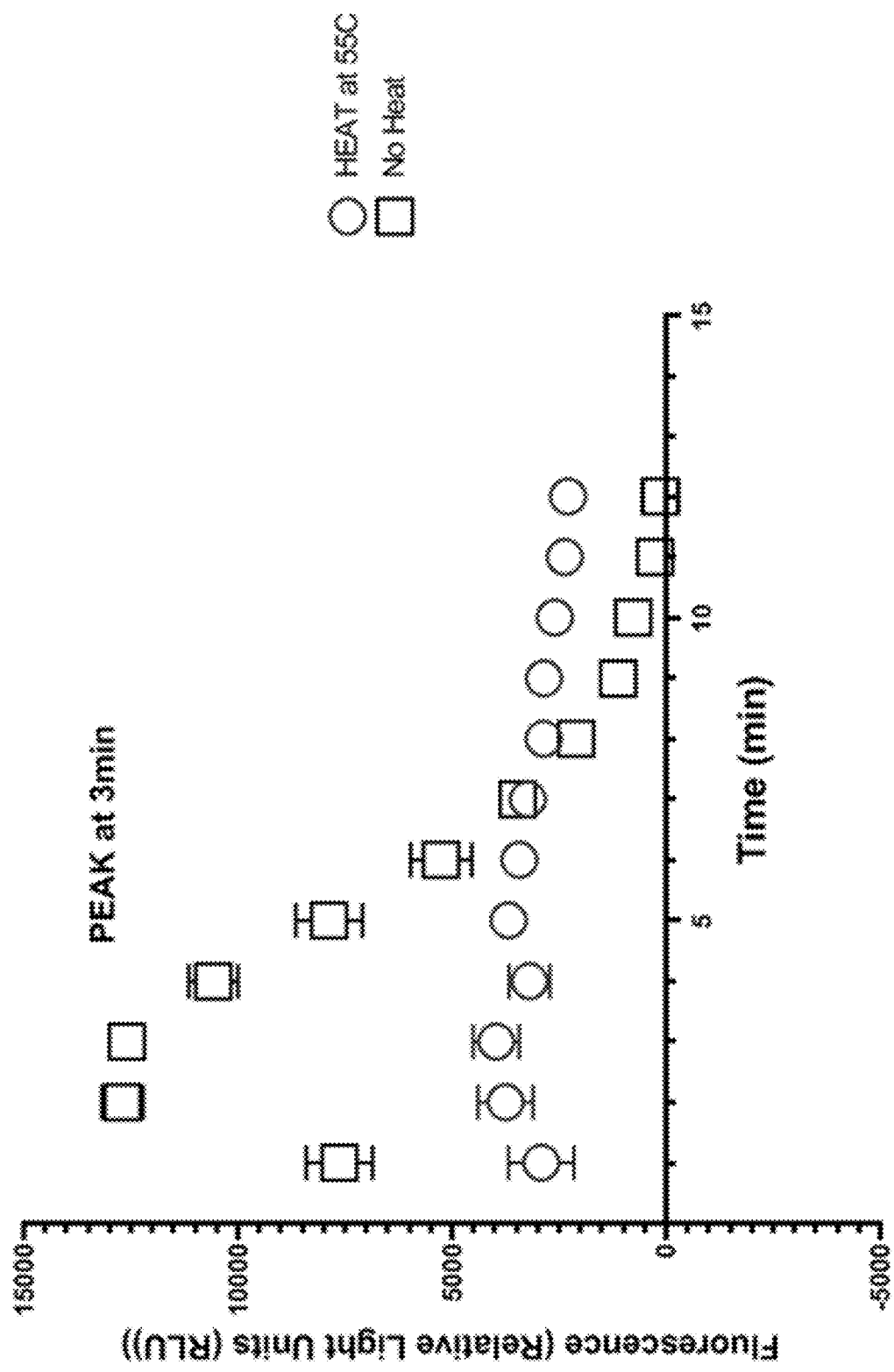
FIG. 24 shows an exemplary fluorescence signal over time (relative light units (RLU) per minute) for MTH1 micro-tag (S-tag) fusion protein heated at $T_{agg}$ temperature or not heated. The sample that was not heated rapidly developed fluorescence signal that peaked within the first 3 minutes followed by a decrease in fluorescence signal development resulting from the depletion (by cleavage) of the FRET-labeled substrate. The heated sample had less micro-tag protein (MTH1-3aa-S-tag fusion protein) and showed slower depletion (cleavage) of the substrate.

Heating cells or lysates from cells overexpressing MTH1 micro-tag (S-peptide tagged) protein at 55° C. ($T_{agg}$) can be used for screening molecules that will bind and stabilize the MTH1 micro-tagged protein resulting in higher fluorescence signal. The micro-tag (S-peptide) assay system detected fluorescence increase that was directly proportional to the amount of micro-tagged protein in the reaction. The ability to monitor fluorescence signal development in real time combined with the fast enzyme kinetics of the active whole RNase enzyme (S-peptide complemented with S protein) offered a unique feature not possible with other similar target engagement strategies; monitoring FRET-labeled substrate depletion. As shown in FIG. 24, this system could be used to examine development of fluorescence over time (relative light units (RLU) change per minute) that directly resulted from cleavage of the FRET-labeled substrate. The increase in fluorescence signal within the first 3 minutes of the reaction, the peak fluorescence at about 3 to 4 minutes, and the drop in fluorescence after 4 minutes were all directly proportional to the amount of micro-tagged protein in the assay. This showed the flexibility of the assay in terms of providing different ways to directly quantify the level of the micro-tagged protein.

B. Screening for Molecules Binding to Micro-Tagged Proteins

Figure 25A:
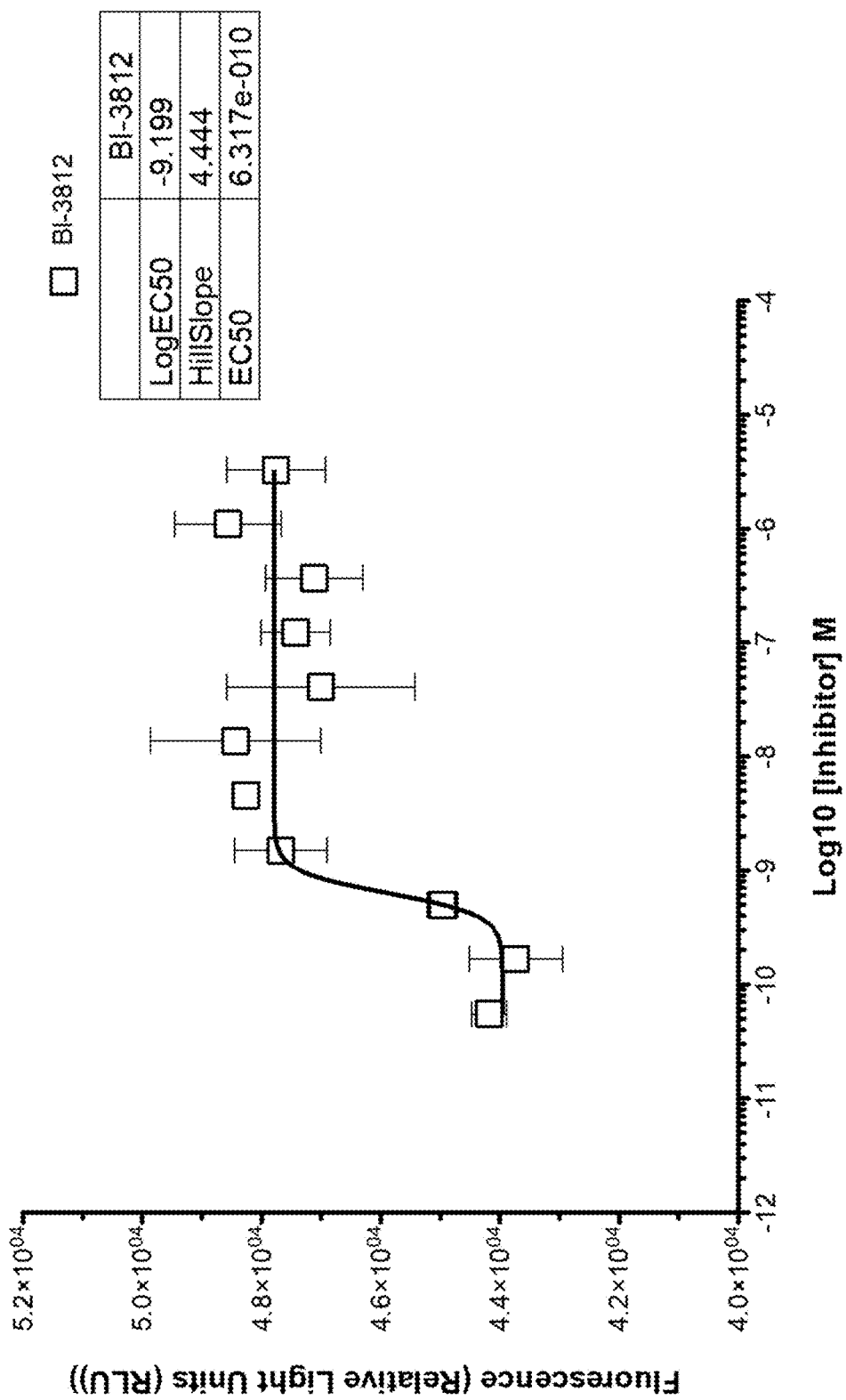
FIGS. 25A-25B show an exemplary testing of BCL6-Micro-tag (BCL6-S-tag fusion protein) with BI-3812 and BI-5273 inhibitors. Micro-tagged BCL6 was expressed in HEK293 cells and lysates from these cells were treated with the inhibitor (FIG. 25A) BI-3812 and the inactive analog (FIG. 25B) BI-5273. Samples were heated at the $T_{min}$ and the fluorescence signal (relative light units) detected after a 4-minute incubation with the S protein (nuclease donor) and the FRET-labeled substrate.
Figure 25B:
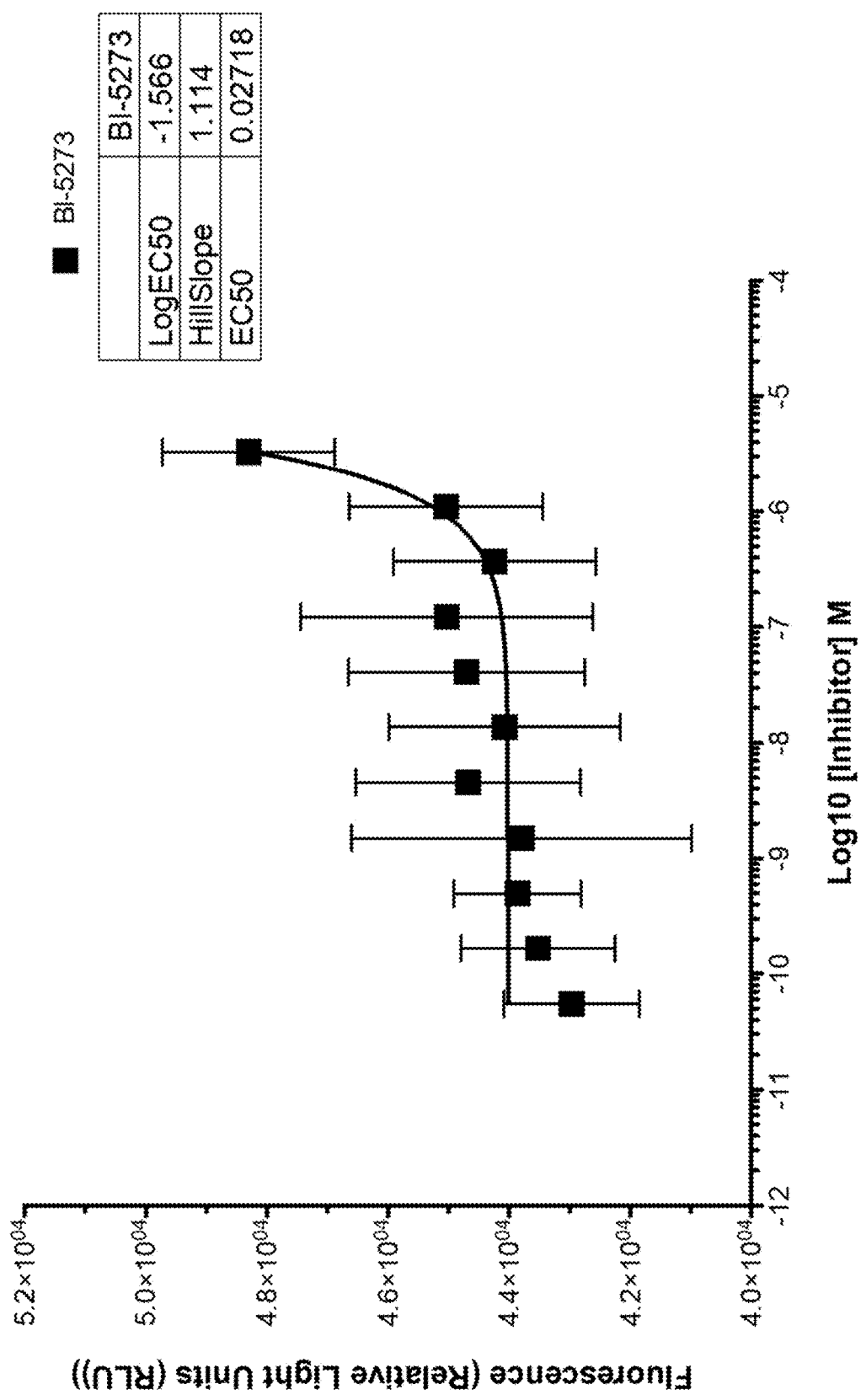

Once the temperature of maximum signal ($T_{max}$), temperature of aggregation ($T_{agg}$), or temperature of minimal signal ($T_{min}$) have been identified for the protein of interest then ligand binding could be assessed at these temperatures. If a ligand bound the micro-tagged protein then a conformational change would occur from the binding event that would stabilize the micro-tagged protein in heat or other denaturation challenge. Here, we employed BCL6 Micro-tagged protein together with its well-characterized Boehringer Ingelheim Inhibitor, BI-3812, that has an in vitro IC50 of about 3 nM. A close structural analog of BI-3812 is the inactive compound BI-5273, which has an in vitro IC50 of about 10 uM. Incubation of these inhibitors with cells or lysates from HEK293 cells overexpressing BCL6 Micro-tag resulted in identification of an EC50 of target engagement (FIGS. 25A-25B).

Figure 26A:
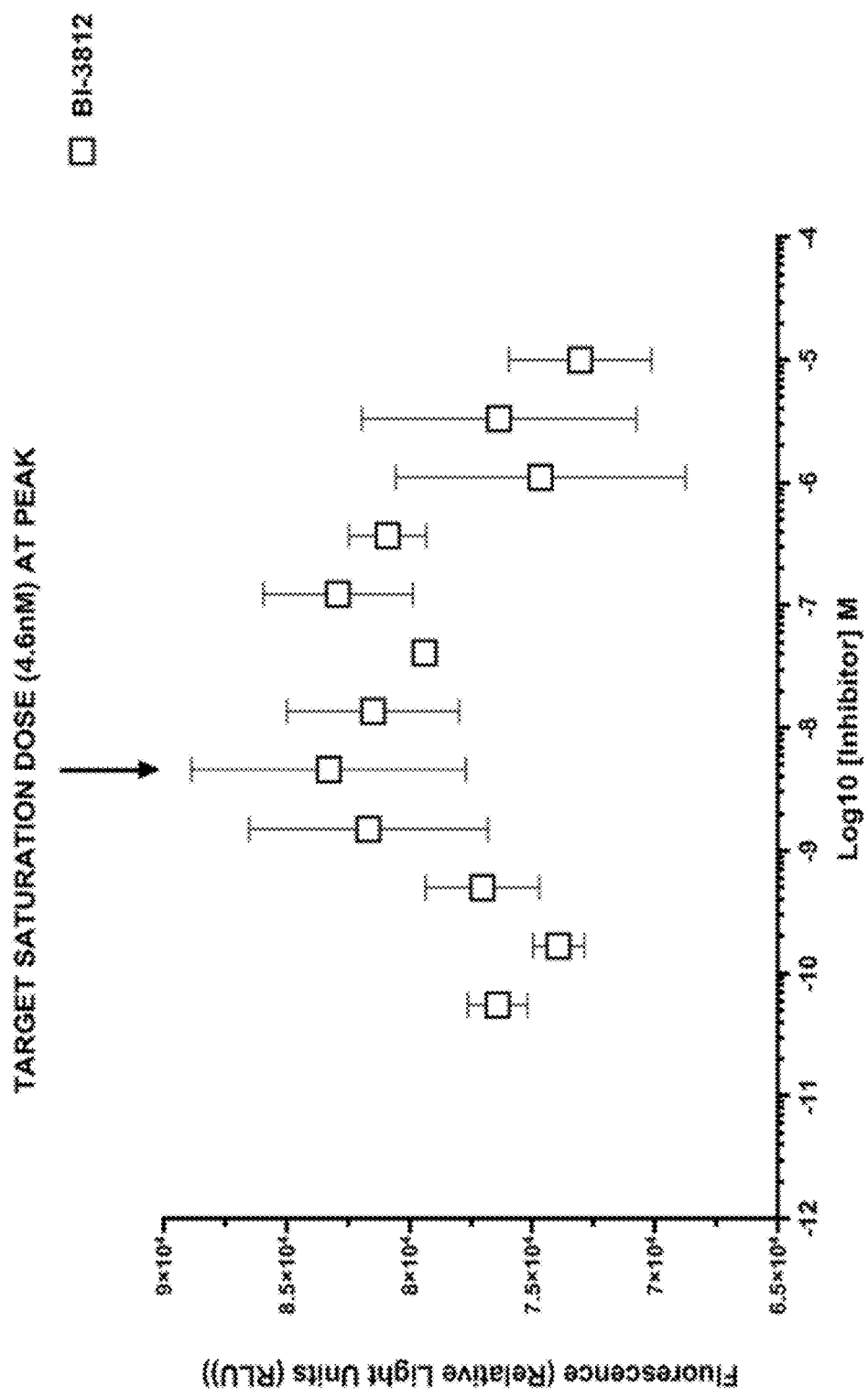
FIGS. 26A-26C show that, after 15 minutes, the peak of fluorescence identified the target saturation dose.
Figure 26B:
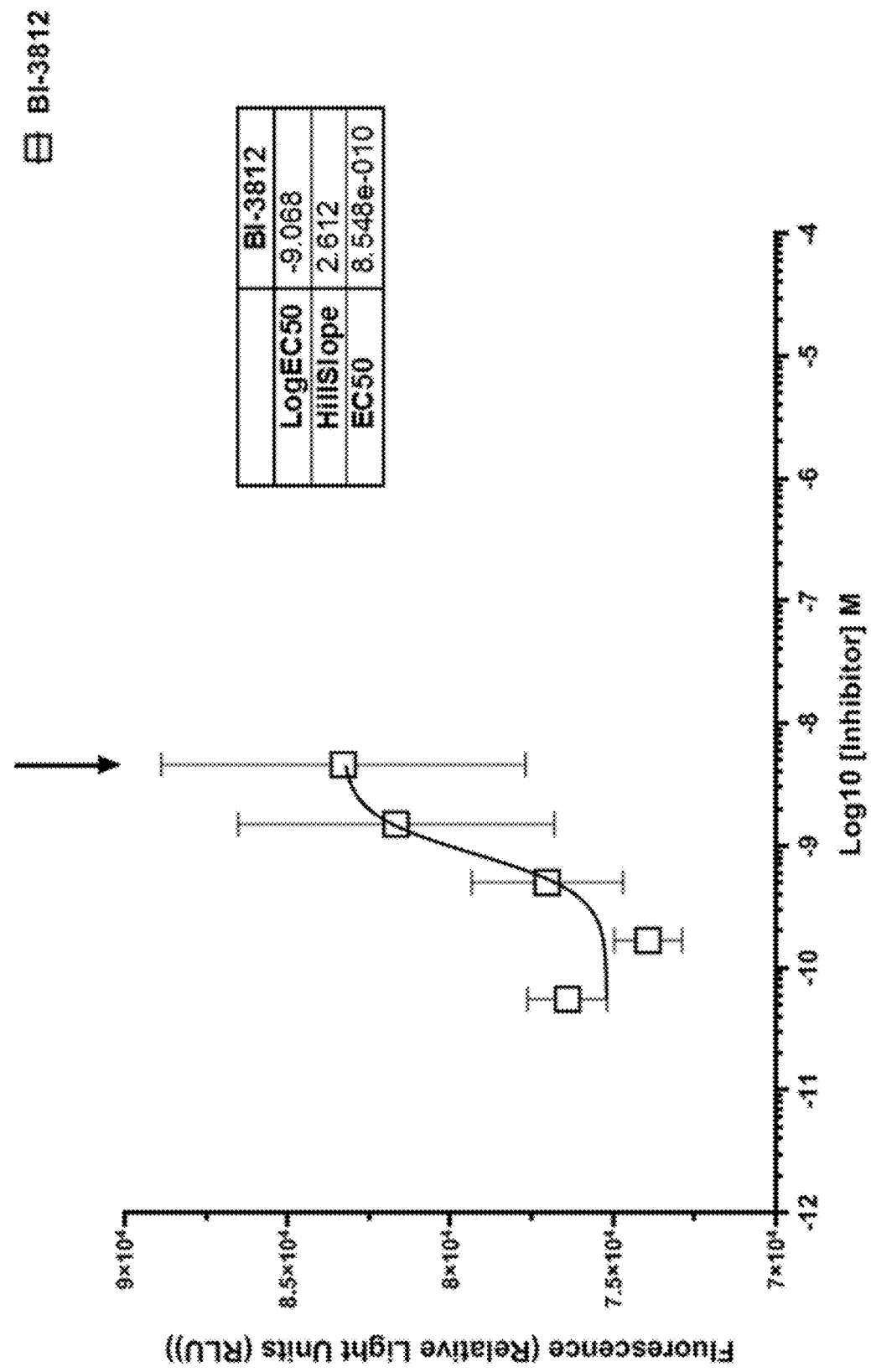
Figure 26C:
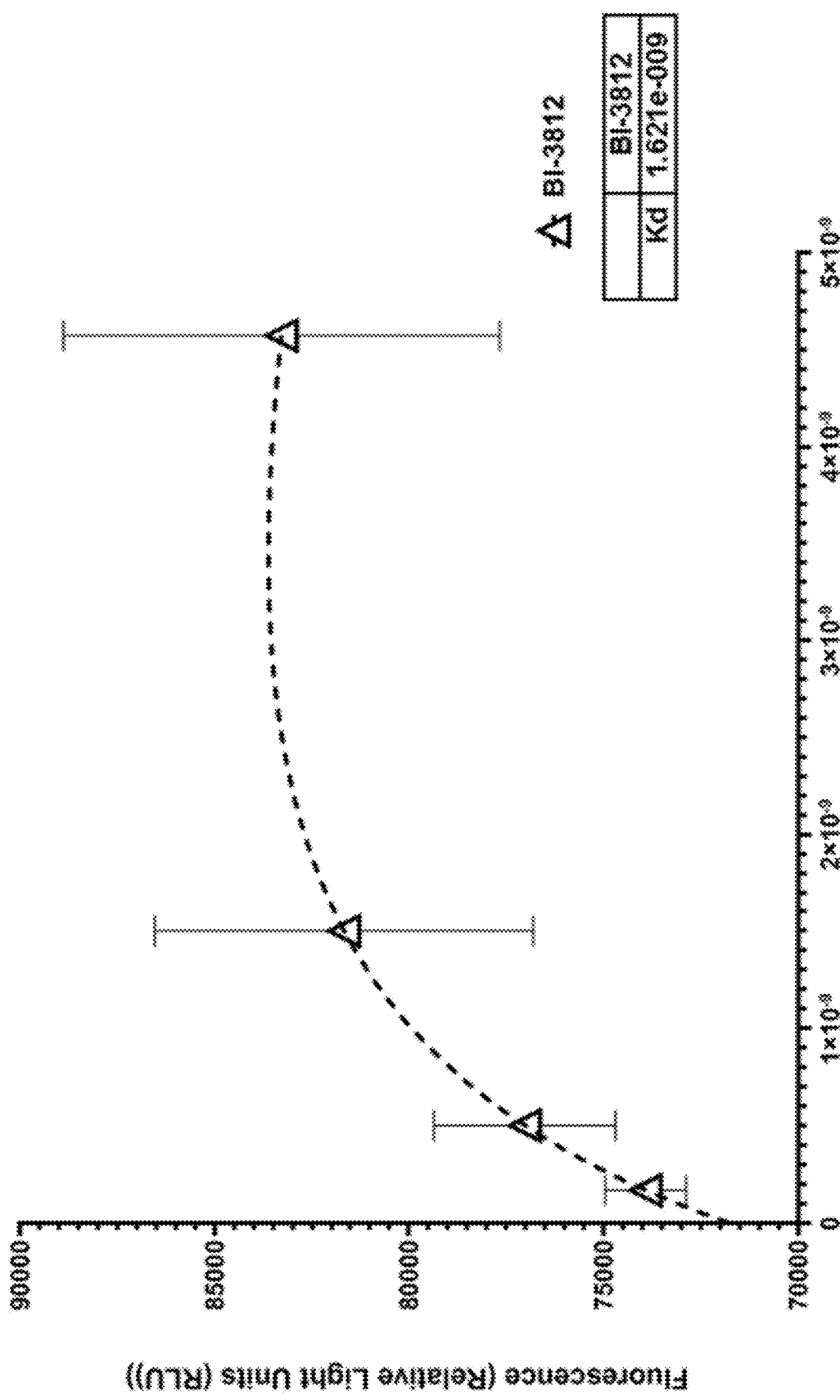

After 4 minutes incubation the fluorescence detected could be plotted with dose of inhibitor tested on a semi-log scale. Using nonlinear regression analysis and fitting a Sigmoidal dose-response curve (with variable slope) using GraphPad Prism identified an EC50 of Target Engagement. The BCL6 specific inhibitor BI-3812 bound to the BCL6 micro-tag protein with an EC50 of target engagement of 0.63 nM (FIGS. 25A-25B). The inactive analog did not bind the target. Allowing the S protein reaction to go for longer period of time (10-15 minutes) resulted in deletion of the FRET-labeled substrate as demonstrated by a decreased fluorescence increase per minute (RLU/min) at concentrations of BI-3812 that had stabilized the target. The peak fluorescence signal identified the dose of inhibitor that saturates the micro-tag protein target. At concentrations of the inhibitor above this saturating dose there was rapid cleavage of the FRET-labeled substrate resulting in loss of fluorescence signal over time (Relative Light Unit per minute (RLU/min)) and lower fluorescence detected. At concentrations below this saturating dose, the micro-tag construct was denatured in the heat challenge and there was less micro-tag available for enzyme complementation resulting in lower fluorescence signal (FIG. 26A). Removal of data points beyond the target saturation dose allowed for: (1) determination of the EC50 of target engagement, and (2) determination of the Apparent Equilibrium Dissociation Constant (apparent $K_D$) for the drug binding to the protein target (FIGS. 26B and 26C). The EC50 of target engagement determined by this method was very close to the apparent $K_D$, 0.9 nM and 1.6 nM, respectively.

C. Quantitative Binding Kinetic Data in a Physiological Context

Figure 27A:
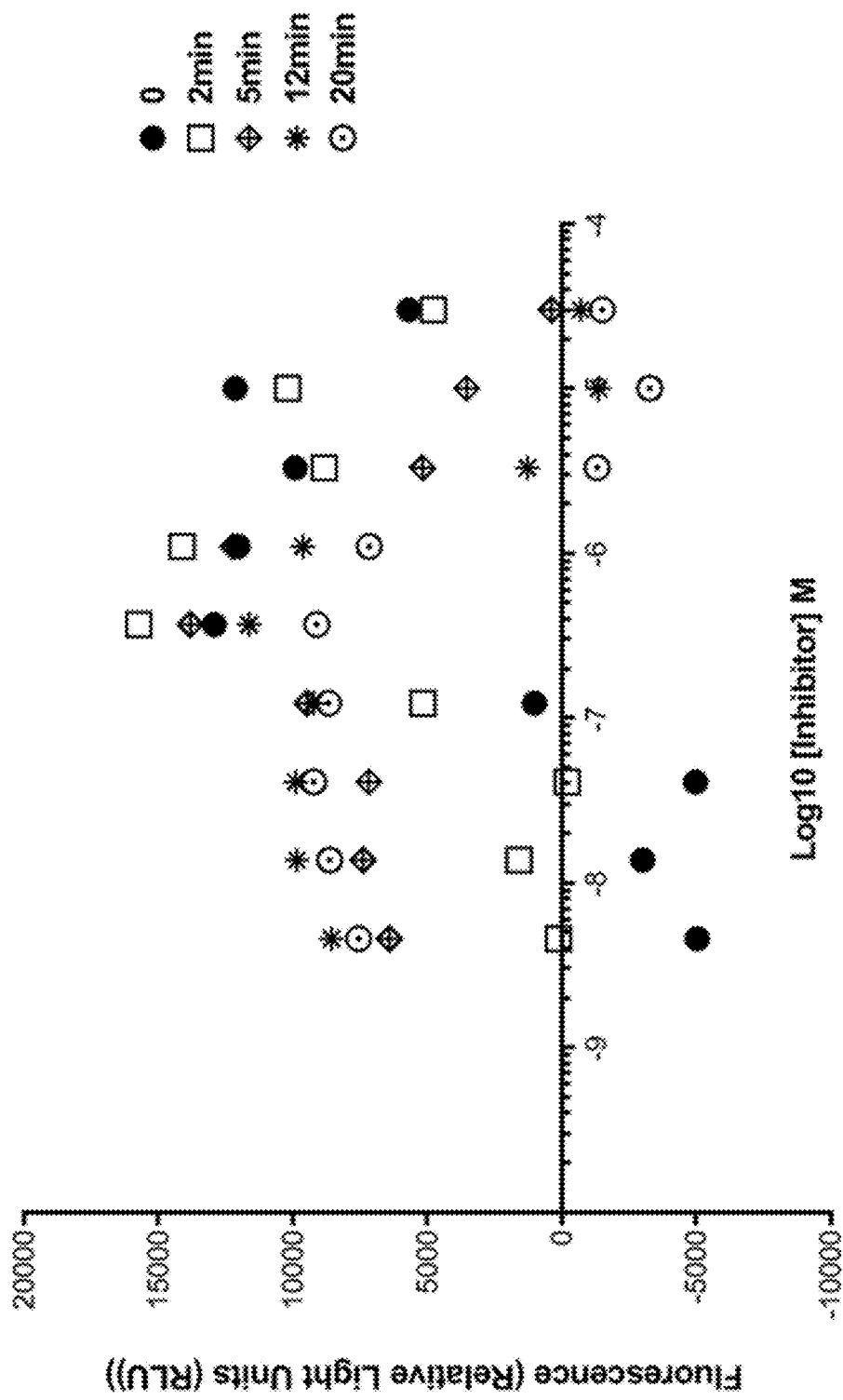
FIGS. 27A-27E show an exemplary identification of a target saturation dose, Emax (maximum effect (maximum fluorescence signal)), EC50 of target engagement, and apparent $K_D$.
Figure 27B:
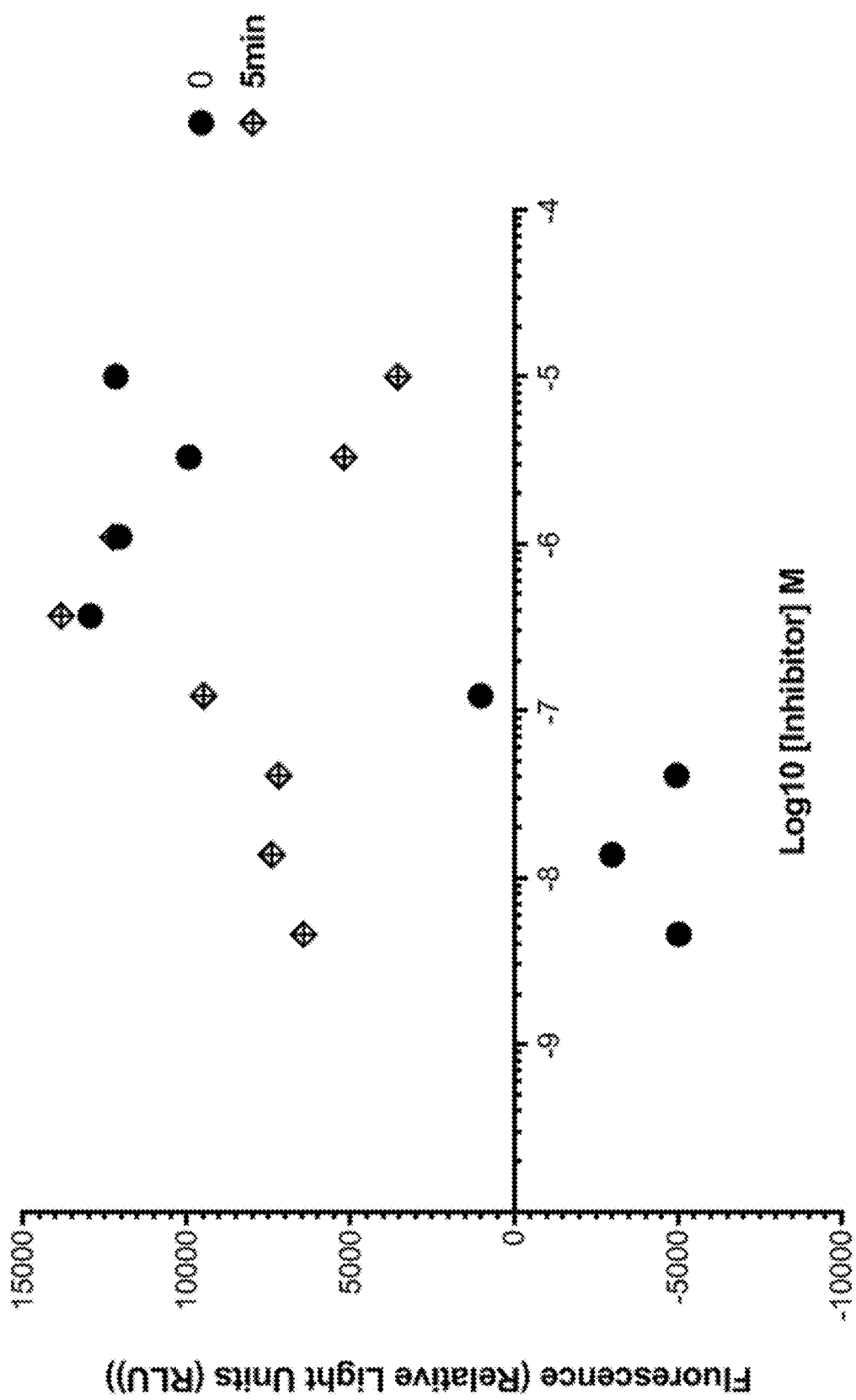
Figure 27C:
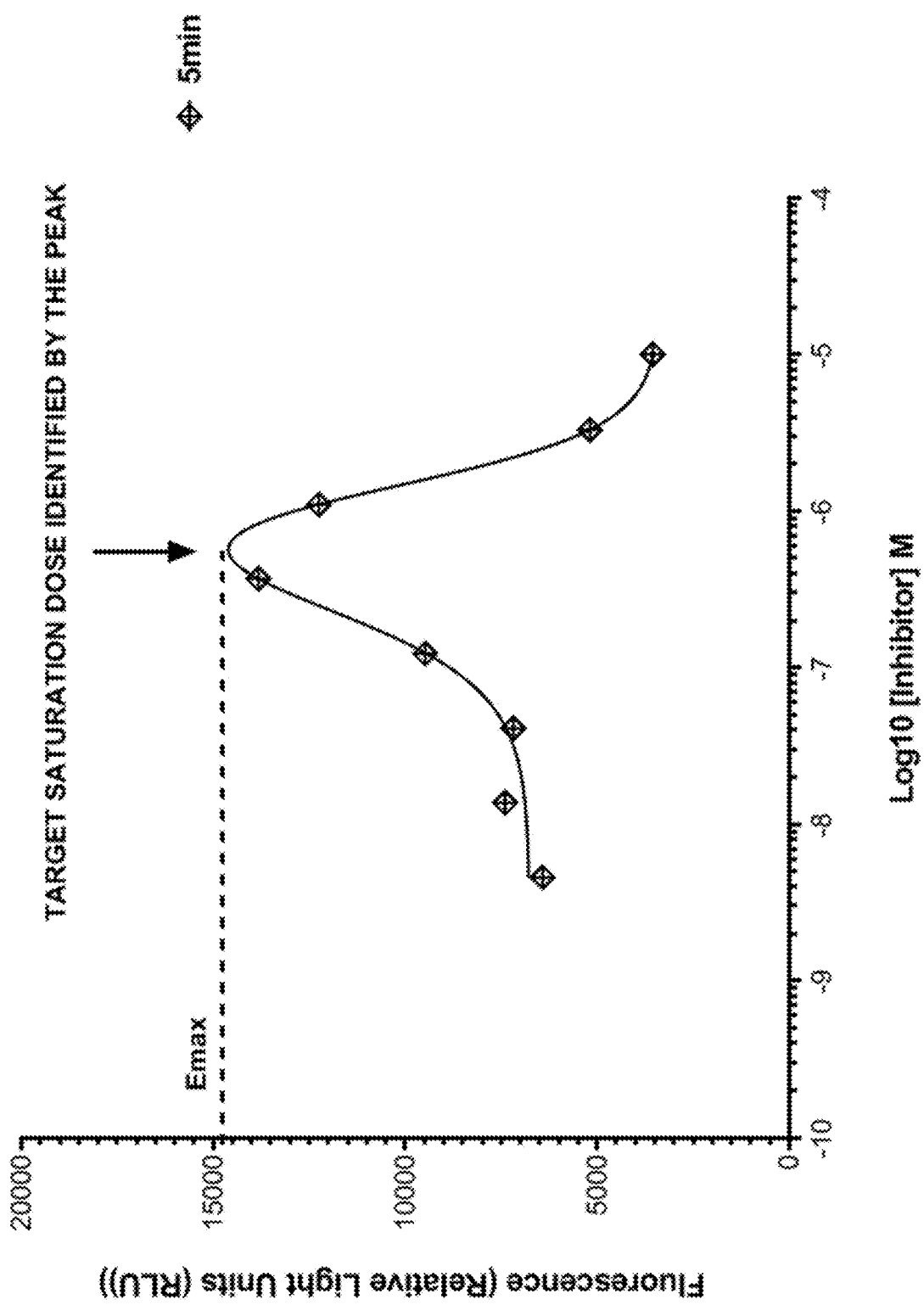
Figure 27D:
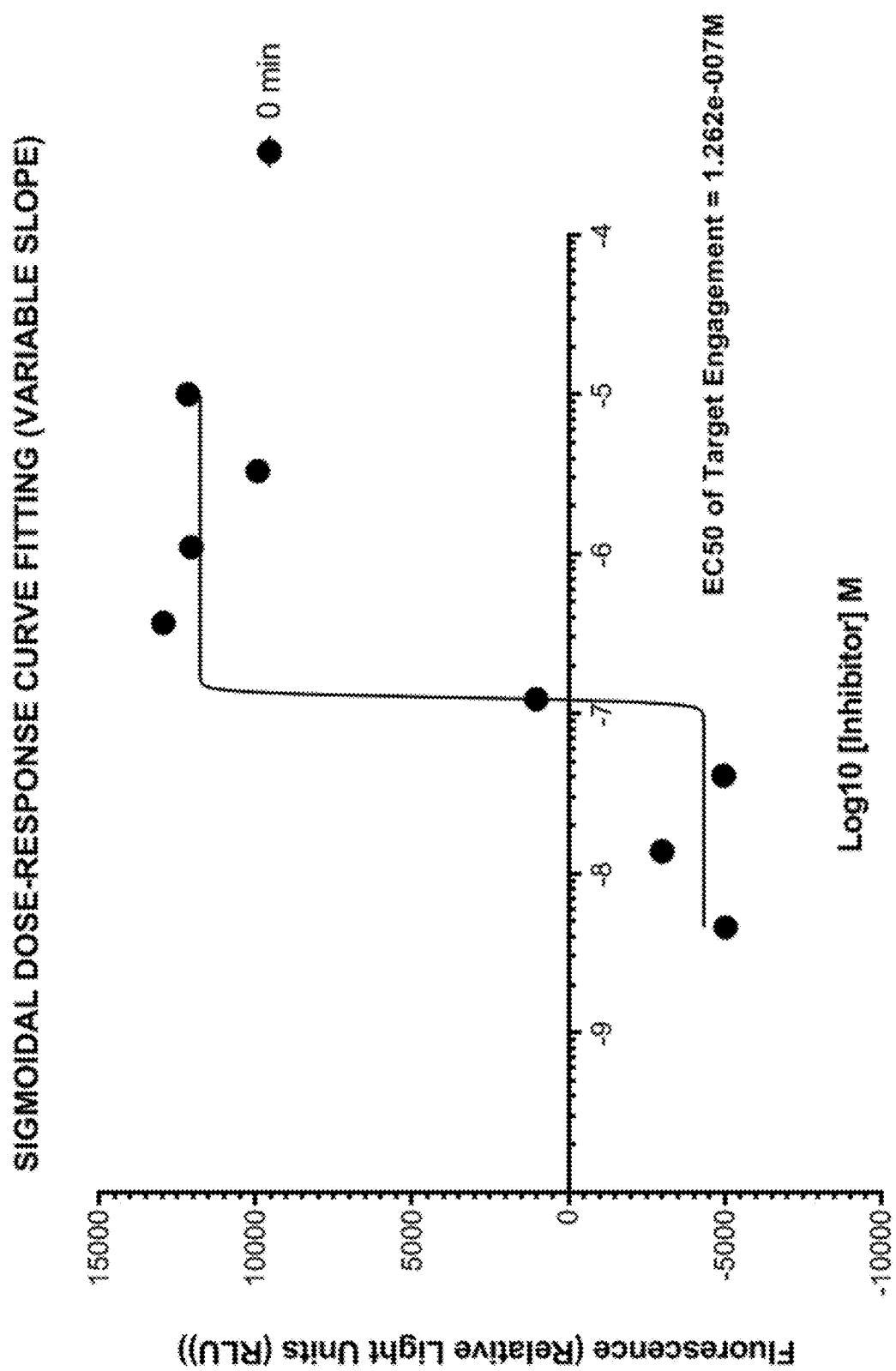
Figure 27E:
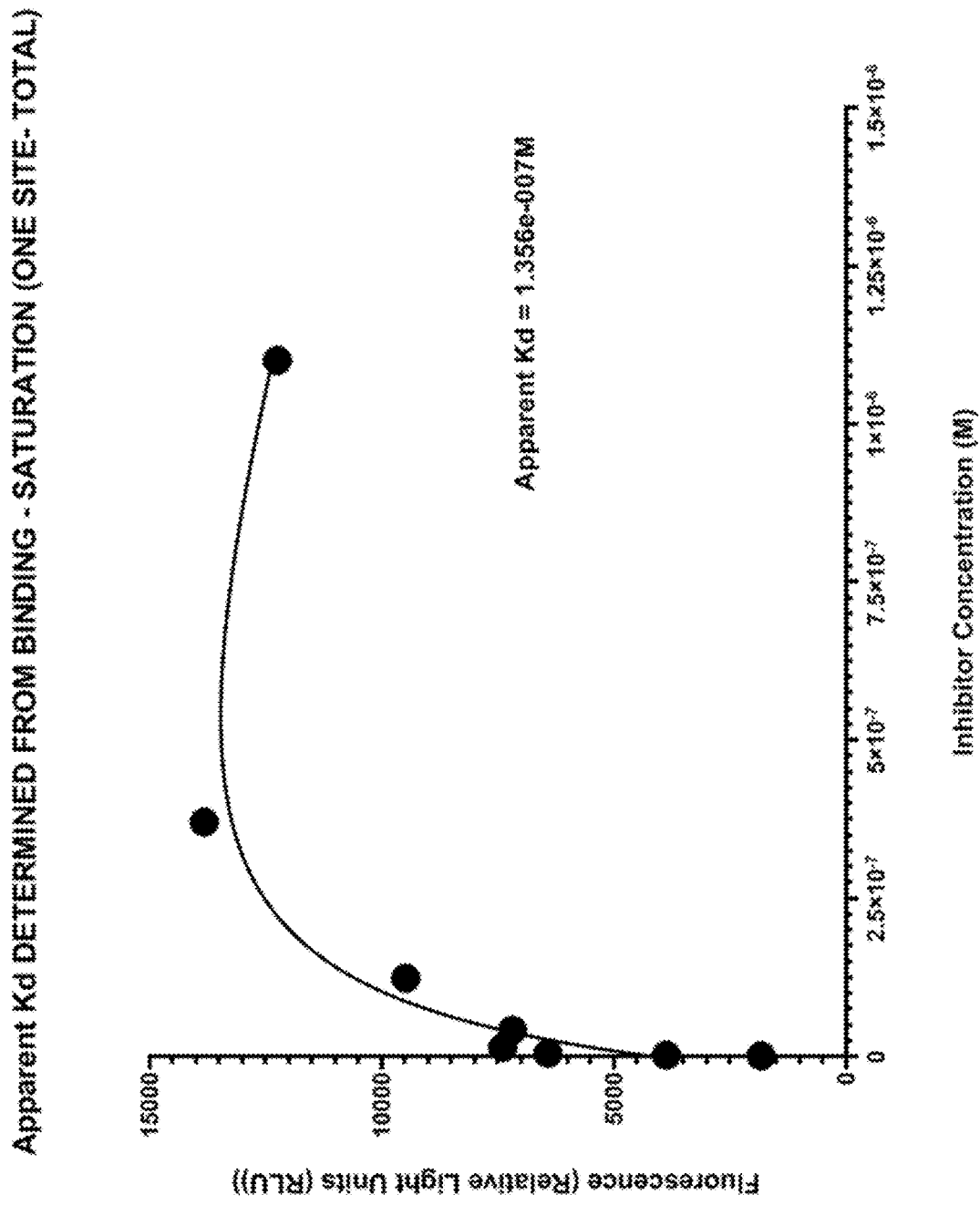

The method may be used to identify the dose of a drug at which the protein target is saturated by the drug to give maximum fluorescence. The target saturation dose could be identified by this method as shown by time course in FIGS. 27A-C. With longer incubation times an inflection point was identified by a drop in fluorescence signal over time, this occurred after 5 minutes (FIG. 27B). The dose at which the signal peaked after longer incubation was the Target Saturation dose (FIG. 27C). It was the inflection point where longer incubations started to result in decreased fluorescence signal over time. The peak fluorescence is referred to as the Emax value (maximum Effect). Knowing the concentration of a drug that saturates a given target is an important parameter for drug discovery as it could be used for defining target occupancy. The EC50 of Target Engagement was determined from a sigmoidal dose-response curve of the Fluorescent Signal versus Drug Concentration on a semi-log scale using the early time points (0 min) before any signal decrease occurred at the higher drug concentrations (FIG. 27D). Nonlinear regression analysis fitting a sigmoidal dose-response curve using GraphPad Prism software identified EC50 of Target Engagement (FIG. 27D and FIG. 26B). The observable fluorescence signal data could also be fit to a Saturation Binding Equation (One-site total) using GraphPad Prism (FIG. 27E and FIG. 26C). This identified an Apparent Equilibrium Dissociation Constant (apparent $K_D$) for the drug binding to the protein target that was similar to the observed EC50 of target engagement (FIG. 27E and FIG. 26C). Fitting observable fluorescence data to a Saturation Binding equation could be performed since the relationship between target binding and fluorescence response was expected to be directly proportional, up to the saturating concentration of drug.

Figure 28A:
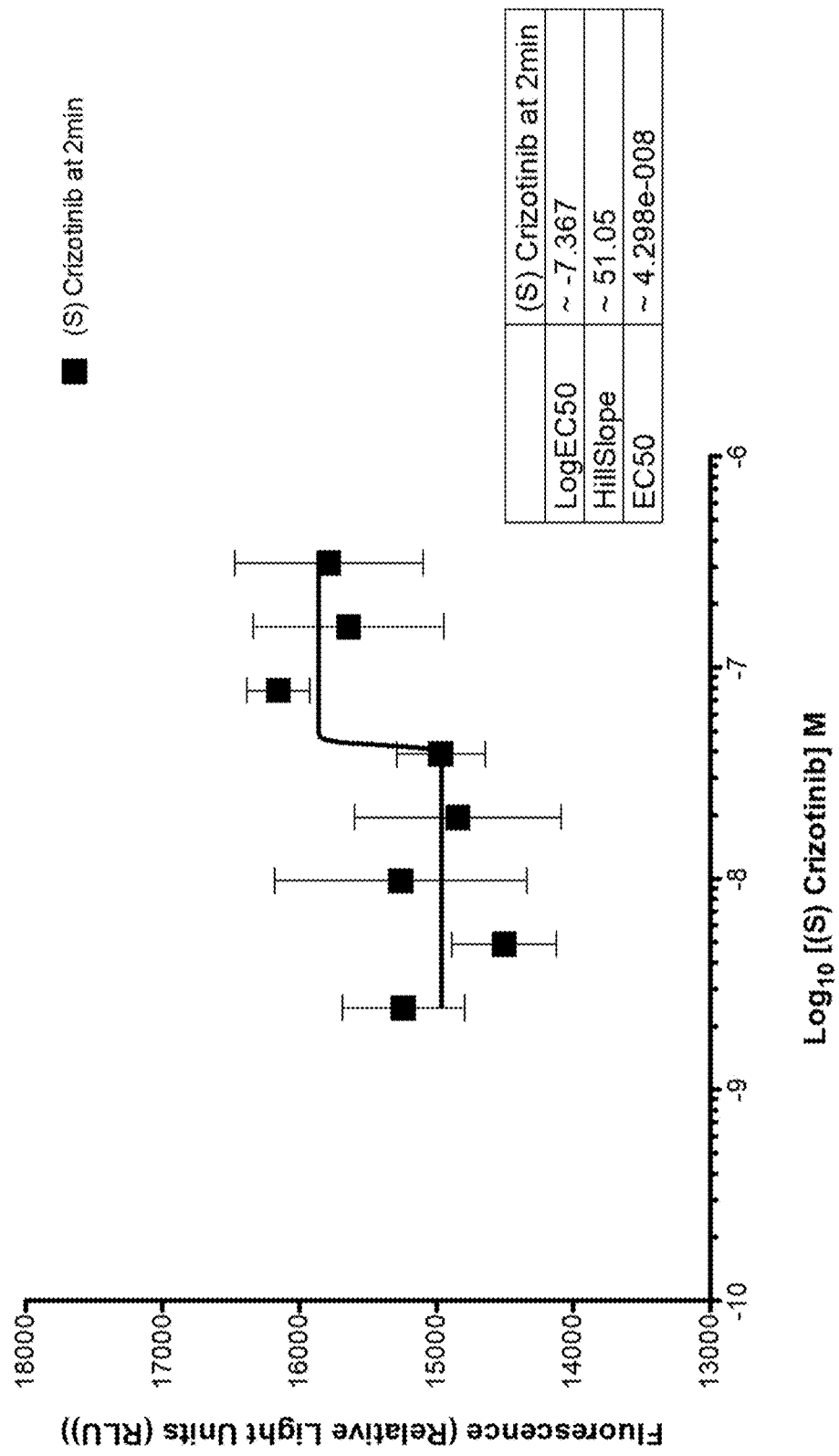
FIGS. 28A-28C shows an exemplary identification of target saturation dose, Emax, EC50 of target engagement, and apparent $K_D$ for (S)-Crizotinib binding to MTH1 Microtagged protein.
Figure 28B:
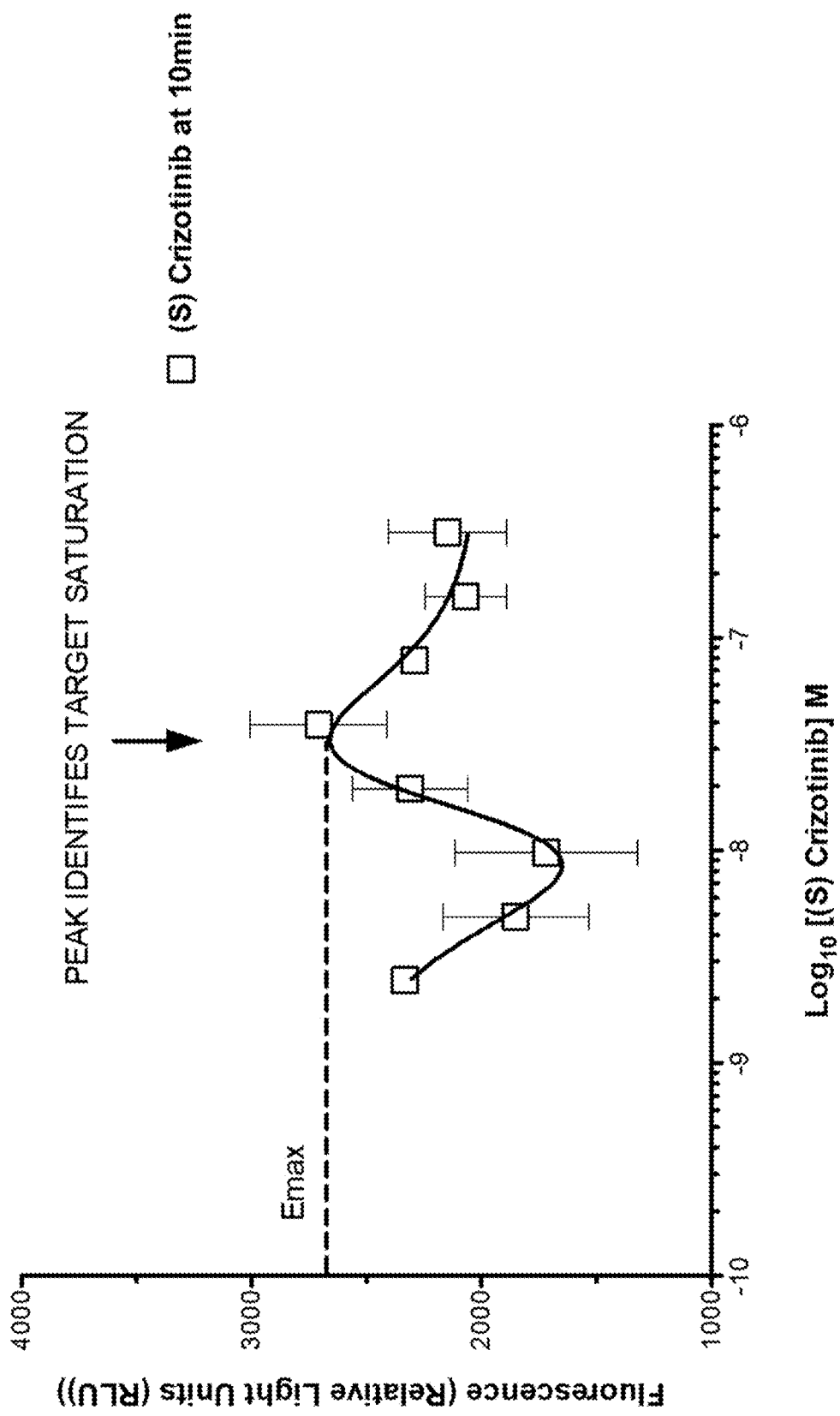
Figure 28C:
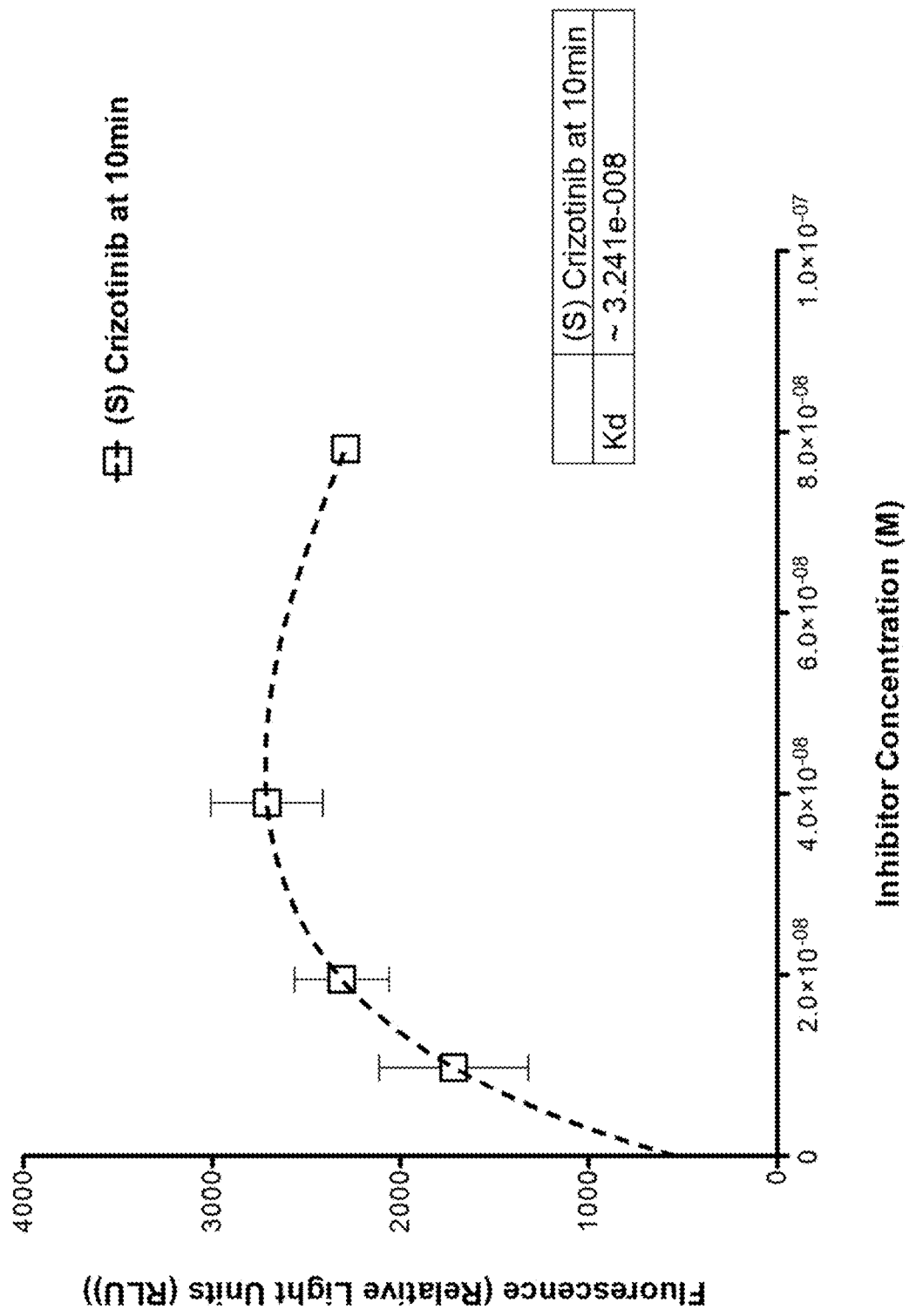

As another example of identifying target saturation dose, Emax and apparent $K_D$, the MTH1 Micro-tagged protein and the inhibitor (S)-Crizotinib were tested. Incubating the inhibitor with the protein during a heat challenge followed by enzyme complementation and fluorescence detection resulted in identification of the EC50 of target engagement after 2 minutes (FIG. 28A). With longer incubation times (10 minutes) the fluorescence over time decreased for the higher drug doses. The dose at which the signal peaked after longer incubation is the Target Saturation dose (FIG. 28B). The peak fluorescence was referred to as the Emax value (FIG. 28B). Nonlinear regression analysis fitting a sigmoidal dose-response curve using GraphPad Prism software identified EC50 of Target Engagement of about 43 nM (FIG. 28A). The observable fluorescence signal data could also be fit to a Saturation Binding Equation (One-site total) using GraphPad Prism (FIG. 28C). This identified an Apparent Equilibrium Dissociation Constant (apparent $K_D$) of 32 nM that was similar to the EC50 of target engagement (43 nM) identified at the 2-minute time point using Sigmoidal dose-response curve fitting.

DISCUSSION

Figure 22:
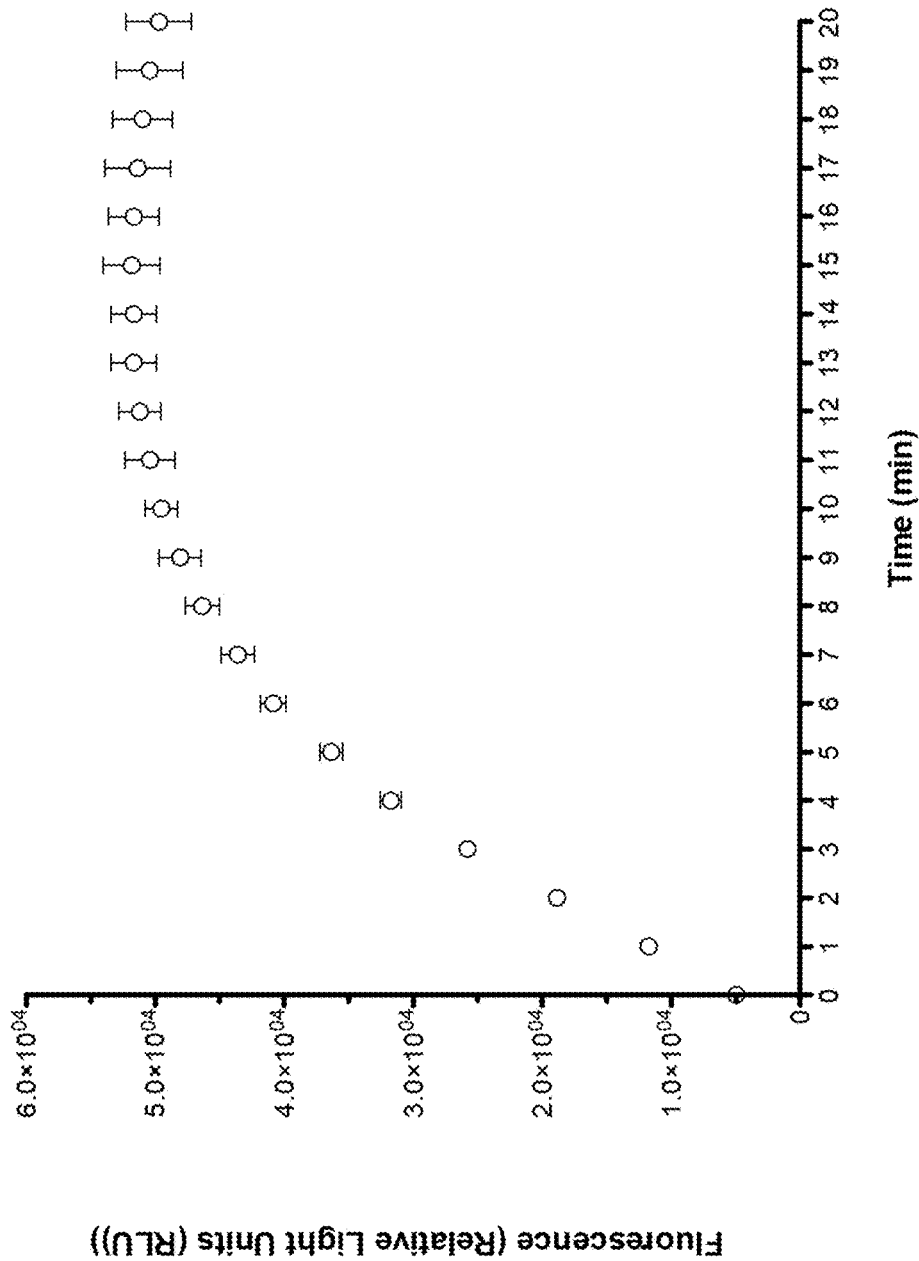
FIG. 22 shows an exemplary real-time monitoring of the fluorescence signal development over time for the assay. A kinetic trace of the development of the S-tag (Micro-tag) fluorescence signal over the course of 20 minutes. The kinetics of the signal was a result of the enzyme-catalyzed reaction of cleavage of the FRET-labeled substrate after enzyme complementation of the nuclease donor (S protein) and target polypeptide (MTH1) fused to the nuclease acceptor (S-tag).

The method employing S-Peptide tag (Micro-tag) had several advantages over other enzyme complementation strategies. Firstly, the short tag (15 to 20 amino acids) was small enough that it did not interfere with the folding, localization, protein-protein interactions, and function of the tagged protein target. Secondly, employing enzyme complementation with the S protein and use of a FRET-labeled nucleic acid substrate for generation of a fluorescent signal had the advantage of being a fast reaction that could be monitored in real time (FIG. 22). This method along with fluorescence detection offered some unique features for this technology. The thermal profiles for some targets identifying a maximum temperature and a minimum temperature of protein melting had an advantage (FIGS. 23A-23C). Proteins with $T_{max}$ and $T_{min}$ could be screened for ligand binding at those temperatures that were generally significantly lower than aggregation temperatures.

A feature of this technology was the speed of the reaction (FIG. 24). The rapid enzymatic cleavage of FRET-labeled substrate allowed for the determination of an EC50 of target engagement within the first 5 minutes of enzyme complementation. This could then be followed over time to identify the dose at which a small molecule saturated a protein target. The peak fluorescence value (Emax) after depletion of FRET-labeled substrates was used to identify the saturating dose. The speed of this RNase cleavage of the FRET-labeled nucleic acid substrate resulted in depletion of the FRET-labeled substrate within 10 to 20 minutes. This was detected in real time as a decrease in the fluorescence signal over time. This peak fluorescence (target saturation dose) resulted when the increase in signal from stabilization of the target protein was balanced by the decrease in signal from excess stabilized protein target (e.g., rapid FRET depletion). The dose at which a small molecule saturated its target was useful for quantifying target occupancy, a feature highly relevant to drug discovery.

The ability to perform quantitative kinetic analysis of small molecule binding to its protein target in a physiological setting was provided as the fluorescent readout, was directly a result of ligand-bound stabilized micro-tagged protein. The apparent equilibrium dissociation constant ($K_D$) could be determined since the target saturation dose was identified in the reaction. Eliminating the doses beyond the saturating dose allowed for Saturation Binding curves that could provide the apparent $K_D$ for the small molecule binding to the target. The EC50 of target engagement that was determined from the early time points before depletion of the FRET-labeled substrate correlated with the apparent $K_D$ measure determined from Saturation Binding Curve.

The entirety of each patent, patent application, publication or any other reference or document cited herein hereby is incorporated by reference. In case of conflict, the specification, including definitions, will control.

Citation of any patent, patent application, publication or any other document is not an admission that any of the foregoing is pertinent prior art, nor does it constitute any admission as to the contents or date of these publications or documents.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described herein.

All of the features disclosed herein may be combined in any combination. Each feature disclosed in the specification may be replaced by an alternative feature serving a same, equivalent, or similar purpose. Thus, unless expressly stated otherwise, disclosed features (e.g., antibodies) are an example of a genus of equivalent or similar features.

As used herein, all numerical values or numerical ranges include integers within such ranges and fractions of the values or the integers within ranges unless the context clearly indicates otherwise. Further, when a listing of values is described herein (e.g., about 50%, 60%, 70%, 80%, 85% or 86%) the listing includes all intermediate and fractional values thereof (e.g., 54%, 85.4%). Thus, to illustrate, reference to 80% or more, includes 81%, 82%, 83%, 84%, 85%, 86%, 87%, 88%, 89%, 90%, 91%, 92%, 93%, 94% etc., as well as 81.1%, 81.2%, 81.3%, 81.4%, 81.5%, etc., 82.1%, 82.2%, 82.3%, 82.4%, 82.5%, etc., and so forth.

Reference to an integer with more (greater) or less than includes any number greater or less than the reference number, respectively. Thus, for example, a reference to less than 100, includes 99, 98, 97, etc. all the way down to the number one (1); and less than 10, includes 9, 8, 7, etc. all the way down to the number one (1).

As used herein, all numerical values or ranges include fractions of the values and integers within such ranges and fractions of the integers within such ranges unless the context clearly indicates otherwise. Thus, to illustrate, reference to a numerical range, such as 1-10 includes 1, 2, 3, 4, 5, 6, 7, 8, 9, 10, as well as 1.1, 1.2, 1.3, 1.4, 1.5, etc., and so forth. Reference to a range of 1-50 therefore includes 1, 2, 3, 4, 5, 6, 7, 8, 9, 10, 11, 12, 13, 14, 15, 16, 17, 18, 19, 20, etc., up to and including 50, as well as 1.1, 1.2, 1.3, 1.4, 1.5, etc., 2.1, 2.2, 2.3, 2.4, 2.5, etc., and so forth.

Reference to a series of ranges includes ranges which combine the values of the boundaries of different ranges within the series. Thus, to illustrate reference to a series of ranges, for example, of 1-10, 10-20, 20-30, 30-40, 40-50, 50-60, 60-75, 75-100, 100-150, 150-200, 200-250, 250-300, 300-400, 400-500, 500-750, 750-1,000, 1,000-1,500, 1,500-2,000, 2,000-2,500, 2,500-3,000, 3,000-3,500, 3,500-4,000, 4,000-4,500, 4,500-5,000, 5,500-6,000, 6,000-7,000, 7,000-8,000, or 8,000-9,000, includes ranges of 10-50, 50-100, 100-1,000, 1,000-3,000, 2,000-4,000, etc.

Modifications can be made to the foregoing without departing from the basic aspects of the technology. Although the technology has been described in substantial detail with reference to one or more specific embodiments, those of ordinary skill in the art will recognize that changes can be made to the embodiments specifically disclosed in this application, yet these modifications and improvements are within the scope and spirit of the technology.

The invention is generally disclosed herein using affirmative language to describe the numerous embodiments and aspects. The invention also specifically includes embodiments in which particular subject matter is excluded, in full or in part, such as substances or materials, method steps and conditions, protocols, or procedures. For example, in certain embodiments or aspects of the invention, materials and/or method steps are excluded. Thus, even though the invention is generally not expressed herein in terms of what the invention does not include aspects that are not expressly excluded in the invention are nevertheless disclosed herein.

The technology illustratively described herein suitably can be practiced in the absence of any element(s) not specifically disclosed herein. Thus, for example, in each instance herein any of the terms "comprising," "consisting essentially of," and "consisting of" can be replaced with either of the other two terms. The terms and expressions which have been employed are used as terms of description and not of limitation, and use of such terms and expressions do not exclude any equivalents of the features shown and described or segments thereof, and various modifications are possible within the scope of the technology claimed. The term "a" or "an" can refer to one of or a plurality of the elements it modifies (e.g., "a reagent" can mean one or more reagents) unless it is contextually clear either one of the elements or more than one of the elements is described. The term "about" as used herein refers to a value within 10% of the underlying parameter (i.e., plus or minus 10%), and use of the term "about" at the beginning of a string of values modifies each of the values (i.e., "about 1, 2 and 3" refers to about 1, about 2 and about 3). For example, a weight of "about 100 grams" can include weights between 90 grams and 110 grams. The term, "substantially" as used herein refers to a value modifier meaning "at least 95%", "at least 96%", "at least 97%", "at least 98%", or "at least 99%" and may include 100%. For example, a composition that is substantially free of X, may include less than 5%, less than 4%, less than 3%, less than 2%, or less than 1% of X, and/or X may be absent or undetectable in the composition. The phrase, "substantially simultaneously" means at the time, or occurring within a time frame of seconds (e.g. within a window of 0 to 10 seconds).

Thus, it should be understood that although the present technology has been specifically disclosed by representative embodiments and optional features, modification and variation of the concepts herein disclosed can be resorted to by those skilled in the art, and such modifications and variations are considered within the scope of this technology.

---

INFORMAL SEQUENCE LISTING:

KETAAAKFERQHMDSSTSAA (SEQ ID NO.: 1)

KETNWAWFWDQHMDSSTSA (SEQ ID NO: 2)

KETGWALFVQQHMDSSTSA (SEQ ID NO: 3)

KETVMANFQMQHMDSSTSA (SEQ ID NO: 4)

KETGDAVFARQHMDSSTSA (SEQ ID NO: 5)

-continued

INFORMAL SEQUENCE LISTING:

KETGWAAFVKQHMDSSTSA (SEQ ID NO: 6)

KETGWATFVEQHMDSSTSA (SEQ ID NO: 7)

KETKLAFFLKQHMDSSTSA (SEQ ID NO: 8)

KETWWAWFFGQHMDSSTSA (SEQ ID NO: 9)

KETTWAEFTWQHMDSSTSA (SEQ ID NO: 10)

KETPWASFNKQHMDSSTSA (SEQ ID NO: 11)

KETAMAMFVTQHMDSSTSA (SEQ ID NO: 12)

KETLWAWFMWQHMDSSTSA (SEQ ID NO: 13)

KETAAAKFERQHMDS (SEQ ID NO: 14)

KETAAAKFERQHMNS (SEQ ID NO: 15)

NRAWSEFLWQHLAPV (SEQ ID NO: 16)

NRGWSEFLWQHHAPV (SEQ ID NO: 17)

NRAWSVFQWQHIAPA (SEQ ID NO: 18)

MSSSNYCNQMMKSRNLTKDRCKPVNTFVHESLADVQAVCSQKNVACKNGQT
NCYQSYSTMSITDCRETGSSKYPNCAYKTTQANKHIIVACEGNPYVPVHFDASV (SEQ
ID NO: 19)

MS S SNYCNQMMKSRNLTKDRCKPVNTFVHESLADVQAVCS QKNVACKNGQT
NCYQSYSTMSITDCRETGSSKYPNCAYKTTQANKHIIVACEGNPYVPVHFD (SEQ ID
NO: 20)

KETAAAKFERQHMDSSTSAASSSNYCNQMMKSRNLTKDRCKPVNTFVHESLA
DVQAVCSQKNVACKNGQTNCYQSYSTMSITDCRETGSSKYPNCAYKTTQANKHIIVAC
EGNPYVPVHFDASV (SEQ ID NO: 21)

GGTACCATGAGCAGCTCCAACTACTGTAACCAGATGATGAAGAGCCGGAAC
CTGACCAAAGATCGATGCAAGCCAGTGAACACCTTTGTGCACGAGTCCCTGGCTGAT
GTCCAGGCCGTGTGCTCCCAGAAAAATGTTGCCTGCAAGAATGGGCAGACCAATTG
CTACCAGAGCTACTCCACCATGAGCATCACCGACTGCCGTGAGACCGGCAGCTCCA
AGTACCCCAACTGTGCCTACAAGACCACCCAGGCGAATAAACACATCATTGTGGCTT
GTGAGGGAAACCCGTACGTGCCAGTCCACTTTGATGCTTCAGTGCATCACCATCACC
ATCACTAGGGATCC (SEQ ID NO: 22)

MSSSNYCNQMMKSRNLTKDRCKPVNTFVHESLADVQAVCSQKNVACKNGQT
NCYQSYSTMSITDCRETGSSKYPNCAYKTTQANKHIIVACEGNPYVPVHFDASVHHHHH
H (SEQ ID NO: 23)

GGTACCATGGGCGCCTCCAGGCTCTATACCCTGGTGCTGGTCCTGCAGCCTC
AGCGAGTTCTCCTGGGCATGAAAAAGCGAGGCTTCGGGGCCGGCCGGTGGAATGGC
TTTGGGGGCAAAGTGCAAGAAGGAGAGACCATCGAGGATGGGGCTAGGAGGGAGC
TGCAGGAGGAGAGCGGTCTGACAGTGGACGCCCTGCACAAGGTGGGCCAGATCGTG
TTTGAGTTCGTGGGCGAGCCTGAGCTCATGGACGTGCATGTCTTCTGCACAGACAGC
ATCCAGGGGACCCCCGTGGAGAGCGACGAAATGCGCCCATGCTGGTTCCAGCTGGA
TCAGATCCCCTTCAAGGACATGTGGCCCGACGACAGCTACTGGTTTCCACTCCTGCT
TCAGAAGAAGAAATTCCACGGGTACTTCAAGTTCCAGGGTCAGGACACCATCCTGG
ACTACACACTCCGCGAGGTGGACACGGTCAAGGAAACTGCAGCAGCCAAGTTTGAG
CGGCAGCACATGGACTCCAGCACTTCCGCTGCCTAGGCTGCCTAGGGATCC (SEQ ID
NO: 24)

MGASRLYTLVLVLQPQRVLLGMKKRGFGAGRWNGFGGKVQEGETIEDGARRE
LQEESGLTVDALHKVGQIVFEFVGEPELMDVHVFCTDSIQGTPVESDEMRPCWFQLDQI
PFKDMWPDDS YWFPLLLQKKKFHGYFKFQGQDTILDYTLREVDTVKETAAAKFERQH
MDSSTSAA (SEQ ID NO: 25)

GGTACCATGGGCGCCTCCAGGCTCTATACCCTGGTGCTGGTCCTGCAGCCTC
AGCGAGTTCTCCTGGGCATGAAAAAGCGAGGCTTCGGGGCCGGCCGGTGGAATGGC
TTTGGGGGCAAAGTGCAAGAAGGAGAGACCATCGAGGATGGGGCTAGGAGGGAGC
TGCAGGAGGAGAGCGGTCTGACAGTGGACGCCCTGCACAAGGTGGGCCAGATCGTG
TTTGAGTTCGTGGGCGAGCCTGAGCTCATGGACGTGCATGTCTTCTGCACAGACAGC
ATCCAGGGGACCCCCGTGGAGAGCGACGAAATGCGCCCATGCTGGTTCCAGCTGGA
TCAGATCCCCTTCAAGGACATGTGGCCCGACGACAGCTACTGGTTTCCACTCCTGCT
TCAGAAGAAGAAATTCCACGGGTACTTCAAGTTCCAGGGTCAGGACACCATCCTGG

-continued

INFORMAL SEQUENCE LISTING:

ACTACACACTCCGCGAGGTGGACACGGTCGCCGCCGCCAAGGAAACTGCAGCAGCC
AAGTTTGAGCGGCAGCACATGGACTCCAGCACTTCCGCTGCCTAGGCTGCCTAGGG
ATCC (SEQ ID NO: 26)

MGASRLYTLVLVLQPQRVLLGMKKRGFGAGRWNGFGGKVQEGETIEDGARRE
LQEESGLTVDALHKVGQIVFEFVGEPELMDVHVFCTDSIQGTPVESDEMRPCWFQLDQI
PFKDMWPDDSYWFPLLLQKKKFHGYFKFQGQDTILDYTLREVDTVAAAKETAAAKFE
RQHMDSSTSAA (SEQ ID NO: 27)

GGTACCATGGGCGCCTCCAGGCTCTATACCCTGGTGCTGGTCCTGCAGCCTC
AGCGAGTTCTCCTGGGCATGAAAAAGCGAGGCTTCGGGGCCGGCCGGTGGAATGGC
TTTGGGGGCAAAGTGCAAGAAGGAGAGACCATCGAGGATGGGGCTAGGAGGGAGC
TGCAGGAGGAGAGCGGTCTGACAGTGGACGCCCTGCACAAGGTGGGCCAGATCGTG
TTTGAGTTCGTGGGCGAGCCTGAGCTCATGGACGTGCATGTCTTCTGCACAGACAGC
ATCCAGGGGACCCCCGTGGAGAGCGACGAAATGCGCCCATGCTGGTTCCAGCTGGA
TCAGATCCCCTTCAAGGACATGTGGCCCGACGACAGCTACTGGTTTCCACTCCTGCT
TCAGAAGAAGAAATTCCACGGGTACTTCAAGTTCCAGGGTCAGGACACCATCCTGG
ACTACACACTCCGCGAGGTGGACACGGTCGCCGCCGCCGCCGCCGCCGCCGCCGCC
GCCAAGGAAACTGCAGCAGCCAAGTTTGAGCGGCAGCACATGGACTCCAGCACTTC
CGCTGCCTAGGCTGCCTAGGGATCC (SEQ ID NO: 28)

MGASRLYTLVLVLQPQRVLLGMKKRGFGAGRWNGFGGKVQEGETIEDGARRE
LQEESGLTVDALHKVGQIVFEFVGEPELMDVHVFCTDSIQGTPVESDEMRPCWFQLDQI
PPFKDMWPDDSYWFPLLLQKKKFHGYFKFQGQDTILDYTLREVDTVAAAAAAAAAAKE
TAAAKFERQHMDSSTSAA (SEQ ID NO: 29)

ATGGCCTCGCCGGCTGACAGCTGTATCCAGTTCACCCGCCATGCCAGTGATG
TTCTTCTCAACCTTAATCGTCTCCGGAGTCGAGACATCTTGACTGATGTTGTCATTGT
TGTGAGCCGTGAGCAGTTTAGAGCCCATAAAACGGTCCTCATGGCCTGCAGTGGCCT
GTTCTATAGCATCTTTACAGACCAGTTGAAATGCAACCTTAGTGTGATCAATCTAGA
TCCTGAGATCAACCCTGAGGGATTCTGCATCCTCCTGGACTTCATGTACACATCTCG
GCTCAATTTGCGGGAGGGCAACATCATGGCTGTGATGGCCACGCTATGTACCTGCA
GATGGAGCATGTTGTGGACACTTGCCGGAAGTTTATTAAGGCCAGTGAAGCAGAGA
TGGTTTCTGCCATCAAGCCTCCTCGTGAAGAGTTCCTCAACAGCCGGATGCTGATGC
CCCAAGACATCATGGCCTATCGGGGTCGTGAGGTGGTGGAGAACAACCTGCCACTG
AGGAGCGCCCCTGGGTGTGAGAGCAGAGCCTTTGCCCCCAGCCTGCTACAGTGGCCT
GTCCACACCGCCAGCCTCTTATTCCATGTACAGCCACCTCCCTGTCAGCAGCCTCCTC
TTCTCCGATGAGGAGTTTCGGGATGTCCGGATGCCTGTGGCCAACCCCTTCCCCAAG
GAGCGGGCACTCCCATGTGATAGTGCCAGGCCAGTCCCTGGTGAGTACAGCCGGCC
GACTTTGGAGGTGTCCCCCAATGTGTGCCACAGCAATATCTATTCACCCAAGGAAAC
AATCCCAGAAGAGGCACGAAGTGATATGCACTACAGTGTGGCTGAGGGCCTCAAAC
CTGCTGCCCCTCAGCCCGAAATGCCCCCTACTTCCCTTGTGACAAGGCCAGCAAAG
AAGAAGAGAGACCCTCCTCGGAAGATGAGATTGCCCTGCATTTCGAGCCCCCCAAT
GCACCCCTGAACCGGAAGGGTCTGGTTAGTCCACAGAGCCCCCAGAAATCTGACTG
CCAGCCCAACTCGCCCACAGAGTCCTGCAGCAGTAAGAATGCCTGCATCCTCCAGG
CTTCTGGCTCCCCTCCAGCCAAGAGCCCCACTGACCCCAAAGCCTGCAACTGGAAGA
AATACAAGTTCATCGTGCTCAACAGCCTCAACCAGAATGCCAAACCAGAGGGGCCT
GAGCAGGCTGAGCTGGGCCGCCTTTCCCCACGAGCCTACACGGCCCCACCTGCCTGC
CAGCCACCCATGGAGCCTGAGAACCTTGACCTCCAGTCCCCAACCAAGCTGAGTGC
CAGCGGGGAGGACTCCACCATCCCACAAGCCAGCCGGCTCAATAACATCGTTAACA
GGTCCATGACGGGCTCTCCCCGCAGCAGCAGCGAGAGCCACTCACCACTCTACATG
CACCCCCCGAAGTGCACGTCCTGCGGCTCTCAGTCCCCACAGCATGCAGAGATGTGC
CTCCACACCGCTGGCCCCACGTTCCCTGAGGAGATGGGAGAGACCCAGTCTGAGTA
CTCAGATTCTAGCTGTGAGAACGGGGCCTTCTTCTGCAATGAGTGTGACTGCCGCTT
CTCTGAGGAGGCCTCACTCAAGAGGCACACGCTGCAGACCCACAGTGACAAACCCT
ACAAGTGTGACCGCTGCCAGGCCTCCTTCCGCTACAAGGGCAACCTCGCCAGCCAC
AAGACCGTCCATACCGGTGAGAAACCCTATCGTTGCAACATCTGTGGGGCCCAGTTC
AACCGGCCAGCCAACCTGAAAACCCACACTCGAATTCACTCTGGAGAGAAGCCCTA
CAAATGCGAAACCTGCGGAGCCAGATTTGTACAGGTGGCCCACCTCCGTGCCCATGT
GCTTATCCACACTGGTGAGAAGCCCTATCCCTGTGAAATCTGTGGCACCCGTTTCCG
GCACCTTCAGACTCTGAAGAGCCACCTGCGAATCCACACAGGAGAGAAACCTTACC
ATTGTGAGAAGTGTAACCTGCATTTCCGTCACAAAAGCCAGCTGCGACTTCACTTGC
GCCAGAAGCATGGCGCCATCACCAACACCAAGGTGCAATACCGCGTGTCAGCCACT
GACCTGCCTCCGGAGCTCCCCAAAGCCTGCaaggaaactgcagcagccaagtttgagcggcagcacatggac
tccagcacttccgctgccTGA (SEQ ID NO: 30)

MASPADSCIQFTRHASDVLLNLNRLRSRDILTDVVIVVSREQFRAHKTVLMACS
GLFYSIFTDQLKCNLSVINLDPEINPEGFCILLDFMYTSRLNLREGNIMAVMATAMYLQM
EHVVDTCRKFIKASEAEMVSAIKPPREEFLNSRMLMPQDIMAYRGREVVENNLPLRSAP
GCESRAFAPSLYSGLSTPPASYSMYSHLPVSSLLFSDEEFRDVRMPVANPFPKERALPCD
SARPVPGEYSRPTLEVSPNVCHSNIYSPKETIPEEARSDMHYSVAEGLKPAAPSARNAPY
FPCDKASKEEERPSSEDEIALHFEPPNAPLNRKGLVSPQSPQKSDCQPNSPTESCSSKNACI
LQASGSPPAKSPTDPKACNWKKYKFIVLNSLNQNAKPEGPEQAELGRLSPRAYTAPPAC
QPPMEPENLDLQSPTKLSASGEDSTIPQASRLNNIVNRSMTGSPRSSSESHSPLYMHPPKC
TSCGSQSPQHAEMCLHTAGPTFPEEMGETQSEYSDSSCENGAFFCNECDCRFSEEASLKR
HTLQTHSDKPYKCDRCQASFRYKGNLASHKTVHTGEKPYRCNICGAQFNRPANLKTHT

-continued

INFORMAL SEQUENCE LISTING:

RIHSGEKPYKCETCGARFVQVAHLRAHVLIHTGEKPYPCEICGTRFRHLQTLKSHLRIHT
GEKPYHCEKCNLHFRHKSQLRLHLRQKHGAITNTKVQYRVSATDLPPELPKACKETAA
AKFERQHMDSSTSAA- (SEQ ID NO: 31)

atgcgaccctccgggacggccggggcagcgctcctggcgctgctggctgcgctctgccggcgagtcgggctctggagg
aaaagaaagtttgccaaggcacgagtaacaagctcacgcagttgggcacttttgaagatcattttctcagcctccagaggatgttcaataactg
tgaggtggtccttgggaatttggaaattacctatgtgcagaggaattatgatctttccttcttaaagaccatccaggaggtggctggttatgtcc
tcattgccctcaacacagtggagcgaattcctttggaaaacctgcagatcatcagaggaaatatgtactacgaaattcctatgccttagcagt
cttatctaactatgatgcaaataaaaccggactgaaggagctgcccatgagaaatttacaggaaatcctgcatggcgccgtgcggttcagca
acaaccctgccctgtgcaacgtggagagcatccagttggcggggacatagtcagcagtgacttttctcagcaacatgtcgatggacttccagaa
ccacctgggcagctgccaaaagtgtgatccaagctgtcccaatgggagctgctggggtgcaggagaggagaactgccagaaactgacca
aaatcatctgtgcccagcagtgctccgggcgctgccgtggcaagtccccagtgactgctgccacaaccagtgtgctgcaggctgcacag
gcccccgggagagcgactgcctggtctgccgcaaattccgagacgaagccacgtgcaaggacacctgcccccccactcatgctctacaac
cccaccacgtaccagatggatgtgaaccccgagggcaaatacagctttggtgccacctgcgtgaagaagtgtcccgtaattatgtggtga
cagatcacggctcgtgcgtccgagcctgtggggccgacagctatgagtggaggaagccgtccgcaagtgtaagaagtgcgaagg
gccttgccgcaaagtgtgtaacgaataggtattggtgaatttaaagactcactctccataaatgctacgaatattaaacacttcaaaaactgca
cctccatcagtggcgatctccacatcctgccggtggcatttagggggtgactccttcacacatactcctcctctggatccacaggaactggatat
tctgaaaaccgtaaaggaaatcacagggtttttgctgattcaggcttggcctgaaaacaggacggacctccatgcctttgagaacctagaaat
catacgcggcaggaccaagcaacatggtcagttttctcttgcagtcgtcagcctgaacataacatccttgggattacgctccctcaaggagat
aagtgatggagatgtgataatttcaggaaacaaaaattgtgctatgcaaatacaataaactggaaaaaactgtttgggacctccggtcagaa
aaccaaaattataagcaacagaggtgaaaacagctgcaaggccacaggccaggtctgccatgccttgtgctccccgagggctgctggg
gcccggagcccaggactgcgtctcttgccgaatgtcagccgaggcaggaatgcgtggacaagtgcaacctcttctggagggtgagcc
aagggagtttgtggagaactctgagtgcatacagtgccacccagagtgcctgcctcaggccatgaacatcacctgcacaggacggggacc
agacaactgtatccagtgtgcccactacattgacggccccactgcgtcaagacctgccggcaggagtcatgggagaaaacaacaccct
ggtctggaagtacgcagacgccggccatgtgtgccacctgtgccatccaaactgcacctacggatgcactgggcaggtcttgaaggctgt
ccaacgaatgggcctaagatcccgtccatcgccactgggatggtgggggccctcctcttgctgctggtggtcctggggatcggcctct
tcatgcgaaggcgccacatcgttcggaagcgcacgctgcggaggctgctgcaggagagggagcttgtggagcctcttacaccagtgga
gaagctcccaaccaagctctcttgaggatcttgaaggaaactgaattcaaaaagatcaaagtgctgggctccggtgcgttcggcacggtgta
taagggactctggatcccagaaggtgagaaagttaaaattcccgtcgctatcaaggaattaagagaagcaacatctccgaaagcaacaag
gaaatcctcgatgaagcctacgtgatggccagcgtggacaaccccacgtgtgccgcctgctgggcatctgcctcacctccaccgtgcag
ctcatcatgcagctcatgccttcggctgcctcctggactatgtccgggaacacaaagacaatattggctcccagtacctgctcaactggtgt
gtgcagatcgcaaagggcatgaactacttggaggaccgtcgcttggtgcaccgcgacctggcagccaggaacgtactggtgaaaacacc
gcagcatgtcaatgatcacagatttttgggcgggcaaactgctgggtgcggaagagaaagaataccatgcagaaggaggcaaagtgccta
tcaagtggatggcattggaatcaattttacacagaatctataccccaccagagtgatgtctggagctacgggtgactgtttgggagttgatgac
ctttggatccaagccatgacggaatccctgccagcgagatctcctccatcctggagaaaggagaacgcctccctcagccacccatatgta
ccatcgatgtctacatgatcatggtcaagtgctggatgatagacgcagatagtcgccaaagttccgtgagttgatcatcgaattctccaaaat
ggcccgagaccccagcgctacctgtcattcaggggatgaaagaatgcatttgccaagtcctacagactccaacttctaccgtgccctga
tggatgaagaagcatggacgacgtggtggatgccgacgagtacctcatcccacagcagggcttcttcagcagcccctccacgtcacgga
ctccctcctgagctctctgagtgcaacagcaacaattccaccgtggcttgcattgataagaatgggctgcaaagctgtcccatccaaggaa
gacagcttcttgcagcgatacagctcagaccccacaggcgccttgactgaggacagatagacgacacccttcctcccagtgcctgaataca
taaaccagtccgttcccaaaaggcccgctggctctgtgcagaatcctgtctatcacaatcagcctctgaaccccgccccagcagagaccc
acactaccaggacccccacagcactgcagtgggcaaccccgagtatctcaacactgtccagcccacctgtgtcaacagcacattcgacag
ccctgcccactgggcccagaaaggcagccaccaaattagcctggacaaccctgactaccagcaggacttctttcccaaggaagccaagc
caaatggcatctttaagggctccacagctgaaatgcagaatacctaagggtcgcgccacaaagcagtgaatttattggagcaaaggaaac
tgcagcagccaagtttgagcggcagcacatggactccagcacttccgctgcctga (SEQ ID NO: 32)

MRPSGTAGAALLALLAALCPASRALEEKKVCQGTSNKLTQLGTFEDHFLSLQR
MFNNCEVVLGNLEITYVQRNYDLSFLKTIQEVAGYVLIALNTVERIPLENLQIIRGNMYY
ENSYALAVLSNYDANKTGLKELPMRNLQEILHGAVRFSNNPALCNVESIQWRDIVSSDF
LSNMSMDFQNHLGSCQKCDPSCPNGSCWGAGEENCQKLTKIICAQQCSGRCRGKSPSD
CCHNQCAAGCTGPRESDCLVCRKFRDEATCKDTCPPLMLYNPTTYQMDVNPEGKYSFG
ATCVKKCPRNYVVTDHGSCVRACGADSYEMEEDGVRKCKKCEGPCRKVCNGIGIGEF
KDSLSINATNIKHFKNCTSISGDLHILPVAFRGDSFTHTPPLDPQELDILKTVKEITGFLLIQ
AWPENRTDLHAFENLEIIRGRTKQHGQFSLAVVSLNITSLGLRSLKEISDGDVIISGNKNL
CYANTINWKKLFGTSGQKTKIISNRGENSCKATGQVCHALCSPEGCWGPEPRDCVSCRN
VSRGRECVDKCNLLEGEPREFVENSECIQCHPECLPQAMNITCTGRGPDNCIQCAHYIDG
PHCVKTCPAGVMGENNTLVWKYADAGHVCHLCHPNCTYGCTGPGLEGCPTNGPKIPSI
ATGMVGALLLLLVVALGIGLFMRRRHIVRKRTLRRLLQERELVEPLTPSGEAPNQALLRI
LKETEFKKIKVLGSGAFGTVYKGLWIPEGEKVKIPVAIKELREATSPKANKEILDEAYVM
ASVDNPHVCRLLGICLTSTVQLIMQLMPFGCLLDYVREHKDNIGSQYLLNWCVQIAKG
MNYLEDRRLVHRDLAARNVLVKTPQHVKITDFGRAKLLGAEEKEYHAEGGKVPIKWM
ALESILHRIYTHQSDVWSYGVTVWELMTFGSKPYDGIPASEISSILEKGERLPQPPICTIDV
YMIMVKCWMIDADSRPKFRELIIEFSKMARDPQRYLVIQGDERMHLPSPTDSNFYRALM
DEEDMDDVVDADEYLIPQQGFFSSPSTSRTPLLSSLSATSNNSTVACIDRNGLQSCPIKED
SFLQRYSSDPTGALTEDSIDDTFLPVPEYINQSVPKRPAGSVQNPVYHNQPLNPAPSRDPH
YQDPHSTAVGNPEYLNTVQPTCVNSTFDSPAHWAQKGSHQISLDNPDYQQDFFPKEAK
PNGIFKGSTAENAEYLRVAPQSSEFIGAKETAAAKFERQHMDSSTSAA- (SEQ ID NO: 33)

HHHHHH (SEQ ID NO: 34)

What is claimed:

1. A method of determining if a test compound can interact with a target polypeptide, the method comprising:
   (a) contacting a fusion protein with
      (i) a test compound,
      (ii) a denaturant,
      (iii) a nuclease donor, and
      (iv) a nucleic acid substrate,
   (b) detecting an amount of a cleavage product produced from the nucleic acid substrate; and
   (c) determining that a test compound interacted with the target polypeptide based on the amount of cleavage product,
      wherein the fusion protein comprises the target polypeptide and an entity selected from the group consisting of: a nuclease acceptor; a nuclease; a nuclease domain; and an N-terminal domain of a nuclease and a first domain allowing for dimerization of the N-terminal domain to a C-terminal domain of the same nuclease fused to a second domain complementary to the first domain allowing for dimerization.

2. The method of claim 1, further comprising contacting the fusion protein with (v) a signal controller.

3. The method of claim 1, wherein the fusion protein comprises the target polypeptide and a nuclease acceptor.

4. The method of claim 1, wherein the fusion protein comprises the target polypeptide and a nuclease or a nuclease domain.

5. The method of claim 1, wherein the fusion protein comprises the target polypeptide, an N-terminal domain of a nuclease and a first domain allowing for dimerization of the N-terminal domain to a C-terminal domain of the same nuclease fused to a second domain complementary to the first domain allowing for dimerization.

6. The method of claim 3, wherein the nuclease acceptor is an S-tag acceptor peptide and the nuclease donor is an S protein of the RNase S complex.

7. The method of claim 4, wherein the nuclease or nuclease domain is a ribonuclease or a deoxyribonuclease.

8. The method of claim 4, wherein the nuclease or nuclease domain is a sequence-specific nuclease.

9. The method of claim 7, wherein the nuclease is a CRISPR-associated (Cas) protein.

10. The method of claim 9, wherein the Cas protein is Cas9 (Csn1), Cas12a (Cpf1), Cas12b (C2c1), Cas13a (C2c2), Cas13b (C2c6) or Cas13c (C2c7).

11. The method of claim 10, wherein the Cas protein is Cas9.

12. The method of claim 4, wherein the nuclease is a non-natural nuclease hybrid.

13. The method of claim 12, wherein the non-natural nuclease hybrid is Cas9-Fok1.

14. The method of claim 7, wherein the nuclease is an RNase.

15. The method of claim 14, wherein the RNase is an RNase A, RNase H, or RNase S.

16. The method of claim 7, wherein the nuclease is a Micrococcal nuclease.

17. The method of claim 5, wherein the nuclease is Cas9, the first domain allowing for dimerization is Coh2, and the second domain is DocS.

18. The method of claim 17, wherein the signal controller is far-red light.

19. The method of claim 1, wherein the denaturant is selected from (i) heat, (ii) ultraviolet light, (iii) microwaves, (iv) radiation and (iv) a chemical denaturant.

20. The method of claim 1, wherein the contacting of (a) comprises contacting a cell, or a lysate derived from the cell, with (i) the test compound, (ii) the denaturant, (iii) the nuclease donor, and/or (iv) the nucleic acid substrate, wherein the cell or the cell lysate comprises the fusion protein.

21. The method of claim 20, wherein the fusion protein is expressed by the cell.

22. The method of claim 20, wherein the contacting of (a) comprises contacting the cell, or a lysate derived from the cell, with the denaturant or the nucleic acid substrate.

23. The method of claim 1, wherein the fusion protein is contacted with the nuclease donor and/or the nucleic acid substrate after, or at the same time as, contacting the fusion protein with the denaturant.

24. The method of claim 20, wherein the cell comprises the nuclease donor, or the nuclease donor is expressed by the cell.

25. The method of claim 19, wherein the denaturant is heat, and the contacting of the fusion protein comprising the target polypeptide (a) is carried out by heating to a temperature of at least 40° C., at least 50° C. or at least 60° C.

26. The method of claim 25, wherein the temperature is sufficient to denature or aggregate the fusion protein or the target polypeptide in the absence of the test compound.

27. The method of claim 25, wherein the heating is for a time period of at least 20 seconds, at least 30 seconds, at least 1 minutes, at least 3 minutes, at least 5 minutes, at least 10 minutes, or at least 15 minutes.

28. The method of claim 25, wherein the heating comprises exposing the cell to a temperature gradient comprising increasing the temperature at a rate of at least about 5° C. per minute.

29. The method of claim 19 wherein the chemical denaturant is selected from an oxidizing agent, an acid, a base, a toxin, a carcinogen, and chemotherapeutic agent.

30. The method of claim 1, wherein the test compound is a small compound.

31. The method of claim 1, wherein the nucleic acid substrate comprises ribonucleotides and/or deoxyribonucleotides.

32. The method of claim 1, wherein the nucleic acid substrate comprises a detectable label.

33. The method of claim 32, wherein the detectable label is a fluorescent label.

34. The method of claim 32, wherein the nucleic acid substrate comprises a pair of FRET labels.

35. The method of claim 34, wherein nucleic acid substrate comprises 6-carboxyfluorescein (6-FAM) and 6-carboxy-tetramethylrhodamine (6-TAMRA).

36. The method of claim 34, wherein the nucleic acid substrate comprises (6-FAM)-X-(6-TAMRA), wherein X is a polynucleotide comprising the sequence Y-dA-R, wherein Y is one or more pyrimidines, dA is deoxyadenosine, and R is one or more purines.

37. The method of claim 34, wherein the nucleic acid substrate comprises (6-FAM)-dA-rU-dA-dA-(6-TAMRA), wherein rU is uridine.

38. The method of claim 6, wherein the S-tag acceptor peptide comprises 8-20 amino acids.

39. The method of claim 38, wherein the S-tag acceptor peptide comprises an S-peptide of RNase S, or a derivative thereof.

40. The method of claim 39, wherein the RNase S is a pancreatic RNase.

41. The method of claim 38, wherein the S-tag acceptor peptide comprises a peptide having an amino acid sequence at least 90% identity to the amino acid sequence

```
                              (SEQ ID NO.: 1)
KETAAAKFERQHMDSSTSAA.
```

42. The method of claim 6, wherein the S-tag acceptor peptide comprises a peptide comprising at least 14 contiguous amino acids of the amino acid sequence

```
                              (SEQ ID NO.: 1 )
KETAAAKFERQHMDSSTSAA.
```

43. The method of claim 6, wherein the S-tag acceptor peptide comprises a peptide having an amino acid sequence at least 90% identity to an amino acid sequence selected from

```
                              (SEQ ID NO: 2)
KETNWAWFWDQHMDSSTSA, (SEQ ID NO: 3)
KETGWALFVQQHMDSSTSA, (SEQ ID NO: 4)
KETVMANFQMQHMDSSTSA, (SEQ ID NO: 5)
KETGDAVFARQHMDSSTSA, (SEQ ID NO: 6)
KETGWAAFVKQHMDSSTSA, (SEQ ID NO: 7)
KETGWATFVEQHMDSSTSA, (SEQ ID NO: 8)
KETKLAFFLKQHMSSTSA, (SEQ ID NO: 9)
KETWWAWFFGQHMDSSTSA;

(SEQ ID NO: 10)
KETTWAEFTWQHMDSSTSA, (SEQ ID NO: 11)
KETPWASFNKQHMDSSTSA, (SEQ ID NO: 12)
KETAMAMFVTQHMDSSTSA, (SEQ ID NO: 13)
KETLWAWFMWQHMDSSTSA, (SEQ ID NO: 14)
KETAAAKFERQHMDS, (SEQ ID NO: 15)
KETAAAKFERQHMNS, (SEQ ID NO: 16)
NRAWSEFLWQHLAPV, (SEQ ID NO: 17)
NRGWSEFLWQHHAPV
and (SEQ ID NO: 18)
NRAWSVFQWQHIAPA.
```

44. The method of claim 6, wherein the S-tag acceptor peptide is covalently bound to the N-terminus of the target polypeptide.

45. The method of claim 6, wherein the S-tag acceptor peptide is covalently bound to the C-terminus of the target polypeptide.

46. The method of claim 6, wherein the target polypeptide comprises a linker between the target polypeptide and the S-tag acceptor peptide.

47. The method of claim 46, wherein the linker is a peptide comprising 1 to 10 amino acids.

48. The method of claim 1, wherein the nuclease donor comprises an RNase S protein, or a derivative thereof.

49. The method of claim 1, wherein the detecting of the amount of the cleavage product in (b) comprises detecting the presence of, or amount of, a fluorescence signal emitted from the cleavage product, or a fluorescence signal emitted from the uncleaved nucleic acid substrate.

50. The method of claim 49, wherein the amount of the cleavage product detected in (b) comprises an amount that is higher than a predetermined threshold amount.

51. The method of claim 50, wherein the amount of the cleavage product detected in (b) is at least 20%, at least 30%, or at least 50% higher than a predetermined threshold amount.

52. The method of claim 50, wherein the predetermined threshold amount is determined by (i) conducting steps (a) and (b) in the absence of a test compound, or (ii) conducting steps (a) and (b) in the presence of a compound that does not interact with or bind to the target polypeptide.

53. The method of claim 20, further comprising contacting a cell with a nucleic acid that encodes and/or directs the expression of the fusion protein.

54. The method of claim 53, wherein the cell is a bacteria and the method comprises contacting the bacteria with a bacteriophage that comprises the nucleic acid that encodes and/or directs the expression of the fusion protein.

55. The method of claim 1, wherein the target polypeptide is a protein, modified protein or portion thereof, derived from or expressed by a pathogen.

56. The method of claim 55, wherein the pathogen is a virus or bacteria.

57. A high-throughput assay comprising conducting the method of claim 1, in a plurality of vessels, wherein each vessel comprises the fusion protein.

58. The assay of claim 57, wherein each vessel comprises a different fusion protein.

59. The assay of claim 57, wherein each of the vessels comprises a cell expressing a different fusion protein.

60. The assay of claim 57, wherein some or all of the vessels are contacted with a different test compound.

61. The assay of claim 57, wherein the plurality of vessels comprises at least 96 vessels, at least 384 vessels or at least 1536 vessels.

62. The assay of claim 57, wherein the vessels are wells in a microtiter plate.

63. The assay of claim 57, wherein the contacting of the fusion protein in each of the vessels with the test compound, the denaturant, the nuclease donor and/or the nucleic acid substrate takes place substantially simultaneously, or at the same time.

64. The assay of claim 57, wherein the detecting step of (b) comprises detecting an amount of a cleavage product of the nucleic acid substrate in each of the vessels substantially simultaneously, or at the same time.

65. The assay of claim 57, wherein the assay comprises contacting a cell in each of the vessels with a nucleic acid that expresses, encodes, or directs the expression of the fusion protein.

66. The method of claim 1, wherein the nucleic acid substrate comprises a pair of FRET labels, wherein the amount of the cleavage product comprises detecting the amount of a fluorescence signal emitted from the cleavage product and obtaining data points, and wherein the fluorescence signal allows for the identification of a target saturation dose, the apparent equilibrium dissociation constant ($K_D$), the half maximal effective concentration (EC50) of target engagement, between the target polypeptide and the test compound.

67. The method of claim 66, wherein the target saturation dose of the test compound is identified by the peak fluorescence value (Emax) after depletion of the nucleic acid substrate.

68. The method of claim 66, wherein the apparent equilibrium dissociation constant ($K_D$) between the target polypeptide and the test compound is identified by plotting a saturation binding curve, wherein datapoints beyond the Emax are excluded from the plot.

69. The method of claim 66, wherein the EC50 of target engagement is determined from the early datapoints before depletion of the nucleic acid substrate.

\* \* \* \* \*